United States Patent
Bartoshuk et al.

(10) Patent No.: US 11,744,273 B2
(45) Date of Patent: Sep. 5, 2023

(54) SWEETNESS ENHANCING VOLATILE COMPOSITIONS AND METHODS OF INCREASING PERCEIVED SWEETNESS OF A COMESTIBLE

(71) Applicant: University of Florida Research Foundation, Inc., Gainesville, FL (US)

(72) Inventors: Linda Bartoshuk, Gainesville, FL (US); Thomas A. Colquhoun, Gainesville, FL (US); Charles A. Sims, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 265 days.

(21) Appl. No.: 16/333,813

(22) PCT Filed: Sep. 15, 2017

(86) PCT No.: PCT/US2017/051898
§ 371 (c)(1),
(2) Date: Mar. 15, 2019

(87) PCT Pub. No.: WO2018/053344
PCT Pub. Date: Mar. 22, 2018

(65) Prior Publication Data
US 2019/0254322 A1     Aug. 22, 2019

Related U.S. Application Data

(60) Provisional application No. 62/395,719, filed on Sep. 16, 2016.

(51) Int. Cl.
*A23L 27/30* (2016.01)
*A23L 27/00* (2016.01)
(Continued)

(52) U.S. Cl.
CPC ............ *A23L 27/30* (2016.08); *A23L 2/60* (2013.01); *A23L 19/00* (2016.08); *A23L 27/88* (2016.08);
(Continued)

(58) Field of Classification Search
CPC ............................ A23L 27/30; A23L 27/88
See application file for complete search history.

(56) References Cited

U.S. PATENT DOCUMENTS

2007/0092623 A1    4/2007  Shimizu et al.
2009/0196966 A1*   8/2009  West ............... A23L 27/36
                                                426/253
(Continued)

FOREIGN PATENT DOCUMENTS

WO    WO 1994018855 A1    9/1994

OTHER PUBLICATIONS

International Search Report and Written Opinion in International Application No. PCT/US17/51898 dated Jan. 23, 2018, 22 pages.

*Primary Examiner* — Stephanie A Cox
(74) *Attorney, Agent, or Firm* — Thomas Horstemeyer, LLP

(57) ABSTRACT

Sweetener compositions and sweetness enhancing compositions including combinations of isolated volatile compounds are provided. Also provided are methods of increasing the perceived sweetness of a comestible by adding to/including in the comestible a sweetness enhancing composition effective to increase the perceived sweetness of the comestible, where the sweetness enhancing composition includes a combination of isolated volatile compounds.

13 Claims, 8 Drawing Sheets

(51) Int. Cl.
  *A23L 19/00*   (2016.01)
  *A23L 2/60*    (2006.01)
(52) U.S. Cl.
  CPC ....... *A23V 2002/00* (2013.01); *A23V 2200/15* (2013.01); *A23V 2200/16* (2013.01); *A23V 2250/21* (2013.01)

(56) References Cited

U.S. PATENT DOCUMENTS

| | | | |
|---|---|---|---|
| 2010/0055245 A1* | 3/2010 | Havekotte | A23L 27/88 426/106 |
| 2013/0136713 A1 | 5/2013 | Terada et al. | |
| 2013/0280400 A1* | 10/2013 | Bartoshuk | A23L 27/39 426/538 |
| 2016/0089317 A1 | 3/2016 | Cetti et al. | |
| 2016/0242439 A1 | 8/2016 | Baniel et al. | |
| 2016/0255868 A1 | 9/2016 | Panarisi et al. | |

\* cited by examiner

SWEETNESS ENHANCING VOLATILE COMPOSITIONS AND METHODS OF INCREASING PERCEIVED SWEETNESS OF A COMESTIBLE

CROSS-REFERENCE TO RELATED APPLICATION

This Application is the 35 U.S.C. § 371 national stage application of PCT Application No. PCT/US2017/051898, filed Sep. 15, 2017, where the PCT application claims the benefit of U.S. Provisional Application No. 62/395,719, filed on Sep. 16, 2016, which is are incorporated herein by reference in its entireties.

STATEMENT REGARDING FEDERALLY SPONSORED RESEARCH OR DEVELOPMENT

This invention(s) was made with government support under Grant No.: IOS-0923312 awarded by the National Science Foundation. The government has certain rights in the invention(s).

BACKGROUND

While human perception of food flavors involves integration of multiple sensory inputs, the most salient sensations are taste and olfaction. Orthonasal and retronasal olfaction contribute to flavor since they provide the qualitative diversity so important to identify safe and dangerous foods. The chemical composition of a food in itself tells us very little about whether or not that food will be liked. Study of volatile composition of a food can help elucidate flavor chemistry and the contribution of various volatiles to overall taste and flavor, which also provides insights into the interactions between retronasal olfaction and taste and how such interactions can be used to change the perception of taste in a consumable product.

Consumers often add ingredients to foods they consume, customizing those foods to their personal taste preferences. For instance, consumers commonly add sugar in the form of sucrose (table sugar), crystalline glucose, trehalose, dextrose or fructose, for example, to beverages, such as coffees and teas, on cereals, on fruits, and as toppings on baked goods to increase the sweet quality of the beverage or food item. Manufacturers often add sugar and other sugar substitutes to food products in order to increase the palatability of the product to consumers. Sugar generally includes a class of edible crystalline substances including sucrose, lactose, and fructose. Human taste buds interpret its flavor as sweet. Sugar as a basic food carbohydrate primarily comes from sugar cane and from sugar beet, but also appears in fruit, honey, sorghum, sugar maple (in maple syrup), and in many other sources. Sugars are high in calories, and over-consumption can lead to conditions such as obesity, diabetes, dental caries, and other health problems.

Sugar substitutes, including many artificial sweeteners, have been introduced to try to reduce the amount of sugar used in consumable products while maintaining the sweet taste preferred by consumers. Examples of sugar substitutes include, but are not limited to, aspartame, sucralose, stevioside, saccharin sodium, thaumatin, glycyrrhizin, acesulfame-K and sodium cyclamate. Many sugar substitutes are several times as sweet as sucrose, are often non-cariogenic, and are either low-caloric or non-caloric. These sugar substitutes, however, possess taste characteristics different than sugar, including, in some instances, undesirable taste characteristics such as lingering sweetness, delayed sweetness onset, and non-sugar like aftertastes. Thus, consumers and food producers continue to search for alternative methods of modifying sweetness of a consumable product.

SUMMARY

Briefly described, embodiments of the present disclosure provide for volatile compositions and methods for using volatile compositions for increasing the perceived sweetness of a comestible. Compositions and methods of the present disclosure include sweetener compositions, sweetness enhancing compositions, compositions and methods for increasing the perceived sweetness of a comestible or manufactured comestible. The present disclosure describes sweetener composition including a natural sweetener, an artificial sweetener, or both; and a sweetness enhancing composition including each of the following isolated volatile compounds in the following amounts about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; about 0.051494 ppm of (Z)-,β-sinensal; an effective amount of of β-caryophyllene oxide; and an effective amount of 2-heptanone.

The present disclosure also describes a sweetener composition including a natural sweetener, an artificial sweetener, or both. In embodiments the sweetener composition also includes a sweetness enhancing composition including about 25 of the following isolated volatile compounds in the following amounts: about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; about 0.051494 ppm of (Z)-,β-sinensal; an effective amount of of β-caryophyllene oxide; and an effective amount of 2-heptanone.

The present disclosure also describes a sweetener composition for increasing the perceived sweetness of a comestible, the composition including a natural sweetener, an artificial sweetener, or both. In embodiments the sweetener composition also includes a sweetness enhancing composition including about 25 of the isolated volatile compounds chosen from the group consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3 (2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanal; carvacrol; 2-penten-1-ol; (Z)-,β-sinensal; β-caryophyllene oxide; and 2-heptanone.

The present disclosure also describes a sweetness enhancing composition for increasing the perceived sweetness of a comestible, the composition including: a combination of about 25 of the isolated volatile compounds chosen from the group consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone, wherein the sweetness enhancing composition does not contain a sugar or artificial sweetener and the volatile compounds are present in amounts effective to increase the perceived sweetness of a comestible containing a natural or artificial sweetener, or both, without increasing the amount of the natural or artificial sweetener in the comestible.

The present disclosure also describes a sweetener composition including a natural sweetener, an artificial sweetener, or both; In embodiments, the sweetener composition also includes a sweetness enhancing composition including at least 25 of the following isolated volatile compounds: (E)-2-heptenal 1-pentanol; 2,5-dimethyl-4-hydroxy-3(2H)-furanone; 4-carene; 6-methyl-5-hepten-2-ol; b-ionone; cis-3-hexen-1-ol; cis-4-decenal; geranial; hexyl alcohol; isopentyl acetate; isovaleric acid; neral; propyl acetate; trans,trans-2,4-decadienal; trans-2-pentenal; pentadecane; octyl acetate; heptanal; γ-Selinene; methyl octanoate; E,E-alloocimene; Silane, trimethyl[5-methyl-2-(1-methylethyl)phenoxy]; Malonic acid, bis(2-trimethylsilylethyl ester); hexanal; vanillin; α-panasinsen; 4-thujene; nonanal; 2-Penten-1-ol, (Z)-; 4-(1-methylethenyl)-1-cyclohexene-1-methanol acetate; β-cadinene; carveol, trans 1-octen-3-one; γ-vetivenene; pentanal; α-selinene; α-terpineol; dodecanal; carvone; neryl propanoate/Geranyl isobutanoate; hexyl butanoate; valencene; E-2-hexenal; copaene; α-ionone; (E)-2-Decen-1-al; (E)-2-Hexen-1-yl butyrate; (E)-2-Hexenal; (E)-2-Penten-1-al; (Z)-2-Penten-1-al; 1-Pentene-3-one; 2,3-Heptanedione; 2-Ethylhexyl acetate; 2-Hexanone; 2-Methyl butyric acid; 2-Methyl-2-butanol; 2-Octenal; 2-Pentyl butyrate; 3-Ethyloctane; 3-Hexanone; 4-Methoxy-2,5-dimethyl-3(2H)-furanone; 6-Methyl-5-heptene-2-one; Amyl acetate; Amyl butyrate; Benzyl acetate; Butyl acetate; Butyl butanoate; Butyl isovalerate; Ethyl butyrate; Ethyl caproate; Ethyl octanoate; Hexanal; Hexyl acetate; hexyl alcohol; Hexyl butyrate; Isopropyl butyrate; Isopropyl hexanoate; Methyl thiobutyrate; Myrtenal; Octyl butanoate; Octyl hexanoate; Octyl isovalerate; Propyl butanoate; 2-heptanone; 2-Octanone; hexanal; methyl isovalerate; and acetone, wherein the at least 25 isolated comprises volatile compounds are from at least 3 different fruits.

In embodiments, the present disclosure provides methods of increasing the perceived sweetness of a manufactured comestible that contains a natural or artificial sweetener by adding to the manufactured comestible, a sweetness enhancing composition effective to increase the perceived sweetness of the comestible by a factor of about 2×, without the addition of any natural or artificial sweeteners, the sweetness enhancing composition including the following isolated volatile compounds in the following amounts: about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; about 0.051494 ppm of (Z)-,β-sinensal; an effective amount of of β-caryophyllene oxide; and an effective amount of 2-heptanone.

In embodiments, the present disclosure provides methods of increasing the perceived sweetness of a comestible by adding to a manufactured comestible a sweetness enhancing composition including 25 or more isolated volatile compounds in an amount effective to increase the perceived sweetness of the comestible, the volatile compounds chosen from the group consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone, wherein the volatile compounds increase the perceived sweetness of the comestible without increasing an amount of natural or artificial sweetener in the comestible.

In embodiments, the present disclosure provides methods of increasing the perceived sweetness of a comestible by adding to a manufactured comestible a sweetness enhancing composition including at least 25 isolated volatile compounds in an amount effective to increase the perceived sweetness of the comestible, the volatile compounds including: (E)-2-heptenal 1-pentanol; 2,5-dimethyl-4-hydroxy-3 (2H)-furanone; 4-carene; 6-methyl-5-hepten-2-ol; b-ionone; cis-3-hexen-1-ol; cis-4-decenal; geranial; hexyl alcohol; isopentyl acetate; isovaleric acid; neral; propyl acetate; trans, trans-2,4-decadienal; trans-2-pentenal; pentadecane; octyl acetate; heptanal; γ-Selinene; methyl octanoate; E,E-alloocimene; Silane, trimethyl[5-methyl-2-(1-methylethyl)phenoxy]; Malonic acid, bis(2-trimethylsilylethyl ester); hexanal; vanillin; α-panasinsen; 4-thujene; nonanal; 2-Penten-1-ol, (Z)-; 4-(1-methylethenyl)-1-cyclohexene-1-methanol acetate; 1-cadinene; carveol, trans 1-octen-3-one; γ-vetivenene; pentanal; α-selinene; α-terpineol; dodecanal; carvone; neryl propanoate/Geranyl isobutanoate; hexyl butanoate; valencene; E-2-hexenal; copaene; α-ionone; (E)-2-Decen-1-al; (E)-2-Hexen-1-yl butyrate; (E)-2-Hexenal; (E)-2-Penten-1-al; (Z)-2-Penten-1-al; 1-Pentene-3-one; 2,3-Heptanedione; 2-Ethylhexyl acetate; 2-Hexanone; 2-Methyl butyric acid; 2-Methyl-2-butanol; 2-Octenal; 2-Pentyl butyrate; 3-Ethyloctane; 3-Hexanone; 4-Methoxy-2,5-dimethyl-3(2H)-furanone; 6-Methyl-5-heptene-2-one; Amyl acetate; Amyl butyrate; Benzyl acetate; Butyl acetate; Butyl butanoate; Butyl isovalerate; Ethyl butyrate; Ethyl caproate; Ethyl octanoate; Hexanal; Hexyl acetate; hexyl alcohol; Hexyl butyrate; Isopropyl butyrate; Isopropyl hexanoate; Methyl thiobutyrate; Myrtenal; Octyl butanoate; Octyl hexanoate; Octyl isovalerate; Propyl butanoate; 2-heptanone; 2-Octanone; hexanal; methyl isovalerate; and acetone, wherein the at least 25 isolated comprises volatile compounds are from at least 3 different fruits.

BRIEF DESCRIPTION OF THE DRAWINGS

Further aspects of the present disclosure will be more readily appreciated upon review of the detailed description of its various embodiments, described below, when taken in conjunction with the accompanying drawings.

DESCRIPTION

Figure 1:
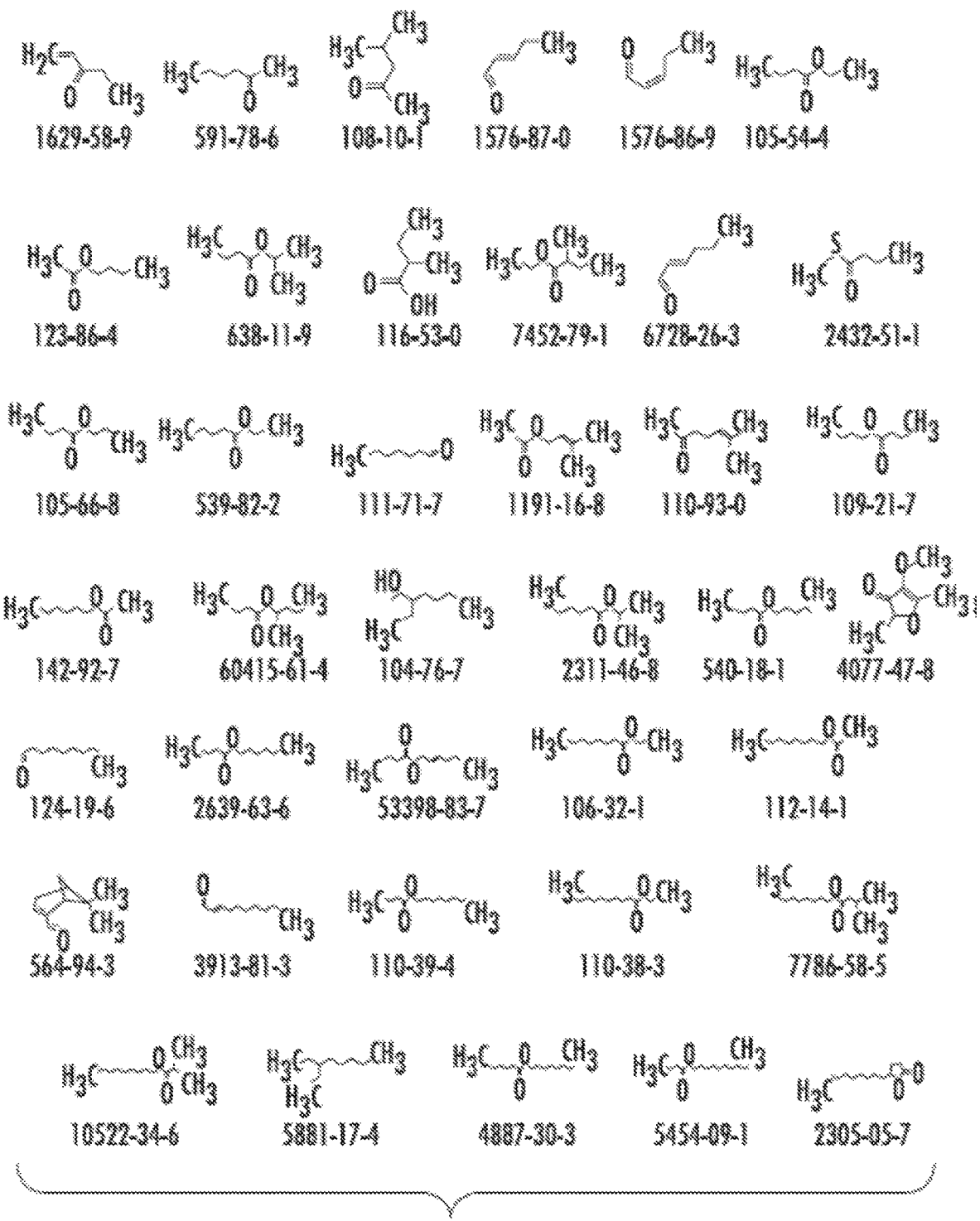
FIG. 1 illustrates the chemical structure of various volatile compounds (identified by CAS number) quantified in strawberry.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

Any publications and patents cited in this specification that are incorporated by reference are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of agriculture, botany, statistics, organic chemistry, biochemistry, molecular biology, and the like, which are within the skill of the art. Such techniques are explained fully in the literature.

It must be noted that, as used in the specification and the appended embodiments, the singular forms "a," "an," and "the" include plural referents unless the context clearly dictates otherwise. Thus, for example, reference to "a support" includes a plurality of supports. In this specification and in the embodiments that follow, reference will be made to a number of terms that shall be defined to have the following meanings unless a contrary intention is apparent.

Prior to describing the various embodiments, the following definitions are provided and should be used unless otherwise indicated.

Definitions

In describing the disclosed subject matter, the following terminology will be used in accordance with the definitions set forth below.

As used herein, the term "taste," as a noun, refers to the sensation of one of the classic "taste qualities" perceived by the taste sensors in the mouth of a consumer. Taste qualities include at least the following classic taste qualities: sweet, salty, sour, and bitter. However, when used in verb form, "taste" can refer to a combination of the sensation of both actual taste (gustation) as well as retronasal olfaction (flavor), as described below.

The term "volatile compound" or "flavor volatile" or "volatile" refers to certain chemicals that can be sensed by the olfactory systems of a consumer. Many of the volatile compounds of the present disclosure can be found in fruits, such as, but not limited to, tomato, strawberry, blueberry, and orange. Some exemplary volatile compounds include, but are not limited to, trans-2-pentenal, 6-methyl-5-hepten-2-ol, 2,5-dimethyl-4-hydroxy-3(2H)-furanone, cis-3-hexen-1-ol, isopentyl acetate, 6-methyl-5-hepten-2-one, b-cyclocitral, geranial, neral, geranylacetone, b-ionone, ethyl valerate, butyl butanoate, heptanal, 6-methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, and 4-methoxy-2,5-dimethyl-3(2H)-furanone, methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol,(Z)-, b-sinensal, β-caryophyllene oxide, and 2-heptanone, as well as others.

Figure 3:
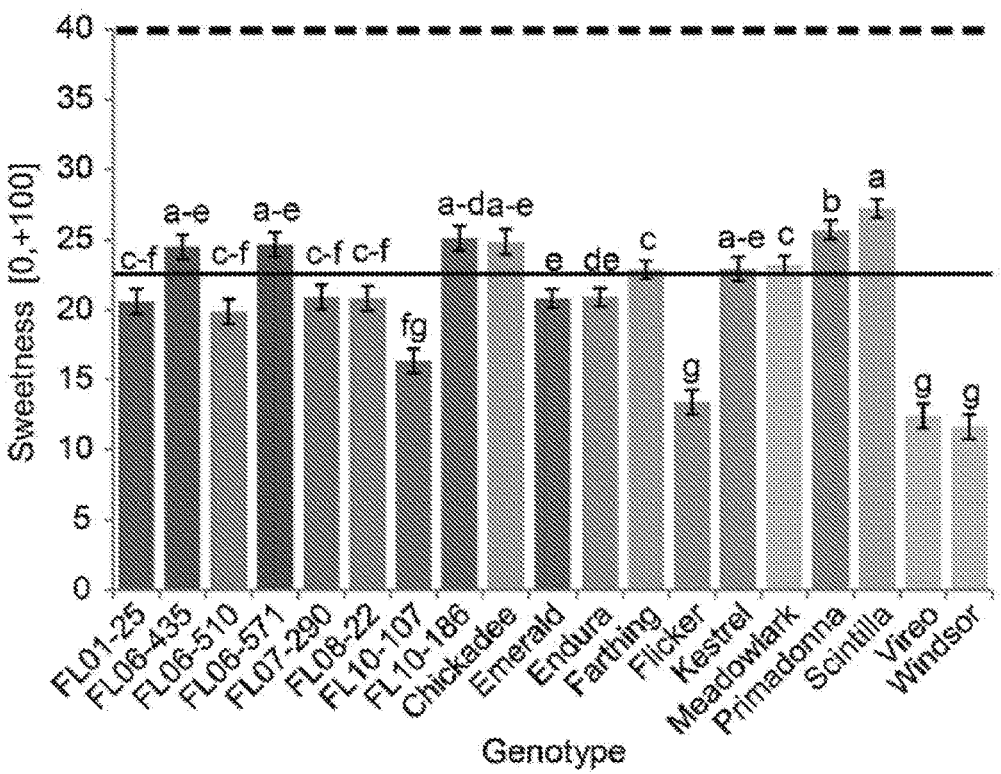
FIG. 3 is a graph illustrating sweetness intensity ratings of blueberry genotypes. Mean ratings and standard error of 19 blueberry genotypes for sweetness on intensity general Labeled Magnitude Scales (0 to +100; 0=no sensation, 100=most intense sensation of any kind). Overall mean is denoted by a black line, mean ideal value by a dashed line. LSMeans were separated for intensity ratings of each sweetness, sourness, and flavor, with fixed effect of genotype and random effect of panelist using Tukey's HSD (α=0.05).

The chemical structures of various volatile compounds discussed in the present disclosure are presented in FIG. 3. Although the above volatile names are generally regarded as standard in the art, variations can occur in chemical nomenclature; thus, Table 11, below identifies many of the volatiles discussed in the present application by CAS number.

The term "aroma" or "odor" as used herein, refers to orthonasal olfaction of a volatile compound, e.g., the smell perceived when a volatile compound is sniffed through the nose.

As used herein, the term "flavor" refers to retronasal olfaction of a volatile compound, e.g., when volatiles emitted from substances in the mouth are forced up past the palate to the nasal cavity from the back. The perception of the volatile compound is referred to the mouth. While colloquially "flavor" often refers to a combination of taste and retronasal olfaction, unless otherwise indicated herein "flavor" refers to retronasal olfaction with respect to a flavor volatile, whereas "perceived flavor" or "perceived taste" refers to a combination of taste and retronasal olfaction ("flavor").

The term "flavor-associated compound" refers to chemicals that can be sensed by the taste and/or olfactory systems of a consumer. Flavor-associated compounds include volatile compounds, as discussed above, as well as various taste-associated compounds such as sugars and acids.

The "actual sweetness" refers to the sweetness of a comestible attributable to the amount of sweetener (sugar or sugar-substitute (e.g., artificial sweetener)) in the comestible. This is the sweetness attributed to the sweet taste quality. As used herein "sweetener" refers to natural and artificial sweeteners. Natural sweeteners include sugars such as glucose, fructose, sucrose and other natural sugar-containing products used for sweetening (e.g., honey, molasses, etc.). Artificial sweeteners or sugar substitutes include other chemical sweetening agents, usually non-caloric or lower in calories than natural glucose or fructose (e.g., saccharin, sucralose, rebenia, etc.).

"Perceived sweetness" refers to the sweetness perceived by a consumer based on the combination of the sweet taste quality ("actual sweetness") as well as contributions to sweetness by retronasal olfaction of flavor volatiles. The perceived sweetness may be greater than or less than the actual sweetness of a comestible without or with a different amount of the volatile(s). For instance, the perceived sweetness may be greater than the actual sweetness if certain flavor volatiles increase and/or enhance the perceived sweetness of a comestible over the actual sweetness (e.g., the perceived sweetness to a consumer is greater with the volatile(s) present without increasing the amount of sugar or sugar-substitute). On the other hand, the perceived sweetness may be less than the actual sweetness if certain flavor volatiles suppress or mask the actual sweetness of a comestible (e.g., the perceived sweetness to a consumer is less with the volatile(s) present without any decrease in the amount of sugar or sugar-substitute).

"Induced sweetness" refers to the difference between the perceived sweetness and actual sweetness of a comestible.

The term "tasting panel" refers to a number of individuals assembled into a panel to taste samples of a consumable compound and to rate the samples based on flavor and other criteria.

As used herein, the term "liking score" refers to a numerical score assigned to a sample a food (e.g., a tomato or strawberry) by a member of a tasting panel, where the taster rates the food based on the taster's perception of the taste of the food (e.g., liking or disliking).

As used herein, the term "tomato" or "tomato plant" means any variety, cultivar, or population of *Solanum lycopersicum* (also known as *Lycopersicon esculentum* and/or *Lycopersicon lycopersicum*), including both commercial tomato plants as well as heirloom varieties. In some embodiments, "tomato" may also include wild tomato species, such as, but not limited to, *Solanum lycopersicum* var. *cerasiforme, Solanum pimpinellifolium, Solanum cheesmaniae, Solanum neorickii, Solanum chmielewskii, Solanum habrochaites, Solanum pennellii, Solanum peruvianum, Solanum chilense* and *Solanum lycopersicoides*.

The term "strawberry" or "strawberry plant" as used herein means any variety, cultivar, or population of the *Fragaria* genus, including garden strawberries (a hybrid known as *Fragaria ananassa*, as well as various other strawberry species, subspecies, and cultivars such as, but not limited to, *F. vesca, F. moschata, F. viridis, F. sylvestris alba, F. sylvestris semperflorens, F. moschata, F. virginiana,* and *F. chiloensis*.

As used herein, the term "blueberry" or "blueberry plant" refers to any variety, cultivar, or population of the *Vaccinium* genus, including *Vaccinium cyanococcus*, as well as other blueberry species, subspecies, and cultivars, such as, but not limited to, *V. alaskaense, V. ashei, V. angustifolium, V. boreale, V. caesariense, V. corymbosum, V. constablaei, V. consanguineum, V. darrowii, V. elliottii, V. formosum, V. fuscatum, V. hirsutum, V. myrsinites, V. myrtilloides, V. operium, V. pallidum, V. simulatum, V. tenellum,* and *V. virgatum*

As used herein, the term "orange" "or "orange plant" refers to any variety, cultivar, or population of sweet orange, or *Citrus sinensis* and may also include other *Citrus* species, subspecies and cultivars, such as *Citrus maxima* and *Citrus reticulate*. "Orange juice" refers to a liquid extrudate or concentrate obtained from the orange fruit.

As used herein, the term "plant" includes plant cells, plant protoplasts, plant cell tissue cultures from which tomato plants can be regenerated, plant calli, plant cell clumps, and plant cells that are intact in plants, or parts of plants, such as embryos, pollen, ovules, flowers, leaves, seeds, roots, root tips and the like.

The "edible portion" of a plant includes any portion of a plant that may be consumed by humans, such as, but not limited to, fruits, vegetables, grains, leafy portions, seeds, and the like.

The term "tomato fruit" refers to the fruit produced by a tomato plant, including the flesh, pulp, meat, and seeds of the fruit.

The term "strawberry" or "strawberry fruit" refers to the fruit produced by a strawberry plant, including the flesh, pulp, meat, and seeds of the fruit.

The term "blueberry fruit" refers to the fruit produced by a blueberry plant, including the flesh, pulp, meat, and seeds of the fruit.

The term "orange fruit" refers to the fruit produced by an orange plant, including the flesh, pulp, meat, and seeds of the fruit. "Orange juice" refers to juice produced from an orange fruit.

As used herein, the term "variety" or "cultivar" means a group of similar plants within a species that, by structural features, genetic traits, performance, and/or content of volatile compounds, sugars, and/or acids, can be identified from other varieties within the same species.

As used herein, the term "hybrid" means any offspring (e.g., seed) produced from a cross between two genetically unlike individuals (Rieger, R., A Michaelis and M. M. Green, 1968, A Glossary of Genetics and Cytogenetics, Springer-Verlag, N.Y.). An "F1 hybrid" is the first generation offspring of such a cross, while an "F2", "F3" hybrid, and so on, refer to descendent offspring from subsequent crosses (e.g., backcrossing of an F1 hybrid or later hybrid with one of the parent plant varieties, crossing an F1 hybrid with a different plant variety than the original parents, and so on).

As used herein "ancestor" refers to a parent, grandparent, great-grandparent, and so-on, of a plant.

As used herein, "comestible" refers to anything that can be consumed (e.g., eaten/ingested) by humans, such as, but not limited to, natural food products, manufactured food products, beverages, food additives, medications, etc. The term "comestible" also includes products, such as chewing tobacco or chewing gum that is typically chewed, and tasted, but not necessarily swallowed by the consumer. A "manufactured comestible" includes something that is made by or significantly altered by man and not naturally occurring (such as a fruit or vegetable).

As used herein, the term "sweetness enhancing composition" refers to a man-made composition prepared by combining a plurality of isolated volatile compounds (e.g., 24 or more, 35 or more, 40 or more, 55 or more, and the like). Thus, the "sweetness enhancing composition" of the present disclosure does not refer to a product directly obtained from a natural fruit or other food product. In other words, a "sweetness enhancing composition" would not include a fruit paste or juice or other concentrate. The isolated volatile compounds may be made artificially or may be naturally derived. Although naturally derived volatile compounds may ultimately be isolated from the fruit, the volatile compounds have been removed (e.g., isolated) from their natural environment (e.g., the fruit, fruit paste, fruit concentrate), before combination in the sweetness enhancing composition of the present disclosure. As used herein, "isolated" with respect to a volatile compound of the present disclosure indicates that the volatile compound it has been removed from its natural environment, though it does not require that it has 100% purity.

Discussion

The embodiments of the present disclosure encompass sweetness enhancing compositions, products including the sweetness enhancing compositions, and methods for modifying the perception of sweet taste by a consumer, and methods of producing a comestible with modified perceived sweetness.

The senses of taste (gustation) and smell (olfaction) have biological functions that contribute to survival. When looking at mechanisms, it is well to remember the biological functions of these senses. These biological functions provide clues as to how taste and smell function.

Taste qualities (the classic four include: sweet, salty, sour and bitter) allow organisms to identify nutrients that are crucial to survival. Some researchers include a fifth taste quality, umami, but its inclusion as a taste quality is controversial. It is possible to have one or more of these taste qualities within the same item. The affect (pleasure/displeasure) evoked by these qualities is hard-wired in the brain (requires no learning). Sweetness identifies glucose, the sugar used as fuel by the brain. Saltiness identifies sodium, essential for nerve and muscle function. Sourness identifies potentially dangerous acids (and may also serve to identify unripe fruit). Bitterness identifies poisons. Taste qualities result from stimulation of oral receptors tuned to chemical characteristics of specific molecules.

Olfactory qualities, which do not fall into any generally accepted naming system, allow organisms to learn about substances in their environments that are beneficial or dangerous. Olfactory sensations are produced by receptors tuned to specific active groups on molecules, e.g., volatile compounds. The active groups on particular volatile compounds create a pattern of response at the glomeruli in the olfactory brain. That pattern is somehow stored in memory and is associated with affect by learning. For example, the bacon odor pattern becomes liked by association with the protein and fat in bacon; the orange odor pattern becomes liked by association with the sugar in oranges. The number of volatiles that can produce olfactory sensations is essentially unlimited. However, the number that can be learned (presumably those that form patterns in the brain that are stored) is smaller; for instance, experts can learn to identify and name around 200 odors.

Volatile compounds can be sensed by an individual via orthonasal and retronasal olfaction. "Orthonasal olfaction" refers to olfactory sensations resulting when odorants are sniffed through the nostrils. "Retronasal olfaction" refers to olfactory sensations resulting when odorants emitted by substances in the mouth are forced up behind the palate and into the nasal cavity from the back. In both cases, the receptors stimulated are located high in the nasal cavity. However, perceptually, retronasal olfaction is referred to the mouth. In both cases, the sensation is evoked by stimulation of the olfactory receptors at the top of the nasal cavity.

The senses of taste and smell (or odor) are anatomically two separate entities. Taste is stimulated through physical interactions of non-volatile molecules with receptors on the tongue and mouth surfaces, while volatile compounds reaching the receptors in the olfactory epithelium determine smell. At a perceptual level, however, there are many indications that the sensations of taste and smell interact. Interactions may also occur with the other modalities of appearance, sound and texture.

The multimodal interaction and integration of these sensations results in a complex perception that is commonly called "flavor" or "taste." Thus, unless a person is aguesic (inability to perceive tastes) or anosmic (inability to perceive odors), the consumption of foods and beverages results in the simultaneous perception of taste and smell, which contributes to an overall impression of flavor. These perceptions are thought to be associated and interactive at the cognitive level (i.e. associative learning and integration) of the brain. Although some experts use the term "flavor" to refer to taste plus retronasal olfaction and others generalize further by including sensations of touch and temperature, the key element in flavor is retronasal olfaction. As defined above, in the present disclosure, "flavor" refers to retronasal olfaction of volatile compounds, whereas "perceived flavor" or "perceived taste" refers to the combination of taste and retronasal olfaction. As mentioned in the definitions above, the term "taste" has two meanings, depending on usage. The noun "taste" can refer specifically to sensations evoked by receptors on the tongue (sweet, salty, sour, bitter, along with some other sensations like "umami" that are controversial). The term "taste" in common usage can also refer to the perception of flavor. In the present application, it is generally used in the first sense; that is to refer to sensations arising from receptors on the tongue Interactions among taste and smell influence an individual's overall perception of a food. In mixtures of different taste qualities, suppression occurs (Bartoshuk, 1975, p. 216). For example, upon adding sugar to quinine (e.g., tonic water), both the sweetness and bitterness will be less intense than either would be alone. In mixtures of different olfactory qualities, suppression also occurs (Jones, 1964, p. 3709). One purpose of this suppression is to prevent complex mixtures from becoming extremely intense as they would if taste intensities or odorant intensities simply added in mixtures.

While taste and orthonasal olfaction essentially do not interact, taste and retronasal olfaction do interact. The biological purpose of such interactions is unclear, but those interactions lead to the phenomenon of volatile-induced-sweetness. Studies have shown that the intensity of perceived flavors or tastes can be modified by simultaneous consumption of non-volatile molecules and volatile compounds.

The food industry has long believed that adding sweeteners can intensify flavor. Sjöström and Cairncross (working for Arthur D. Little) documented examples of the "enhancement of total flavor" by the addition of sweeteners to various food products (Sjöström, 1955, p. 3707). The present study shows that the reverse can also be true: flavors can intensify or suppress sweet taste. The present disclosure describes sweetness enhancing compositions containing a specifically selected group of flavor volatiles that can be used for taste modification of the sweet taste quality. The flavor volatiles can be used to enhance or suppress the perceived sweetness of a food, and consumable product.

One of the purposes of the initial studies providing the data described in Examples 1-3 below was to use science to demonstrate how fruits and vegetables can be made more palatable. The initial design was to (1) grow plants producing fruit varying in sugar, acid and volatile constituents, (2) measure the concentrations of those constituents and (3) measure the sensory and hedonic properties of those fruits. For the initial tomato study described in patent application Nos. 13/869,132 and 15/403,731 and Tieman, D. et al., 2012 (each of which is hereby incorporated by reference herein and which provide the volatile data as obtained by the methods described in Example 1 and used for the additional analysis in Examples 2 below), the concentration of each constituent was plotted against palatability for the 80 tomatoes included in the study. These correlations showed great variability: about half were positive (the more of that constituent in the tomato, the more it was liked), a few were negative (the more of that constituent in the tomato, the less it was liked) and some correlations were not significant. Similar tests were performed with strawberries, as also described in U.S. patent application Ser. Nos. 13/869,132, 15/403,731 and Schwieterman, M L, et al., 2014 (each of which is incorporated by reference herein) and part of Example 3, which provided the data used in the analysis also described in Example 3, below. These studies provided a guide for increasing the constituents that correlate positively with tomato/strawberry palatability and decreasing those that correlate negatively. This guide was used to further elucidate the volatile compounds that made independent contributions to the perceived sweetness of the tomato and/or strawberry, as judged by a consumer tasting panel.

Then in the studies described in Examples 2 and 3 of the present application, below, these tomato and strawberry volatile data were subject to a different regression analysis, and a new and different set of sweet-enhancing volatiles was identified, and these were then combined with other sweet-enhancing volatile compounds elucidated from other fruits, such as blueberry and oranges (from Examples 4 and 5), to make a sweet-enhancing composition as described in greater detail in Example 6 below.

Example 1 below reviews in greater detail embodiments of methods used to conduct a tasting panel according to the present disclosure and methods of identifying the flavor-associated compounds (e.g., sugars, acids, and volatile compounds) positively and negatively associated with taste. As shown in the tables, the amounts of various flavor-associated compounds for tomatoes with different liking scores was determined. Regression analysis was conducted on biochemically related groups of volatiles to determine volatile compounds with a significant independent effect on perceived sweetness, as shown in Example 2. Initial analysis, as described in U.S. patent application Ser. Nos. 13/869,132, 15/403,731 and Tieman 2012, provided a list of sweet-enhancing and sweet-suppressing volatiles that could be used for various applications. However, as described in the present application, this data was later re-analyzed using the full dataset, without any grouping of volatiles or normalizing based on groups of volatiles. Using this more comprehensive regression analysis, additional sweet-enhancing volatiles were identified, as well as others were found to have less significance with respect to enhanced sweetness than predicted in the initial analysis. Additionally, a different analytical framework was used to provide additional correlation data. This re-analysis of the data from the tomato studies in Examples 1 is provided in Example 2. In the initial analysis, volatile compounds positively associated with sweetness, independent of sugar content, included the following volatile compounds: neral, 4-carene, 3-methyl-1-butanol, 6-methyl-5-hepten-2-ol, isovaleric acid, and geranial. The data also identified a volatile compound negatively associated with sweetness (e.g., suppresses perceived sweetness): 2-methylbutanal. Additional analysis of the data from examples 1 and 2 identified the following tomato volatiles (see Table 4, below) as having an independent contribution to perceived sweetness independent of at least one sugar (E)-2-heptenal 1-pentanol; 2,5-dimethyl-4-hydroxy-3(2H)-furanone; 4-carene; 6-methyl-5-hepten-2-ol; b-ionone; cis-3-hexen-1-ol; cis-4-decenal; geranial; hexyl alcohol; isopentyl acetate; isovaleric acid; neral; propyl acetate; trans,trans-2,4-decadienal; trans-2-pentenal. In embodiments, the following volatiles demonstrated a sweet-enhancement effect in a sugar solution: trans-2-pentenal, 6-methyl-5-hepten-2-ol, 2,5-dimethyl-4-hydroxy-3(2H)-furanone, cis-3-hexen-1-ol, isopentyl acetate, 6-methyl-5-hepten-2-one, b-cyclocitral, geranial, neral, geranylacetone, and b-ionone.

Example 3 describes similar studies and experiments conducted with strawberries, also including conducting a tasting panel according to the present disclosure and methods of identifying the flavor-associated compounds positively and negatively associated with taste and methods of identifying which strawberry varieties have greater or lesser amounts of various volatile compounds and other flavor-associated compounds. Although initial data analysis provided a first set of sweet-enhancing volatiles as described in the Example as well as in U.S. patent application Ser. Nos. 13/869,132 and 15/403,731 and in Schweiterman M L, 2014, in the present studies, as described in greater detail in Example 3 below, a different analytical approach was used, and regression analysis was conducted on the data from the full set of strawberry volatiles. The analysis included associating each volatile compound with sweetness to determine the volatile compounds independently associated with sweetness. As described in greater detail in Example 3 (see Table 6), based on this analysis, the following compounds were found to increase perceived sweetness, independent of at least one sugar: (E)-2-Decen-1-al; (E)-2-Hexen-1-yl butyrate; (E)-2-Hexenal; (E)-2-Penten-1-al; (Z)-2-Penten-1-al; 1-Pentene-3-one; 2,3-Heptanedione; 2-Ethylhexyl acetate; 2-Hexanone; 2-Methyl butyric acid; 2-Methyl-2-butanol; 2-Octenal; 2-Pentyl butyrate; 3-Ethyloctane; 3-Hexanone; 4-Methoxy-2,5-dimethyl-3(2H)-furanone; 6-Methyl-5-heptene-2-one; Amyl acetate; Amyl butyrate; Benzyl acetate; Butyl acetate; Butyl butanoate; Butyl isovalerate; Ethyl butyrate; Ethyl caproate; Ethyl octanoate; Heptanal; Hexanal; Hexyl acetate; hexyl alcohol; Hexyl butyrate; Isopropyl butyrate; Isopropyl hexanoate; Methyl thiobutyrate; Myrtenal; Nonanal; Octyl acetate; Octyl butanoate; Octyl hexanoate; Octyl isovalerate; Propyl butanoate. In embodiments, the following volatile compounds were tested for sweet-enhancing effects: ethyl valerate, butyl butanoate, heptanal, 6-methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, and 4-Methoxy-2,5-dimethyl-3(2H)-furanone.

Example 4 describes tasting panel studies, experiments, and data analysis conducted to identify blueberry volatile compounds positively associated with taste and sweetness. Regression analysis revealed volatile compounds independently associated with sweet perception, including: 2-heptanone; 2-Octanone; 6-Methyl-5-heptene-2-one; hexanal;

Methyl isovalerate; neral acetone; nonanal (see Table 8). Blueberry volatiles identified as having an independent enhancement of sweet perception included: β-caryophyllene oxide (CAS#1139-30-6), neral (CAS#106-26-3), and 2-heptanone (CAS#110-43-0). Two additional volatiles that were significant to flavor intensity included: 2-undecanone and 3-methyl-1-butanol.

Additional tasting panel and volatile experiments, described in greater detail in Example 5, were conducted with orange juice, using a similar process, except for the volatile collection process, which differed slightly since the volatiles were collected from juice rather than the fruit. Again, a similar regression analysis revealed orange volatile compounds independently associated with sweet taste as well (see Table 9, below). Orange volatiles found to have an independent effect on sweetness perception included the following: pentadecane; octyl acetate; heptanal; γ-Selinene; methyl octanoate; E,E-alloocimene; Silane, trimethyl[5-methyl-2-(1-methylethyl)phenoxy]; Malonic acid, bis(2-trimethylsilylethyl ester); hexanal; vanillin; α-panasinsen; 4-thujene; nonanal; 2-Penten-1-ol, (Z)-; 4-(1-methylethenyl)-1-cyclohexene-1-methanol acetate; β-cadinene; carveol, trans 1-octen-3-one; γ-vetivenene; pentanal; α-selinene; α-terpineol; dodecanal; carvone; neryl propanoate/Geranyl isobutanoate; hexyl butanoate; valencene; E-2-hexenal; copaene; α-ionone. In embodiments, the following isolated volatile compounds from orange independently associated with sweet include the following: octyl acetate, heptanal, methyl octanoate, hexanal, vanillin, nonanal, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-Penten-1-ol, and (Z)-,b-sinensal.

In further experiments, a glucose solution and various mixtures of volatile compounds were combined into a sweetness enhancing composition and tested to determine the effect on sweet perception. As described in Example 6, different combinations and numbers of volatile compounds were mixed with a glucose solution and sampled by a tasting panel as described in Example 6. This revealed that including at least 11 volatiles produced a measurable increase in sweet perception. The sweet-enhancing effect was even greater with 24 volatiles and the greatest enhancement was observed with a tested composition including 35 of the sweet-enhancing volatile compounds. Thus, it appeared that a larger number of the identified sweet-enhancing volatile compounds further increased the sweet-enhancing effect.

Based upon the above data several volatile compounds were selected for further testing, and it was determined that the following volatiles from tomato, strawberry, blueberry, and orange were capable of enhancing sweet perception of a sucrose solution. Various combinations of these volatiles were tested to determine enhancement of sweet taste as described below in Example 6.

TABLE 1

| Fruit | Sweet-enhancing volatiles |
| --- | --- |
| Tomato | trans-2-pentenal, 6-methyl-5-hepten-2-ol, 2,5-dimethyl-4-hydroxy-3(2H)-furanone, cis-3-hexen-1-ol, isopentyl acetate, 6-methyl-5-hepten-2-one, b-cyclocitral, geranial, neral, geranylacetone, b-ionone |
| Strawberry | ethyl valerate, butyl butanoate, heptanal, 6-Methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, 4-methoxy-2,5-dimethyl-3(2H)-furanone |
| Blueberry orange | β-caryophyllene oxide, neral, 2-heptanone octyl acetate, heptanal, methyl octanoate, hexanal, vanillin, nonanal, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-Penten-1-ol, (Z)-, b-sinensal |

Thus, in embodiments of the present disclosure, the volatile compounds positively associated with sweetness (e.g., increases perceived sweetness) can be selected from the following sweet-enhancing volatiles from tomato, strawberry, blueberry and orange: (E)-2-heptenal 1-pentanol; 2,5-dimethyl-4-hydroxy-3(2H)-furanone; 4-carene; 6-methyl-5-hepten-2-ol; b-ionone; cis-3-hexen-1-ol; cis-4-decenal; geranial; hexyl alcohol; isopentyl acetate; isovaleric acid; neral; propyl acetate; trans,trans-2,4-decadienal; trans-2-pentenal; pentadecane; octyl acetate; heptanal; γ-Selinene; methyl octanoate; E,E-alloocimene Silane, trimethyl[5-methyl-2-(1-methylethyl)phenoxy]; Malonic acid, bis(2-trimethylsilylethyl ester); hexanal; vanillin; α-panasinsen; 4-thujene; nonanal; 2-Penten-1-ol, (Z)-; 4-(1-methylethenyl)-1-cyclohexene-1-methanol acetate; β-cadinene; carveol, trans 1-octen-3-one; γ-vetivenene; pentanal; α-selinene; α-terpineol; dodecanal; carvone; neryl propanoate/Geranyl isobutanoate; hexyl butanoate; valencene; E-2-hexenal; copaene; α-ionone; (E)-2-Decen-1-al; (E)-2-Hexen-1-yl butyrate; (E)-2-Hexenal; (E)-2-Penten-1-al; (Z)-2-Penten-1-al; 1-Pentene-3-one; 2,3-Heptanedione; 2-Ethylhexyl acetate; 2-Hexanone; 2-Methyl butyric acid; 2-Methyl-2-butanol; 2-Octenal; 2-Pentyl butyrate; 3-Ethyloctane; 3-Hexanone; 4-Methoxy-2,5-dimethyl-3(2H)-furanone; 6-Methyl-5-heptene-2-one; Amyl acetate; Amyl butyrate; Benzyl acetate; Butyl acetate; Butyl butanoate; Butyl isovalerate; Ethyl butyrate; Ethyl caproate; Ethyl octanoate; Hexanal; Hexyl acetate; hexyl alcohol; Hexyl butyrate; Isopropyl butyrate; Isopropyl hexanoate; Methyl thiobutyrate; Myrtenal; Octyl butanoate; Octyl hexanoate; Octyl isovalerate; Propyl butanoate; 2-heptanone; 2-Octanone; hexanal; methyl isovalerate; acetone In some embodiments of the present disclosure, the isolated volatile compounds positively associated with sweetness ((e.g., increases perceived sweetness) can include, but are not necessarily limited to: trans-2-pentenal, 6-methyl-5-hepten-2-ol, 2,5-dimethyl-4-hydroxy-3(2H)-furanone, cis-3-hexen-1-ol, isopentyl acetate, 6-methyl-5-hepten-2-one, b-cyclocitral, geranial, neral, geranylacetone, b-ionone, ethyl valerate, butyl butanoate, heptanal, 6-methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, and 4-methoxy-2,5-dimethyl-3(2H)-furanone, methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-,b-sinensal, β-caryophyllene oxide, and 2-heptanone.

The present disclosure describes the use of targeted metabolomics and natural variation in flavor-associated sugars, acids and aroma volatiles to evaluate the chemistry of the four tested fruits, creating a predictive and testable model of liking. This non-traditional approach provides novel insights into flavor chemistry, the interactions between taste and retronasal olfaction and a paradigm for enhancing or suppressing the perceived sweetness of natural and manufactured products. In the first studies it was shown that some of the most abundant volatiles do not contribute to consumer liking or sweetness while other less abundant ones do. Aroma volatiles make contributions to perceived sweetness independent of sugar concentration, suggesting a novel way to increase perception of sweetness or suppress the perception of other taste qualities, such as bitter, without adding sugar or other sugar-substitutes. In the present studies, additional, rigorous, regression analysis on the full dataset, without regard to structural similarity volatile compounds, revealed that previously unpredicted volatile compounds had an independent contribution to perceived sweetness and that combinations of these volatile compounds can significantly enhance the perception of sweetness of a sweet comestible without increasing the amount of sugar or other natural or artificial sweetener.

Thus, in embodiments of the present disclosure, the volatile compounds associated with perceived sweetness can be combined to modify the perceived sweetness of a comestible. The data in the examples below also demonstrates that a significant sweet enhancement effect of greater than about 2× in an aqueous glucose solution (as determined by tasting panels) can be obtained when more than about 25 of the sweet-enhancing volatile compounds are included in the solution (see Example 6). An even greater enhancement, of about 3-4× can be obtained when about 25 or more (35 or more, 45 or more, 50 or more, etc.) sweet-enhancing volatile compounds from a combination of different fruits are combined (Example 6). Thus, in embodiments, a sweetness enhancing composition can be made that combines 24 or more, 25, or more, 28 or more, 30 or more, 32 or more 35 or more, 40 or more, 45 or more, 50 or more, and so on, of the volatile compounds listed in the discussion above (or, in embodiments, those listed in Table 1) that have been positively associated with perceived sweetness. In embodiments, a sweetness enhancing composition can include from about 24 to all 54 of the volatile compounds from Table 1, where any integer range between 25 and 54 are included. In embodiments, the composition includes isolated volatiles from 2 or more different fruits. In embodiments it includes isolated volatiles from 4 or more fruits. In embodiments, it includes volatile compounds from each of tomato, strawberry, and orange. In embodiments, it includes volatile compounds from each of tomato, strawberry, orange and blueberry.

In embodiments, the sweetness enhancing composition can be added to/combined with a manufactured comestible to enhance perceived sweetness of the comestible. Manufactured comestibles can include, but are not limited to, food items, beverages, medications, and the like as well as other items meant to be tasted by the consumer even if not swallowed (e.g., tobacco). The modification can includes increasing the perceived sweetness or suppressing the perceived sweetness of a comestible. Perceived sweetness can be enhanced by including volatile compounds that increase the perceived sweetness of a comestible by increasing the perception of sweet taste without addition of natural or artificial sweeteners. This increase in perceived sweet can also be used in certain comestibles to suppress other taste qualities such as bitter (e.g., in medications) or sour (e.g., in certain fruit products).

Thus, embodiments of the present disclosure include methods of modifying the perceived sweetness of a manufactured comestible by including in the comestible a sweetness enhancing composition of the present disclosure. The examples below illustrate that the volatile compounds from Table 1 produce a positive effect on perceived sweetness. In other words, these volatile compounds act to increase the perceived sweetness of a comestible. While each individual volatile has been tested and identified (see the Examples) as having a contribution to perceived sweetness, independent of sugars, a single volatile compound (or even a combination of 5-10) would not likely have a relevant effect on the perceived sweetness of a comestible. However, the combined effect from multiple of these sweet-associated volatiles produces an even greater increase in perceived sweetness.

As shown in Example 6, in testing sucrose solutions mixed with various combinations of volatile compounds, a combination of 11 volatiles was found to have a significant effect on enhancing perceived sweetness. Combinations of 24 strawberry volatiles had a slightly greater effect on perceived sweetness, at about 1.5×, but combining the total of all 35 volatiles from the two different fruits had nearly a 2× enhancement on perceived sweetness while not otherwise detracting from taste/or flavor perception. Thus, embodiments of the present disclosure for methods of increasing the perceived sweetness of a comestible include adding a sweetness enhancing composition to the composition, where the sweetness enhancing composition includes 25 or more volatile compounds chosen from the sweet-enhancing volatile compounds listed above. In embodiments of the present disclosure for methods of increasing the perceived sweetness of a comestible, embodiments include adding a sweetness enhancing composition to the composition, where the sweetness enhancing composition includes isolated volatile compounds chosen from the compounds of Table 1. In embodiments the 25 or more volatiles include volatile compounds identified from 2 or more fruits. In embodiments the 25 or more volatiles include volatile compounds identified from at least 3 fruits or at least 4 fruits from Table 1. In embodiments the volatile compounds include at least one volatile compound identified from each of tomato, strawberry, orange, and blueberry. In embodiments, from 25 to all 54 sweet-enhancing volatiles from 4 different fruits in Table 1 are added to a comestible. In embodiments, the volatiles are combined in a sweetness enhancing composition. In embodiments, the sweetness enhancing composition may include the volatile compounds in a solution. In other embodiments, the sweetness enhancing composition may include the volatile compounds mixed with a consumable dry powder, paste, gel, oil or other food grade carrier.

In embodiments, the sweetness enhancing composition may include the volatile compounds in about the amounts and/or concentrations shown in Table 11, below. In embodiments, the concentration of each volatile compound is enough such that the compound can have a relevant contribution to perceived sweetness but the concentration is not so great that it provides a distinguishable flavor/aroma. Example amounts of compounds are provided in Table 11 based on detailed mathematical calculation explained in more detail in Example 7 below.

As demonstrated by the examples below, these volatile compounds make an independent contribution to perceived sweetness, and thus, modify the perceived sweetness of a comestible without any alteration in the amount of natural or artificial sweeteners or other taste compounds present in the comestible. In embodiments, a comestible of the present disclosure with 25 or more of the volatile compounds of the present disclosure has a greater perceived sweetness than a comestible including fewer (e.g., 5, 10, and so on) of the volatile compounds. Compositions of the present disclosure can also include a sweetener composition that includes a sugar or sugar-substitute (e.g., artificial sweetener) in combination with a sweetness enhancing composition comprising 25 or more, 30 or more, 40 or more, 50 or more, etc. of the volatile compounds of the present disclosure. In embodiments the sweetener composition includes from 24 to all 55 of the sweet enhancing volatile compounds from Table 1. In embodiments, the composition includes the volatile compounds in the composition in a mean concentration (as ppm) as shown in the second column of Table 11 labeled mean concentration. This concentration was identified to be the concentration at which the volatile was biologically relevant in fruit, as determined by the tasting studies and analysis and described in greater detail in Example 7 below.

Additional details regarding the tasting panels, the chemical composition of the tomato cultivars, the analysis of chemical composition and liking scores, the volatile analysis and regression analysis for association with sweet perception can be found in the Examples below. The specific examples below are to be construed as merely illustrative, and not limitative of the remainder of the disclosure in any way whatsoever. Without further elaboration, it is believed that one skilled in the art can, based on the description herein, utilize the present disclosure to its fullest extent. All publications recited herein are hereby incorporated by reference in their entirety.

It should be emphasized that the embodiments of the present disclosure, particularly, any "preferred" embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure, and protected by the following embodiments.

Descriptive Embodiments

Descriptions of some examples of embodiments of the compositions and methods of the present disclosure are provided below, but are not intended to be limiting of the disclosure. The present disclosure includes a sweetener composition comprising a natural sweetener, an artificial sweetener, or both; and a sweetness enhancing composition comprising each of the following isolated volatile compounds in the following amounts: about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; about 0.051494 ppm of (Z)-,β-sinensal; an effective amount of of β-caryophyllene oxide; and an effective amount of 2-heptanone.

Embodiments of the present disclosure include a sweetener composition as above, wherein the sweetener comprises a natural sweetener selected from the group of sugars consisting of: glucose, fructose, and sucrose.

Embodiments of the present disclosure include a sweetener composition as above, wherein the composition is an aqueous composition.

Embodiments of the present disclosure include a sweetener composition as above, wherein the composition is a powder.

Embodiments of the present disclosure include a sweetener composition as above, wherein the sweetness enhancing composition consists of each of the specified isolated volatile compounds in the specified amounts.

The present disclosure includes a sweetener composition comprising a natural sweetener, an artificial sweetener, or both; and a sweetness enhancing composition comprising about 25 of the following isolated volatile compounds in the following amounts: about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; about 0.051494 ppm of (Z)-,β-sinensal; an effective amount of of β-caryophyllene oxide; and an effective amount of 2-heptanone.

Embodiments of the present disclosure include a sweetener composition as above, wherein the sweetness enhancing composition comprises 35 or more of the isolated volatile compounds.

Embodiments of the present disclosure include a sweetener composition as above, wherein the sweetness enhancing composition comprises 45 or more of the isolated volatile compounds.

Embodiments of the present disclosure include a sweetener composition as above, wherein about 3 of the isolated volatile compounds in the composition each come from a different fruit selected from: strawberry, tomato, orange, and blueberry.

Embodiments of the present disclosure include a sweetener composition as above, wherein about 4 of the isolated volatile compounds in the composition are each from a different fruit selected from: strawberry, tomato, orange, and blueberry.

Embodiments of the present disclosure include a sweetener composition as above, wherein from 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone.

Embodiments of the present disclosure include a sweetener composition as above, wherein about one of the isolated volatile compounds is selected from β-caryophyllene oxide and 2-heptanone.

Embodiments of the present disclosure include a sweetener composition as above, wherein about 5-13 of the isolated volatile compounds are selected from: trans-2-pentenal, cis-3-hexen-1-ol, β-cyclocitral, geranylacetone, butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a sweetener composition as above, wherein about one of the isolated volatile compounds is selected from β-caryophyllene oxide and 2-heptanone; about 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone; about 1-4 of the isolated volatile compounds are selected from: trans-2-pentenal, cis-3-hexen-1-ol, β-cyclocitral, and geranylacetone; and about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal The present disclosure includes a sweetener composition for increasing the perceived sweetness of a comestible, the composition comprising a natural sweetener, an artificial sweetener, or both; and a sweetness enhancing composition comprising about 25 of the isolated volatile compounds chosen from the group consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3 (2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone.

Embodiments of the present disclosure include a sweetener composition as above, wherein the sweetness enhancing composition comprises 35 or more of the isolated volatile compounds.

Embodiments of the present disclosure include a sweetener composition as above, wherein the sweetness enhancing composition comprises 45 or more of the isolated volatile compounds.

Embodiments of the present disclosure include a sweetener composition as above, wherein about 3 of the isolated volatile compounds in the composition each come from a different fruit selected from: strawberry, tomato, orange, and blueberry.

Embodiments of the present disclosure include a sweetener composition as above, wherein about 4 of the isolated volatile compounds in the composition are each from a different fruit selected from: strawberry, tomato, orange, and blueberry.

Embodiments of the present disclosure include a sweetener composition as above, wherein from 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone.

Embodiments of the present disclosure include a sweetener composition as above, wherein about one of the isolated volatile compounds is selected from β-caryophyllene oxide and 2-heptanone.

Embodiments of the present disclosure include a sweetener composition as above, wherein about 5-13 of the isolated volatile compounds are selected from: trans-2-pentenal, cis-3-hexen-1-ol, β-cyclocitral, geranylacetone, butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a sweetener composition as above, wherein about one of the isolated volatile compounds is selected from β-caryophyllene oxide and 2-heptanone; about 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone; about 1-4 of the isolated volatile compounds are selected from: trans-2-pentenal, cis-3-hexen-1-ol, β-cyclocitral, and geranylacetone; and about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a sweetener composition as above, wherein the sweetener composition consists of the natural sweetener, artificial sweetener, or both; and from 25 to all 54 of the volatile compounds.

The present disclosure includes a sweetness enhancing composition for increasing the perceived sweetness of a comestible, the composition comprising a combination of about 25 of the isolated volatile compounds chosen from the group consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone; and wherein the sweetness enhancing composition does not contain a sugar or artificial sweetener and the volatile compounds are present in amounts effective to increase the perceived sweetness of a comestible containing a natural or artificial sweetener, or both, without increasing the amount of the natural or artificial sweetener in the comestible.

Embodiments of the present disclosure include a sweetness enhancing composition as above, wherein the sweetness enhancing composition comprises 35 or more of the isolated volatile compounds.

Embodiments of the present disclosure include a sweetness enhancing composition as above, wherein the sweetness enhancing composition comprises 45 or more of the isolated volatile compounds.

Embodiments of the present disclosure include a sweetness enhancing composition as above, wherein about 3 of the isolated volatile compounds in the composition each come from a different fruit selected from: strawberry, tomato, orange, and blueberry.

Embodiments of the present disclosure include a sweetness enhancing composition as above, wherein about 4 of the isolated volatile compounds in the composition are each from a different fruit selected from: strawberry, tomato, orange, and blueberry.

Embodiments of the present disclosure include a sweetness enhancing composition as above, wherein from 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone.

Embodiments of the present disclosure include a sweetness enhancing composition as above, wherein about one of the isolated volatile compounds is selected from β-caryophyllene oxide and 2-heptanone.

Embodiments of the present disclosure include a sweetness enhancing composition as above, wherein about 5-13 of the isolated volatile compounds are selected from: trans-2-pentenal, cis-3-hexen-1-ol, β-cyclocitral, geranylacetone, butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a sweetness enhancing composition as above, wherein about one of the isolated volatile compounds is selected from β-caryophyllene oxide and 2-heptanone; about 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone; about 1-4 of the isolated volatile compounds are selected from: trans-2-pentenal, cis-3-hexen-1-ol, β-cyclocitral, and geranylacetone; and about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a sweetness enhancing composition as above, wherein the sweetener composition consists of the natural sweetener, and artificial sweetener, or both; and from 25 to all 54 of the volatile compounds.

The present disclosure includes a sweetener composition comprising a natural sweetener, an artificial sweetener, or both; and a sweetness enhancing composition comprising at least 25 of the following isolated volatile compounds: (E)-2-heptenal 1-pentanol; 2,5-dimethyl-4-hydroxy-3(2H)-furanone; 4-carene; 6-methyl-5-hepten-2-ol; b-ionone; cis-3-hexen-1-ol; cis-4-decenal; geranial; hexyl alcohol; isopentyl acetate; isovaleric acid; neral; propyl acetate; trans,trans-2,4-decadienal; trans-2-pentenal; pentadecane; octyl acetate; heptanal; γ-Selinene; methyl octanoate; E,E-alloocimene; Silane, trimethyl[5-methyl-2-(1-methylethyl)phenoxy]; Malonic acid, bis(2-trimethylsilylethyl ester); hexanal; vanillin; α-panasinsen; 4-thujene; nonanal; 2-Penten-1-ol, (Z)-; 4-(1-methylethenyl)-1-cyclohexene-1-methanol acetate; 1-cadinene; carveol, trans 1-octen-3-one; γ-vetivenene; pentanal; α-selinene; α-terpineol; dodecanal; carvone; neryl propanoate/Geranyl isobutanoate; hexyl butanoate; valencene; E-2-hexenal; copaene; α-ionone; (E)-2-Decen-1-al; (E)-2-Hexen-1-yl butyrate; (E)-2-Hexenal; (E)-2-Penten-1-al; (Z)-2-Penten-1-al; 1-Pentene-3-one; 2,3-Heptanedione; 2-Ethylhexyl acetate; 2-Hexanone; 2-Methyl butyric acid; 2-Methyl-2-butanol; 2-Octenal; 2-Pentyl butyrate; 3-Ethyloctane; 3-Hexanone; 4-Methoxy-2,5-dimethyl-3(2H)-furanone; 6-Methyl-5-heptene-2-one; Amyl acetate; Amyl butyrate; Benzyl acetate; Butyl acetate; Butyl butanoate; Butyl isovalerate; Ethyl butyrate; Ethyl caproate; Ethyl octanoate; Hexanal; Hexyl acetate; hexyl alcohol; Hexyl butyrate; Isopropyl butyrate; Isopropyl hexanoate; Methyl thiobutyrate; Myrtenal; Octyl butanoate; Octyl hexanoate; Octyl isovalerate; Propyl butanoate; 2-heptanone; 2-Octanone; hexanal; methyl isovalerate; and acetone wherein the at least 25 isolated comprises volatile compounds are from at least 3 different fruits.

Embodiments of the present disclosure include a sweetener composition as above, wherein the sweetener composition comprises 35 or more of the isolated volatile compounds.

Embodiments of the present disclosure include a sweetener composition as above, wherein the sweetener composition comprises 45 or more of the isolated volatile compounds.

Embodiments of the present disclosure include a sweetener composition as above, wherein the sweetener composition comprises all of the isolated volatile compounds.

Embodiments of the present disclosure include a sweetener composition as above, wherein about 3 of the isolated volatile compounds in the composition each come from a different fruit selected from: strawberry, tomato, orange, and blueberry.

Embodiments of the present disclosure include a sweetener composition as above, wherein about 4 of the isolated volatile compounds in the composition are each from a different fruit selected from: strawberry, tomato, orange, and blueberry.

The present disclosure includes a method comprising increasing the perceived sweetness of a manufactured comestible that contains a natural or artificial sweetener by adding to the manufactured comestible, a sweetness enhancing composition effective to increase the perceived sweetness of the comestible by a factor of about 2×, without the addition of any natural or artificial sweeteners, the sweetness enhancing composition comprising the following isolated volatile compounds in the following amounts: about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; about 0.051494 ppm of (Z)-,β-sinensal; an effective amount of of β-caryophyllene oxide; and an effective amount of 2-heptanone.

Embodiments of the present disclosure include a method as above, wherein the perceived sweetness is increased by a factor of at least 2×.

Embodiments of the present disclosure include a method as above, wherein the sweetness enhancing composition comprises 35 or more of the isolated volatile compounds.

Embodiments of the present disclosure include a method as above, wherein the sweetness enhancing composition comprises 45 or more of the isolated volatile compounds.

Embodiments of the present disclosure include a method as above, wherein the sweetness enhancing composition comprises from 25 to all 54 of the isolated volatile compounds.

Embodiments of the present disclosure include a method as above, wherein the sweetness enhancing composition does not include a natural or artificial sweetener.

Embodiments of the present disclosure include a method as above, wherein about 3 of the isolated volatile compounds in the composition each come from a different fruit selected from: strawberry, tomato, orange, and blueberry.

Embodiments of the present disclosure include a method as above, wherein about 4 of the isolated volatile compounds in the composition are each from a different fruit selected from: strawberry, tomato, orange, and blueberry.

Embodiments of the present disclosure include a method as above, wherein from 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone.

Embodiments of the present disclosure include a method as above, wherein about one of the isolated volatile compounds is selected from β-caryophyllene oxide and 2-heptanone.

Embodiments of the present disclosure include a method as above, wherein about 5-13 of the isolated volatile compounds are selected from: trans-2-pentenal, cis-3-hexen-1-ol, β-cyclocitral, geranylacetone, butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a method as above, wherein about one of the isolated volatile compounds is selected from β-caryophyllene oxide and 2-heptanone; about 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone; about 1-4 of the isolated volatile compounds are selected from: trans-2-pentenal, cis-3-hexen-1-ol, β-cyclocitral, and geranylacetone; and about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal Embodiments of the present disclosure include a method as above 1, wherein the sweetness enhancing composition consists of 25 to all 54 of the volatile compounds and a carrier.

The present disclosure includes a method comprising increasing the perceived sweetness of a comestible by adding to a manufactured comestible a sweetness enhancing composition comprising 25 or more isolated volatile compounds in an amount effective to increase the perceived sweetness of the comestible, the volatile compounds chosen from the group consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone, wherein the volatile compounds increase the perceived sweetness of the comestible without increasing an amount of natural or artificial sweetener in the comestible.

Embodiments of the present disclosure include a method as above, wherein the perceived sweetness is increased by a factor of at least 2×.

Embodiments of the present disclosure include a method as above, wherein the perceived sweetness is increase by a factor of about 4×.

Embodiments of the present disclosure include a method as above, wherein the sweetness enhancing composition comprises 35 or more of the isolated volatile compounds.

Embodiments of the present disclosure include a method as above, wherein the sweetness enhancing composition comprises 45 or more of the isolated volatile compounds.

Embodiments of the present disclosure include a method as above, wherein the sweetness enhancing composition comprises from 25 to all 54 of the isolated volatile compounds.

Embodiments of the present disclosure include a method as above, wherein the sweetness enhancing composition does not include a natural or artificial sweetener.

Embodiments of the present disclosure include a method as above, wherein about 3 of the isolated volatile compounds in the composition each come from a different fruit selected from: strawberry, tomato, orange, and blueberry.

Embodiments of the present disclosure include a method as above, wherein about 4 of the isolated volatile compounds in the composition are each from a different fruit selected from: strawberry, tomato, orange, and blueberry.

Embodiments of the present disclosure include a method as above, wherein from 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone.

Embodiments of the present disclosure include a method as above, wherein about one of the isolated volatile compounds is selected from β-caryophyllene oxide and 2-heptanone.

Embodiments of the present disclosure include a method as above, wherein about 5-13 of the isolated volatile compounds are selected from: trans-2-pentenal, cis-3-hexen-1-ol, β-cyclocitral, geranylacetone, butyl butanoate, 2-pentyl butyrate, propyl butanoate, butyl isovalerate, octyl butanoate, amyl butyrate, 2-methyl butyric acid, (E)-2-decen-1-al, and myrtenal.

Embodiments of the present disclosure include a method as above, wherein about one of the isolated volatile compounds is selected from β-caryophyllene oxide and 2-heptanone; about 2-17 of the isolated volatile compounds are chosen from: methyl octanoate, hexanal, vanillin, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol, (Z)-, β-sinensal, β-caryophyllene oxide, and 2-heptanone; about 1-4 of the isolated volatile compounds are selected from: trans-2-pentenal, cis-3-hexen-1-ol, β-cyclocitral, and geranylacetone; and about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal Embodiments of the present disclosure include a method as above, wherein the sweetness enhancing composition consists of 25 to all 54 of the volatile compounds and a carrier.

The present disclosure includes a method comprising increasing the perceived sweetness of a comestible by adding to a manufactured comestible a sweetness enhancing composition comprising at least 25 isolated volatile compounds in an amount effective to increase the perceived sweetness of the comestible, the volatile compounds comprising: (E)-2-heptenal 1-pentanol; 2,5-dimethyl-4-hydroxy-3(2H)-furanone; 4-carene; 6-methyl-5-hepten-2-ol; b-ionone; cis-3-hexen-1-ol; cis-4-decenal; geranial; hexyl alcohol; isopentyl acetate; isovaleric acid; neral; propyl acetate; trans,trans-2,4-decadienal; trans-2-pentenal; pentadecane; octyl acetate; heptanal; γ-Selinene; methyl octanoate; E,E-alloocimene Silane, trimethyl[5-methyl-2-(1-methylethyl)phenoxy]; Malonic acid, bis(2-trimethylsilylethyl ester); hexanal; vanillin; α-panasinsen; 4-thujene; nonanal; 2-Penten-1-ol, (Z)-; 4-(1-methylethenyl)-1-cyclohexene-1-methanol acetate; β-cadinene; carveol, trans 1-octen-3-one; γ-vetivenene; pentanal; α-selinene; α-terpineol; dodecanal; carvone; neryl propanoate/Geranyl isobutanoate; hexyl butanoate; valencene; E-2-hexenal; copaene; α-ionone; (E)-2-Decen-1-al; (E)-2-Hexen-1-yl butyrate; (E)-2-Hexenal; (E)-2-Penten-1-al; (Z)-2-Penten-1-al; 1-Pentene-3-one; 2,3-Heptanedione; 2-Ethylhexyl acetate; 2-Hexanone; 2-Methyl butyric acid; 2-Methyl-2-butanol; 2-Octenal; 2-Pentyl butyrate; 3-Ethyloctane; 3-Hexanone; 4-Methoxy-2,5-dimethyl-3(2H)-furanone; 6-Methyl-5-heptene-2-one; Amyl acetate; Amyl butyrate; Benzyl acetate; Butyl acetate; Butyl butanoate; Butyl isovalerate; Ethyl butyrate; Ethyl caproate; Ethyl octanoate; Hexanal; Hexyl acetate; hexyl alcohol; Hexyl butyrate; Isopropyl butyrate; Isopropyl hexanoate; Methyl thiobutyrate; Myrtenal; Octyl butanoate; Octyl hexanoate; Octyl isovalerate; Propyl butanoate; 2-heptanone; 2-Octanone; hexanal; methyl isovalerate; and acetone, wherein the at least 25 isolated comprises volatile compounds are from at least 3 different fruits.

Embodiments of the present disclosure include a method as above, wherein the sweetness enhancing composition comprises 35 or more of the isolated volatile compounds.

Embodiments of the present disclosure include a method as above, wherein the sweetness enhancing composition comprises 45 or more of the isolated volatile compounds.

Embodiments of the present disclosure include a method as above, wherein the sweetness enhancing composition comprises all of the isolated volatile compounds Embodiments of the present disclosure include a method as above, wherein about 3 of the isolated volatile compounds in the composition each come from a different fruit selected from: strawberry, tomato, orange, and blueberry.

Embodiments of the present disclosure include a method as above, wherein about 4 of the isolated volatile compounds in the composition are each from a different fruit selected from: strawberry, tomato, orange, and blueberry.

Embodiments of the present disclosure include a method as above, wherein the perceived sweetness is increased by a factor of at least 2×.

Embodiments of the present disclosure include a method as above, wherein the perceived sweetness is increase by a factor of about 4×.

The following examples are put forth so as to provide those of ordinary skill in the art with a complete disclosure and description of how to perform the methods and use the compositions and compounds disclosed herein. Efforts have been made to ensure accuracy with respect to numbers (e.g., amounts, temperature, etc.), but some errors and deviations should be accounted for. Unless indicated otherwise, parts are parts by weight, temperature is in °C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Tomato Liking and Volatile Assessment

The present example describes how tasting panels were conducted on tomato fruit (and in Examples 3, 4, and 5 below on strawberries, blueberries, and orange juice) to assess various characteristics, such as overall liking, sweetness, etc. Targeted metabolomics and natural variation in flavor-associated sugars, acids and aroma volatiles were analyzed to evaluate the chemistry of the tested tomato fruits, creating a predictive and testable model of liking. This non-traditional approach provided novel insights into flavor chemistry, the interactions between taste and retronasal olfaction and a paradigm for enhancing liking of natural products. The results and analysis below also show that aroma some volatiles make contributions to perceived sweetness independent of sugar concentration, providing novel methods to increase perception of sweetness without adding sugar or other natural or artificial sugar-substitute.

Experimental Procedures

Plant Material.

Commercial tomato seeds were obtained from Seeds of Change (Santa Fe, N. Mex.), Totally Tomatoes (Randolph, Wis.) or Victory Seed Co. (Molalla, Oreg.). Most varieties selected were described as heirloom, open-pollinated varieties. Plants were grown in the field at the University of Florida North Florida Research and Education Center-Suwannee Valley in the spring or fall seasons or the greenhouse at Gainesville, Fla. Supermarket tomatoes were obtained from a local supermarket in Gainesville, Fla.

Biochemical Analysis.

Volatile collection was performed as described (16). Volatile compound identification was determined by GC-MS and co-elution with known standards (Sigma-Aldrich, St. Louis, Mo.). Sugars, acids and Brix were determined as described in (13).

Sensory Analysis.

Fully ripe fruit were harvested, and used for taste panels. A random subset of fruit was used for biochemical analysis. Three biological replicates, each consisting of 2-20 fruit (depending on fruit size), were assayed for each variety. A group of 170 tomato consumers (64 male, 106 female) were recruited to evaluate all the varieties. Panelists were between the ages of 18 and 78 with a median age of 22. Panelists self-classified themselves as 101 White/Caucasian, 14 Black/African-American, 32 Asian/Pacific and 25 Other. An average of 85 (range of 66-95) of these panelists evaluated between 4-6 varieties in a session. All panelists went through a training session to familiarize them with the scaling and procedures. Tomatoes were sliced into wedges (or in halves for grape/cherry types) and each panelist was given two pieces for evaluation. Panelists took a bite of each sample, chewed and swallowed it, and rated overall liking and liking for texture. They then rated the perceived intensities of sweetness, sourness, saltiness, umami sensation, bitterness and overall tomato flavor. They were free to take as many bites as necessary to complete the assessments. They were instructed to take a bite of an unsalted cracker and a sip of water between samples. Samples were presented to the panelists in a randomized order. Hedonic ratings used the hedonic gLMS. This scale assesses the liking for tomatoes in the context of all pleasure/displeasure experiences: 0=neutral, −100=strongest disliking of any kind experienced, and +100=strongest liking of any kind experienced. Sensory intensity ratings used the gLMS (7,8,19). This scale assesses taste and flavor sensations in the context of all sensory experience (7): 0=no sensation, 100=strongest sensation of any kind experienced. Both scales were devised to provide valid comparisons across subjects.

Statistical Analysis.

The 68 chemical compounds measured in this experiment were initially divided into six groups based upon biochemical properties: sugars, branched chain amino acids, lipids, carotenoids, phenolics, and acids. A small number of compounds for which biosynthetic pathways are not established were assigned to one of the six classes based upon their correlations with other classified compounds. All pairwise correlations among the set of 68 compounds were calculated. Correlation coefficients were sorted using Modulated Modularity Clustering (MMC) (9) as a visual aid for identifying compounds that are closely related in this sample. Biochemical groups were examined for compounds within the group that were highly correlated and compounds that were upstream in the relevant metabolic pathways were preferentially selected. The selection process resulted in 27 compounds that were representative of each of the 6 biochemical groups, and limited the amount of correlation between compounds. The set of 27 was examined using MMC and the result confirmed that the pairwise correlation had been reduced. An exploratory factor analysis did not reveal obvious structure among the remaining compounds (data not shown). For example, the lipids did not all load together on a single factor.

Benzothiazole, butylacetate, cis-3-hexen-1-ol, citric acid, fructose, geranial, methional, 3-methyl-1-butenol, 2-methylbutanal, 1-octen-3-one, phenylacetaldehyde and trans,trans-2,4,decadienal were associated with flavor intensity in univariate models. 2-Butylacetate, cis-3-hexen-1-ol, citric acid, 3-methyl-1-butenol,2-methylbutanal, 1-octen-3-one and trans,trans-2,4-decadienal were significant after accounting for fructose. Butylacetate, 4-carene, cis-3-hexen-1-ol, eugenol, fructose, geranial guaiacol, heptaldehyde, methional, 3-methyl-1-butenol, 2-methylbutanal, and phenylacetaldehyde all showed evidence for association with sweetness in univariate models, and geranial, 3-methyl-1-butenol,2-methylbutanal were significant after accounting for fructose. All analyses were performed in SAS v 9.2.

Results and Discussion

The chemical diversity within tomato varieties. Tomato flavors are primarily generated by a diverse set of chemicals including sugars (glucose and fructose), acids (citrate, malate and glutamate) and multiple, less well defined volatiles. Of the more than 400 volatiles that are detectable in fruits, only about 16 were predicted to contribute to tomato flavor based on their concentrations in fruit and odor thresholds (odor units). To bring focus on which chemicals truly drive liking and establish a molecular blueprint of tomato flavor, a chemical profile of 278 samples was assembled, representing 152 heirloom varieties. These varieties mostly predate intensive breeding of modern commercial tomatoes. Levels of glucose, fructose, citrate, malate, and 28 volatiles were determined, most over multiple seasons (full data not included). Molecular studies indicate that there is a relatively low rate of DNA sequence diversity within the cultivated tomato, Solanum lycopersicum, consistent with a genetic bottleneck associated with two periods of domestication in Central America and Europe. The observed variation in volatile contents of as much as three thousand-fold across the cultivars was therefore somewhat surprising (Table 2, below).

This unexpectedly large chemical diversity within the heirloom population provided an unprecedented opportunity to examine the interactions between sugars, acids and volatiles with taste and olfaction. Sensory analyses were conducted with a consumer panel on a subset of the cultivars exhibiting the most chemical diversity. Panelists rated overall liking of each variety as well as the overall tomato flavor intensity, sweetness and sourness on sensory and hedonic versions of the general Labeled Magnitude Scale (gLMS) (see Bartoshuk, et al., 2003 and Bartoshuk, et al., 2005). Thirteen panels rated 66 different cultivars as well as supermarket-purchased varieties over three seasons (full taste panel data not presented here). Several cultivars were repeated in multiple seasons. Random samples of each set were removed for chemical analysis with the number of measured chemical attributes expanded to 68. The taste panels were performed over three seasons and fruit were either grown in the field or a greenhouse or purchased from a local supermarket were also tasted and analyzed. The full taste panel and biochemical data are too voluminous for reproduction here, but the full data set and initial analysis of results are presented in Tieman, D., et al. 2012, and U.S. patent application Ser. No. 13/869,132 both which are hereby incorporated by reference herein in their entirety.

The Relationship Between Chemistry and Preferences.

Due to the large number of chemicals potentially influencing liking, a multivariate analysis of the data was performed. The attributes were initially partitioned into six groups based upon chemical properties and biosynthetic pathways: sugars, branched chain amino acids, fatty acids, carotenoids, phenolics, and acids. In a previous analysis of the data, compounds for which biosynthetic pathways are not established were assigned to one of the six classes based upon their correlations with other classified compounds (see Stone, et al., 2009). Groups of structurally related chemicals with known metabolic links were examined for compounds within each module that were highly colinear and compounds that were upstream in relevant metabolic pathways were preferentially selected. The selection process used during this previous analysis reduced the set to 27 compounds. Flavor intensity was associated with 12 different compounds, seven of which were independently significant after accounting for fructose: 2-butylacetate, cis-3-hexen-1-ol, citric acid, 3-methyl-1-butenol, 2-methylbutanal, 1-octen-3-one and trans,trans-2,4-decadienal. Sweetness was associated with 12 compounds, eight of which overlap with those associated with flavor. At least three of these compounds were independent predictors of sweetness after accounting for fructose: geranial, 2-methylbutanal and 3-methyl-1-butanol.

Interactions between taste (sweetness) and retronasal olfaction are of considerable interest in the chemical senses. The present example provides evidence for these interactions in a natural food product: the tomato. Although sweetness of tomatoes is widely thought to result from sugars, volatiles proved to be important contributors to sweetness. Volatiles are perceived in two ways. They can be sniffed through the nostrils (orthonasal olfaction) or when foods containing volatiles and chewed and swallowed, volatiles are forced up behind the palate into the nasal cavity from the back (retronasal olfaction). Orthonasal olfaction is commonly called "smell;" retronasal olfaction contributes to "flavor." Retronasal olfaction and taste interact in the brain. Commonly paired taste and retronasal olfactory sensations can become associated such that either sensation can induce the other centrally. Although instances of volatile-induced tastes of sweet, sour, bitter and salty have been observed, sweet is the most common (see Salles, et al., 2006). Multiple regression with sweetness as the dependent variable showed that the perception of tomato flavor (retronasal olfaction) made a significant contribution to sweetness after accounting for fructose ($p<0.0001$).

The contributions, or lack thereof, for certain volatiles were somewhat unexpected. Prior lists of important tomato flavor volatiles were compiled based largely on odor unit values (Buttery, et al., 1987). These data indicate that some of these volatiles with high odor unit values, such as β-damascenone and phenylacetaldehyde, are not associated with tomato flavor intensity although they have historically been considered to be important contributors to flavor. Damascenone, in particular, was considered to be important to tomato flavor because of its extremely low reported odor threshold. Additionally, while the earlier analysis identified about 6 sweet-enhancing volatiles from tomato, a revised multivariate regression analysis performed as described in Example 2 provided a somewhat different list of 11 volatile compounds.

Given the growing understanding of interactions between taste and retronasal olfaction, it was not unexpected that the correlations between certain volatiles and sugars contribute to the perceived sweetness of tomato fruits, it was the identity of some of the sweet-enhancing volatiles that was unexpected. Notably, the apocarotenoid geranial was positively correlated with sweetness. This aspect of the model was then independently validated; tomato mutants specifically deficient in carotenoid biosynthesis are deficient in apocarotenoid volatiles, including geranial, 6-methyl-5-hepten-2-one and β-ionone, but unaltered in sugars, acids and non-apocarotenoid volatiles. They are perceived as less sweet by consumers, validating the contribution of geranial to sweetness (see vogel, et al., 2010). Consistent with a model in which liking is a function of sweetness and flavor, apocarotenoid-deficient fruits are also significantly less liked by consumers. In a complementary experiment, Baldwin et al., (2008) have shown that adding sugars or acids can alter the perception of tomato aroma volatiles.

The positive association of sweet perception with volatiles, such as geranial, suggests that these volatiles could be used as a replacement for a portion of the sugars used in processed foods, thus reducing caloric content.

Conclusions

The present example exploited the natural chemical variation within tomato to determine the chemical interactions that drive consumer liking. These data illustrate the challenge of understanding flavor, and consumer preferences in particular, in a natural product. Taken together, the results provided new insights into flavor and liking and illustrate the flaws in a traditional approach based on odor units. The presence of a molecule, even at a relatively high level, does not mean that it significantly contributes to either flavor or liking. Models based on concentration and odor thresholds of individual volatiles cannot account for synergistic and antagonistic interactions that occur in complex foods such as a tomato fruit. Previous concepts of the most important volatile contributors to human food preferences based on odor units must be reevaluated.

Example 2: Multiple Regression Analysis of Tomato Liking Data

Application of multiple regression analysis to the tomato data from Example 1 above led to the discovery that a surprising amount of the sweetness of the tomato resulted from an independent contribution of the volatiles. Although the primary contribution of the perceived sweetness in tomato is contributed by the sugars, it was found that some volatiles and combinations contributed to the perception of sweetness independent of the amount of sugar in the tomato. Multiple regression analysis demonstrated that the flavor (retronasal olfaction) is contributing independently to the perceived sweetness.

Initial Analysis of the Data

In conducting the multiple regression analysis on the tomato data set, the independent variables were the sugar content (glucose+fructose), and the flavor (indicated by the retronasal perception of volatiles), while the dependent variable was the perceived sweetness.

The results of an initial analysis based on regression analysis of volatile compounds grouped by biochemical relatedness are presented in Table 3, where volatile compounds having a significance score of less than about 0.05 were considered as having a significant independent contribution to perceived sweetness, though some compounds with a score greater than 0.05 may still contribute to perceived sweetness (e.g., geranial). Analysis of individual volatile compounds that demonstrated a contribution to induced sweetness was conducted (data not shown).

As demonstrated by the data, both sugar and flavor were significant, independent contributors to sweetness.

Sugar: $p<0.001$
Flavor: $p<0.001$

Based on this analysis: the sugars contribute 63.9% of the variance in sweetness, while flavor contributes 7.6%. This demonstrates sweet enhancement caused by the retronasal olfactory input from all of the volatiles in the tomato. While some earlier studies have recognized that certain specific individual volatiles can contribute to the perception of sweet taste, they had not identified many of the contributing volatiles demonstrated in this analysis having a significant contribution (positive or negative) to the perception of sweet taste. Nor had previous studies considered how the individual flavor/taste effects might add. The additivity of the volatiles represents another mechanism for further enhancing or inhibiting perceived sweetness without the addition of sugars or other sugar substitutes.

Revised Multiple Regression Analysis of Tomato Data

It was believed that the initial analysis of the tomato data may have been incomplete with respect to the identification of sweet-enhancing volatiles, due to the grouping of volatiles into categories based on similar biochemical structure. Thus, additional analysis of the full dataset from the taste analysis of Example 1 was conducted without any grouping of volatiles or normalizing of the data based on the groupings.

Biochemical and psychophysical data sets from fruit and fruit taste panels are mathematically probed for relationships using standard least squares and partial least squares regression modeling techniques (SAS JMP Pro 12.0.1 and R version 3.2.4 statistical software packages). The exact regression type is dependent on the structure of the data, i.e. depending on the size and distributions of the overall datasets. The regression models provide biochemical recipes for increased liking and fruit flavor; along with identify specific volatile molecules that enhance taste properties like perceived sweet. While for the initial analysis in Example 1, standard least squares regression was used, which may fail to identify all significant instances in a situation where there are a large volume of data points. In the revised analysis partial least squares regression was used because, with the extremely large data set of the fruit volatiles, this model allows the observation of a greater number of correlations.

The second analysis of the data without grouping and using the partial least squares regression modeling revealed additional volatiles associated with sweet enhancement and eliminated others that, upon further analysis, were not found to be as significant with respect to contribution to sweet perception. Table 4 provides a list of some of the volatile compounds from tomato, including all that were identified as having a contribution to perceived sweetness, independent of at least one sugar, with 15 compounds having a contribution to perceived sweetness independent of both sugars. The following volatile compounds were found to have an individual effect of enhancing perceived sweetness and selected for additional testing (see Example 6, below): trans-2-pentenal, 6-methyl-5-hepten-2-ol, 2,5-dimethyl-4-hydroxy-3(2H)-furanone, cis-3-hexen-1-ol, isopentyl acetate, 6-methyl-5-hepten-2-one, b-cyclocitral, geranial, neral, geranylacetone, and b-ionone.

These volatiles can be combined together, or with other sweet-enhancing volatiles from other foods (e.g., other fruits, such as those described in the other Examples herein) for additional enhancement of sweetness. Not only can the volatiles be used to enhance sweet, but since an increased sweet sensation can inhibit other tastes, such as bitter and sour, adding sweet-inducing volatiles in bitter or sour products can produce a central sweet that inhibits the sour or bitter taste (e.g., of medications).

TABLE 2

Observed variation in flavor volatiles within *S. lycopersicum* heirloom varieties.

| Volatile | High | Low | Fold difference | Median |
|---|---|---|---|---|
| 1-penten-3-one | 9.37 | 0.17 | 55 | 1.18 |
| isovaleronitrile | 68.45 | 0.58 | 117 | 7.63 |
| trans-2-pentenal | 5.16 | 0.31 | 17 | 1.23 |
| trans-2-heptenal | 2.71 | 0.09 | 30 | 0.42 |
| isovaleraldehyde | 51.08 | 1.55 | 33 | 8.59 |
| 3-methyl-1-butanol | 184.46 | 3.20 | 58 | 27.26 |
| methional | 1.616 | 0.012 | 137 | 0.07 |
| isovaleric acid | 0.953 | 0.004 | 262 | 0.09 |
| 2-isobutylthiazole | 63.61 | 0.37 | 174 | 8.34 |
| 6-methyl-5-hepten-2-one | 20.07 | 0.17 | 120 | 3.38 |
| β-ionone | 0.396 | 0.008 | 47 | 0.05 |
| phenylacetaldehyde | 1.90 | 0.00 | 654 | 0.24 |
| geranylacetone | 28.96 | 0.03 | 1095 | 1.22 |
| 2-phenylethanol | 5.269 | 0.002 | 3142 | 0.05 |
| isobutyl acetate | 11.93 | 0.14 | 85 | 1.67 |
| cis-3-hexen-1-ol | 124.15 | 10.00 | 12 | 40.00 |
| 1-nitro-2-phenylethane | 2.59 | 0.02 | 149 | 0.25 |
| trans,trans-2,4-decadienal | 0.30 | 0.00 | 211 | 0.02 |
| 2-methylbutanal | 14.66 | 1.14 | 13 | 3.47 |
| hexyl alcohol | 84.03 | 0.99 | 85 | 13.86 |
| guaiacol | 8.09 | 0.03 | 290 | 0.77 |
| hexanal | 381.05 | 15.55 | 25 | 88.65 |
| 1-octen-3-one | 0.312 | 0.017 | 18 | 0.07 |
| cis-3-hexenal | 399.66 | 8.29 | 48 | 71.09 |
| methylsalicylate | 14.16 | 0.00 | 3354 | 0.40 |
| trans-2-hexenal | 48.01 | 0.39 | 123 | 3.54 |
| β-damascenone | 0.1733 | 0.0020 | 86 | 0.01 |
| 2-methyl-1-butanol | 115.69 | 1.93 | 60 | 15.08 |

TABLE 3

Multiple regression analysis for volatiles identified in tomatoes. For p < about .05, the volatile makes a contribution to sweetness that is independent of the measures of sugar.

| Volatile | t | p | Odor description |
|---|---|---|---|
| neral | 2.716 | 0.008 | lemon |
| 4-carene | 2.635 | 0.01 | dry, woody, sage, thyme |
| isopentyl acetate | 2.303 | 0.024 | juicy fruit, banana, pear |
| 3-methyl-1-butanol | 2.109 | 0.038 | whiskey |
| 6-methyl-5-hepten-2-ol | 2.118 | 0.038 | oily green coriander |
| isovaleric acid | 2.039 | 0.045 | cheesy or sweaty |
| 2-methylbuteraldehyde | −1.937 | 0.056 | chocolate |
| ethyl vinyl ketone | 1.623 | 0.109 | earthy, green, pungent |
| geranial | 1.469 | 0.146 | |
| trans-2-heptenal | 1.458 | 0.149 | |
| hexanal | 1.39 | 0.169 | |
| propyl acetate | 1.38 | 0.172 | |
| geranylacetone | 1.297 | 0.199 | |
| trans-2-pentenal | 1.265 | 0.21 | |

TABLE 3-continued

Multiple regression analysis for volatiles identified in tomatoes. For p < about .05, the volatile makes a contribution to sweetness that is independent of the measures of sugar.

| Volatile | t | p | Odor description |
|---|---|---|---|
| 2,5-dimethyl-4-hydroxy-3(2H)-furanone | 1.224 | 0.225 | |
| p-anisaldehyde | 1.194 | 0.236 | |
| beta-cyclocitral | 1.186 | 0.239 | |
| methional | 1.177 | 0.243 | |
| cis-3-hexenal | 1.168 | 0.246 | |
| nonyl aldehyde | 1.148 | 0.255 | |
| β-ionone | 1.135 | 0.26 | |
| trans,trans-2,4-decadienal | 1.106 | 0.272 | |
| 2-methylbutyl acetate | 1.043 | 0.3 | |
| cis-3-hexen-1-ol | 1.037 | 0.303 | |
| 1-octen-3-one | 1.016 | 0.313 | |
| benzyl alcohol | −1.015 | 0.314 | |
| β-damascenone | 1.012 | 0.315 | |
| 1-pentanol | 0.924 | 0.358 | |
| unknown | 0.862 | 0.391 | |
| isovaleraldehyde | 0.837 | 0.405 | |
| hexyl alcohol | 0.835 | 0.406 | |
| trans-3-hexen-1-ol | 0.835 | 0.406 | |
| 2-methyl-1-butanol | 0.805 | 0.423 | |
| guaiacol | 0.804 | 0.424 | |
| benzothiazole | 0.714 | 0.477 | |
| sec-butyl acetate | 0.707 | 0.482 | |
| isovaleronitrile | 0.674 | 0.503 | |
| benzyl cyanide | −0.605 | 0.547 | |
| cis-4-decenal | 0.582 | 0.562 | |
| 6-methyl-5-hepten-2-one | 0.551 | 0.583 | |
| prenyl acetate | −0.542 | 0.59 | |

TABLE 4

Revised multiple regression analysis for volatiles identified in tomatoes. For p < about .05, the volatile makes a contribution to sweetness that is independent of the measures of the sugar (fructose or glucose). For compounds that make a contribution to sweetness independent of one of the sugars, the p value is in bold, for compounds where the contribution to sweetness is independent of both sugars, the compound name is bold.

| Name | Fructose t Ratio | Fructose p-Value | Glucose t Ratio | Glucose p-Value |
|---|---|---|---|---|
| (E)-2-heptenal | 2.954 | 0.004 | 2.145 | 0.035 |
| 1-nitro-2-phenylethane | −0.497 | 0.62 | −2.03 | 0.046 |
| 1-nitro-3-methylbutane | 0.737 | 0.463 | 0.294 | 0.769 |
| 1-octen-3-one | 0.518 | 0.606 | 0.576 | 0.566 |
| 1-pentanol | 2.103 | 0.039 | 1.792 | 0.077 |
| 1-penten-3-ol | −0.461 | 0.646 | 0.178 | 0.859 |
| 1-penten-3-one | 1.941 | 0.056 | 1.683 | 0.096 |
| 2,5-dimethyl-4-hydroxy-3(2H)-furanone | 4.038 | 0 | 3.158 | 0.002 |
| 2-butylacetate | 0.469 | 0.64 | 0.391 | 0.697 |
| 2-ethylfuran | −1.153 | 0.253 | −1.038 | 0.303 |
| 2-isobutylthiazole | 1.412 | 0.162 | 0.182 | 0.856 |
| 2-methyl-1-butanol | 0.383 | 0.703 | 0.054 | 0.957 |
| 2-methyl-2-butenal | −0.331 | 0.742 | 0.003 | 0.998 |
| 2-methylbutanel | −3.571 | 0.001 | −2.998 | 0.004 |
| 2-methylbutyl acetate | 0.856 | 0.395 | 1.409 | 0.163 |
| 2-phenyl ethanol | 0.17 | 0.865 | −0.91 | 0.366 |
| 3-methyl-1-butanol | 1.243 | 0.218 | 1.053 | 0.296 |
| 3-methyl-1-pentanol | −0.196 | 0.845 | −0.15 | 0.881 |
| 3-methyl-2-butenal | −0.189 | 0.85 | 0.347 | 0.73 |
| 3-pentanone | −1.176 | 0.243 | −0.639 | 0.525 |
| 4-carene | 1.738 | 0.086 | 2.191 | 0.032 |
| 6-methyl-5-hepten-2-ol | 3.68 | 0 | 2.686 | 0.009 |
| 6-methyl-5-hepten-2-one | 0.891 | 0.376 | 0.292 | 0.771 |
| b-cyclocitral | 1.905 | 0.061 | 1.688 | 0.096 |
| b-damascenone | 0.138 | 0.89 | 0.678 | 0.5 |
| benzaldehyde | 0.907 | 0.367 | −0.345 | 0.731 |
| benzothiazole | −1.383 | 0.171 | −0.419 | 0.676 |
| benzyl alcohol | −0.026 | 0.979 | −0.777 | 0.439 |

TABLE 4-continued

Revised multiple regression analysis for volatiles identified in tomatoes. For p < about .05, the volatile makes a contribution to sweetness that is independent of the measures of the sugar (fructose or glucose). For compounds that make a contribution to sweetness independent of one of the sugars, the p value is in bold, for compounds where the contribution to sweetness is independent of both sugars, the compound name is bold.

| Name | Fructose t Ratio | Fructose p-Value | Glucose t Ratio | Glucose p-Value |
|---|---|---|---|---|
| benzyl cyanide | 0.314 | 0.754 | −0.856 | 0.395 |
| b-ionone | 2.12 | 0.037 | 1.748 | 0.084 |
| butyl acetate | −0.87 | 0.387 | 0.469 | 0.641 |
| cis-2-penten-1-ol | −0.572 | 0.569 | −0.226 | 0.822 |
| cis-3-hexen-1-ol | 2.107 | 0.038 | 1.906 | 0.06 |
| cis-3-hexenal | 0.001 | 0.999 | 0.25 | 0.804 |
| cis-3-hexenyl acetate | 0.582 | 0.563 | 1.101 | 0.275 |
| cis-4-decenal | 2.02 | 0.047 | 1.29 | 0.201 |
| eugenol | −0.313 | 0.755 | 0.569 | 0.571 |
| geranial | 2.196 | 0.031 | 1.684 | 0.096 |
| geranylacetone | 1.731 | 0.088 | 1.014 | 0.314 |
| glutamatic acid | −1.746 | 0.085 | −2.953 | 0.004 |
| guaiacol | 0.561 | 0.576 | 0.986 | 0.327 |
| heptaldehyde | 0.25 | 0.803 | −0.175 | 0.861 |
| hexanal | 0.963 | 0.338 | 0.456 | 0.65 |
| hexyl acetate | 0.549 | 0.584 | 0.872 | 0.386 |
| hexyl alcohol | 2.292 | 0.025 | 1.763 | 0.082 |
| isobutyl acetate | −0.026 | 0.979 | 0.632 | 0.529 |
| isopentyl acetate | 1.615 | 0.111 | 2.588 | 0.012 |
| isovaleraldehyde | −0.249 | 0.804 | −0.441 | 0.66 |
| isovaleric acid | 2.121 | 0.037 | 1.923 | 0.058 |
| isovaleronitrile | 1.039 | 0.302 | 0.117 | 0.907 |
| methional | 0.635 | 0.527 | 0.229 | 0.82 |
| methylsalicylate | 1.034 | 0.305 | 0.706 | 0.482 |
| neral | 4.238 | 0 | 3.372 | 0.001 |
| nonyl aldehyde | 0.652 | 0.516 | 0.44 | 0.661 |
| p-anisaldehyde | 1.809 | 0.074 | 1.906 | 0.06 |
| phenylacetaldehyde | 0.016 | 0.988 | −1.048 | 0.298 |
| prenyl acetate | −2.074 | 0.041 | −1.038 | 0.303 |
| propyl acetate | 0.993 | 0.324 | 2.064 | 0.042 |
| salicylaldehyde | −0.029 | 0.977 | 0.99 | 0.325 |
| trans,trans-2,4-decadienal | 3.531 | 0.001 | 3.15 | 0.002 |
| trans-2-hexenal | −0.373 | 0.71 | −0.004 | 0.997 |
| trans-2-pentenal | 2.117 | 0.038 | 1.844 | 0.069 |
| trans-3-hexen-1-ol | 0.888 | 0.377 | 0.29 | 0.773 |

Example 3: Strawberry Volatile Analysis

Genetic and environmental variation of strawberry was exploited for psychophysical analysis by simultaneously assaying fruit for: hedonic and sensory measures; biochemical inventory of volatile compounds, sugars, and organic acids; and physical measures of TA, SSC, color, and firmness. A wide range of liking, texture, sweetness, and strawberry flavor were derived from consumer panels, which is supported by the diversity in flavor attributes quantified. Relationships to likability were constructed based upon sugar and volatile influence on perceived intensity of sweetness and flavor, respectively and combinatorial.

Introduction

Over the last thirty years volatiles associated with sweetness include: citral (Murphy and Cain 1980), amyl acetate (banana) (Burdach et al. 1984), whole strawberry (Frank et al. 1989; Stevenson et al. 1999), peach (Cliff and Noble 1990), pineapple, raspberry and maracuja (passion fruit) (Stevenson et al. 1999), lychee (Stevenson et al. 1999), vanilla (Lavin and Lawless 1998; Labbe et al. 2006), caramel (Prescott 1999; Stevenson et al. 1999) and maltol (Bingham et al. 1990; Kato 2003).

Flavor is the perceptual and hedonic response to the synthesis of sensory signals of taste, odor, and tactile sensation. The senses of taste and olfaction directly sample the chemicals present in food; sugars, acids, and volatiles. These metabolites are primary sensory elicitors of taste and olfaction which attenuate the perception and hedonics of flavor. Experimentation to evaluate 36 attributes of strawberry indicated sweetness and complex flavor as consistent favorable attributes of the "ideal" strawberry experience (Colquhoun 2011). Thus a ripe strawberry is metabolically poised to elicit the greatest sensory and hedonic responses from consumers.

Metabolic profiling has determined alkanes, alcohols, aldehydes, anthocyanins, ketones, esters, and furanones increase in concentration during fruit development, most likely due to accumulation of sugars, organic acids, and fatty acids as well as the consumption of amino acids. Many of these chemical classes serve as precursors to volatile synthesis, thus facilitating a metabolic flux through biosynthetic pathways for increased and diverse volatile emissions in ripe strawberry fruit, characterized by furanones, acids, esters, lactones, and terpenes. Over 350 volatile compounds have been identified across Fragaria, however within a single fruit, far fewer compounds are detected and even less contribute to perceived aroma.

A cross comparison of five previous studies which analyzed strawberry volatiles depicts the lack of agreement in defining chemical constituents of strawberry aroma, as each source considers a highly variable subset of total volatiles (Schieberle and Hofmann 1997, Ulrich 1997, Hakala 2002, Jetti 2007, Olbricht 2008). Mutual volatiles across studies include ethyl butyrate, methyl butyrate, ethyl caproate, methyl caproate, linalool, 2-methylbutyric acid, and 2,5-dimethyl-4-methoxy-2,3-dihydrofuran-3-one (DMF) and are the current consensus of integral strawberry aroma compounds. Comparisons of consumer preference among a variety of fresh strawberries and their volatile profiles has described less preferable varieties as possessing less esters, more decalactones and hexanoic acid (Ulrich 1997). The extent of volatile phenotype diversity is great enough across strawberry genotypes to not only be discerned but be preferred. The complex fruit biochemistry which is variably affected by genetic, environmental, and developmental factors coupled with individual's perceptional biases of flavor has made defining strawberry flavor cumbersome.

The present example utilizes the genetic and within-season variability of fruit quality to provide as many unique strawberry experiences as possible to a large sample of consumers. Fifty-four fully ripe unique strawberry samples (cultivar X date) were assayed for TA, pH, SSC, firmness, internal and external color, as well as the concentrations of malic acid, citric acid, glucose, fructose, sucrose, and eighty one volatile compounds (chemical structures of some of the volatile compounds are illustrated in FIG. 1), all of which potentially contribute to fruit quality. Simultaneously, a subset of tissue was evaluated for perceived sensory intensity of sourness, sweetness, and strawberry flavor and the hedonic responses to liking of texture and overall likability by consumer panelists across the 2011 and 2012 winter seasons in Florida. Data sets were analyzed for harvest week effects, gross variation of strawberry experiences, and using psychophysics to determine factors influencing hedonics and sensory perception of strawberry fruit consumption. The full tasting panel and chemical analysis results are not presented here, but additional discussion is included in U.S. patent application Ser. Nos. 13/869,132 and 15/403,731 and in Schweiterman M L, 2014, incorporated by reference above.

Results

The inventory of fifty-four fully ripe unique strawberry samples (35 cultivars, 12 harvests, 2 seasons) were assayed for titratable acidity (TA), pH, soluble solids content (SSC), firmness, as well as the concentrations of malic acid, citric acid, glucose, fructose, sucrose, and quantity of eighty-one volatile compounds (full data set not shown). Cluster analysis of relative chemical composition of all samples and derived hierarchy of both cultivar and metabolite relatedness was also conducted.

Seasonal Influence

The hedonic response to strawberry samples was measured as overall likability using the hedonic general labeled magnitude scale (gLMS) that ranges from −100 to +100, i.e. least to most pleasurable experience (full data not shown). The strawberry with the highest overall likability was a Festival sampled on the first harvest of 2012, which elicited an average hedonic response of 36.6. The lowest, a late season Red Merlin (season 1, harvest 5), was scored at 13.3 while the sample set median was 23.5. The benchmarking Festival sample contained 3.5 fold more sucrose and 27% more total volatiles than the least pleasurable fruit, demonstrating the disparity between early and late season fruit quality and its effect on consumers. The genetic and environmental variation in strawberry samples provides a wide range of metabolite profiles, which act individually or collectively to influence the hedonics and perception of strawberry consumption.

Driving Likability

Nearly 70% of sweetness intensity is accounted for by the sum of sucrose, glucose, and fructose; however, other metabolites were also demonstrated to contribute to sweetness perception. The hedonic qualities of strawberry are collectively positive, with adverse texture having a strong effect. The sensory perceptions of sweetness and flavor have a higher magnitude than sourness, marking their greater perception intensity.

Figure 2A:
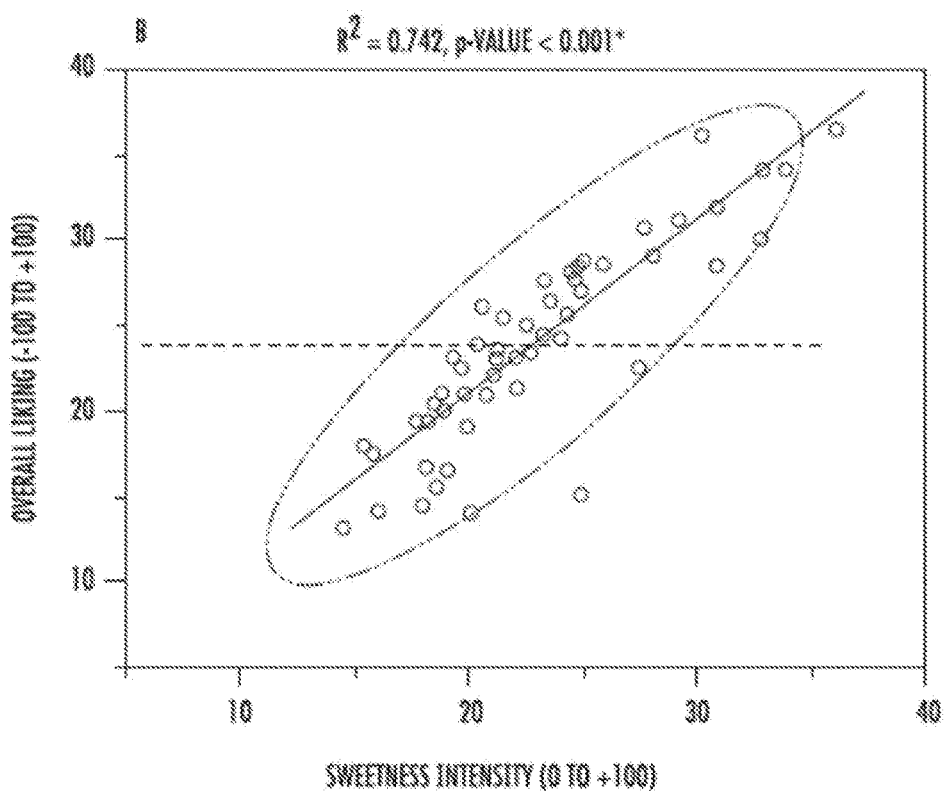
FIGS. 2A-2G present a series of graphs illustrating hedonics, sensory, and metabolite relations. These figures illustrate a subset of metabolites regressed against hedonic and sensory measures. The dashed line in each figure represents the fit mean; the solid line illustrates the linear fit; and the double hashed elliptical line illustrates the bivariate normal ellipse (P=0.950). Hedonic overall liking is regressed against sweetness intensity (A) and strawberry flavor intensity (B). Overall liking is fitted to total sugars (C) and total volatiles (D). Sweetness intensity is regressed against total sugars (E) and total volatiles (F). Strawberry flavor intensity is regressed by total volatiles (G). Coefficient of determination ($R^2$) and p-value of fit is listed above individual scatterplots and is calculated using bivariate fit in JMP 8 (α=0.05).
Figure 2B:
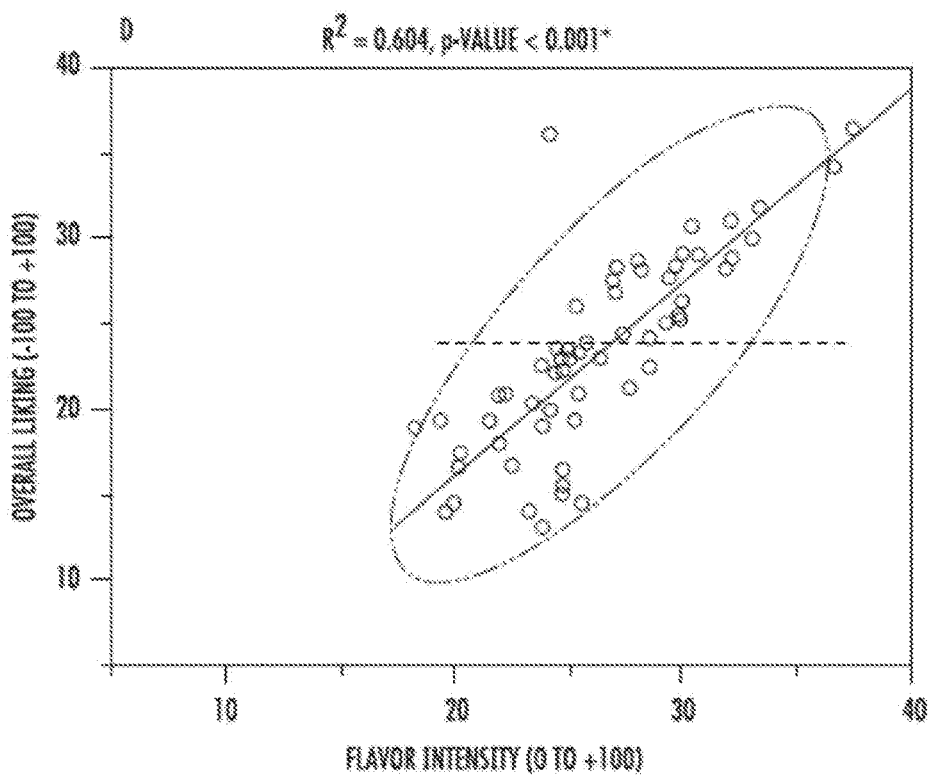
Figure 2C:
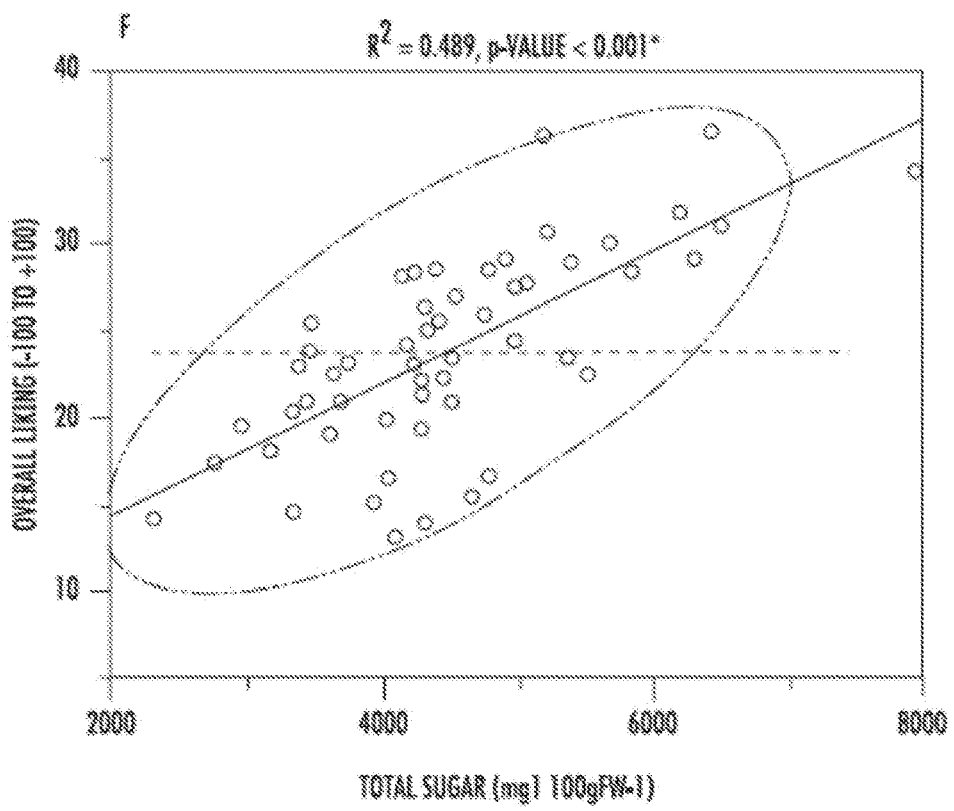
Figure 2D:
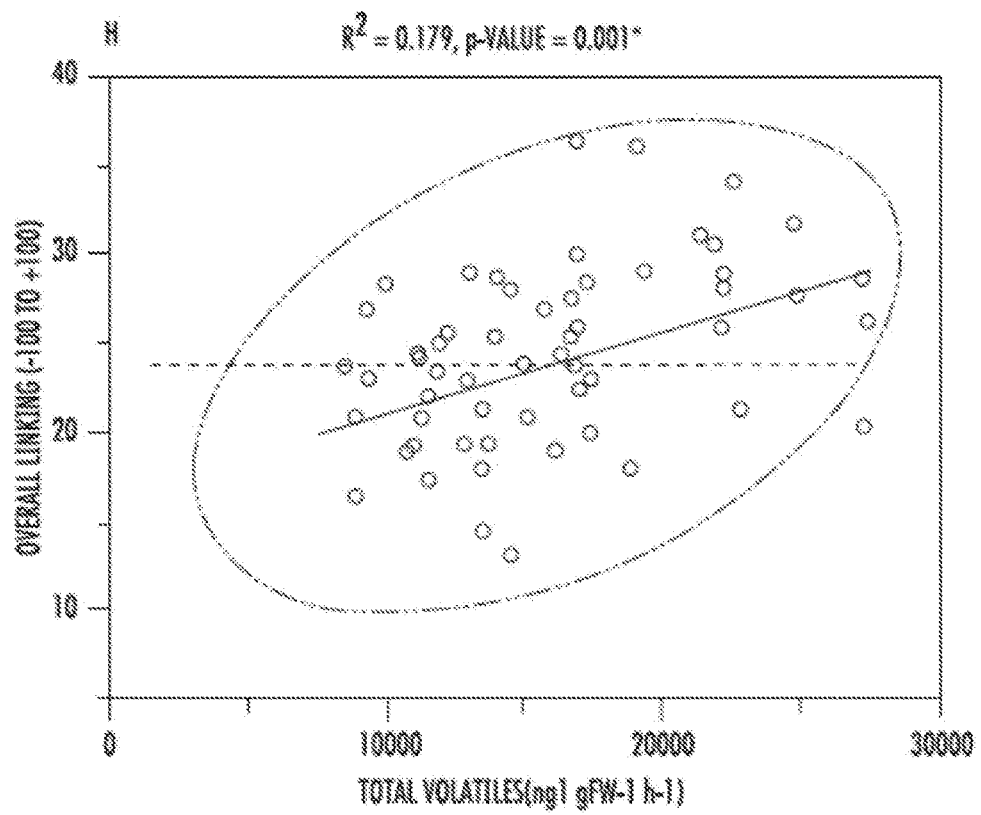
Figure 2E:
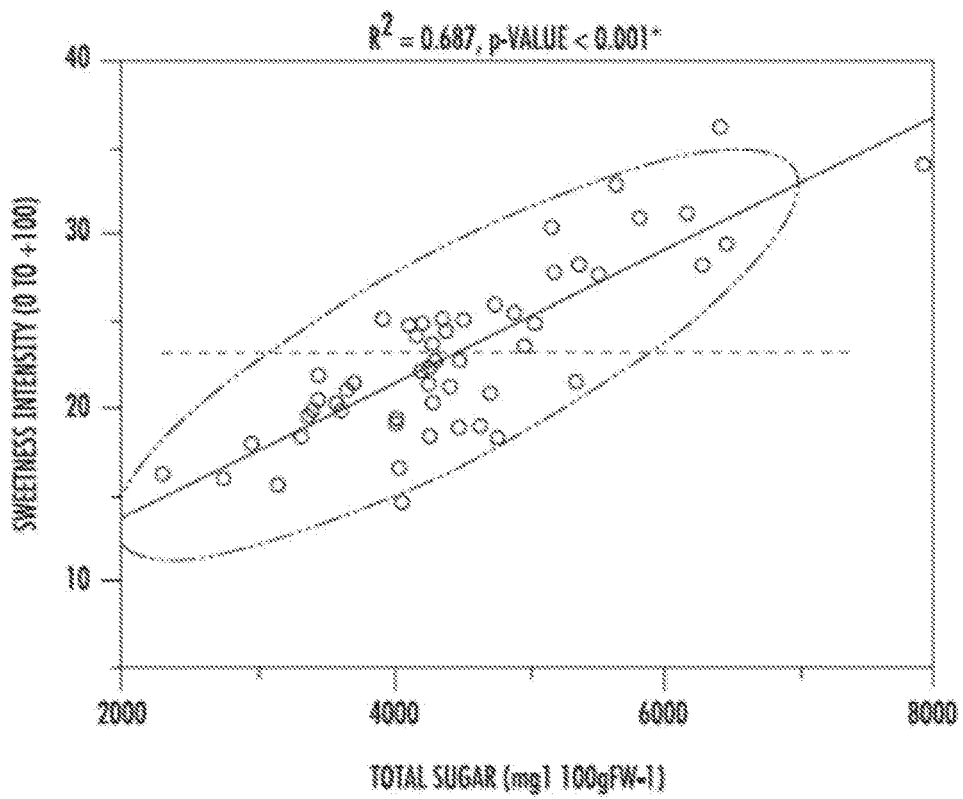

In order to elucidate factors contributing to strawberry experience, overall likability of strawberry samples was plotted against the hedonic measure liking of texture and the sensory intensities of sweetness, sourness, and strawberry flavor (data not shown). High correlations with a significant fit was found for sweetness ($R^2=0.742$) (FIG. 2A). Perceived intensity of sweetness and strawberry flavor emerged as the strongest drivers of overall likability (see FIGS. 2A, 2B, 2C, 2D, 2E, 2F, and 2G).

Sweetness

In the present study, perceived sweetness intensity was the greatest predictor of overall liking. In fact, the same samples scoring the highest and lowest for overall liking, 'Festival' (sn 2, wk 1) and 'Red Merlin' (sn 1, wk 6), elicited the greatest (36.2) and least (14.59) intense sensations of sweetness (full data set from tasting panels not shown). The early and late harvest week samples support the observable decline in perceived sweetness intensity across harvest weeks ($R^2=0.471^{***}$), which was also observed for multiple sugar measures (seasonal data not shown).

In the fifty-four samples assayed, the total sugar concentration ranged from 2.29-7.93%, a 3.5-fold difference. Glucose and fructose concentrations exhibit highly similar ranges to each other, 0.66-2.48% and 0.75-2.61%, respectively, and near-perfect correlation ($R^2=0.984^{***}$) (data not shown) within a sample. However, the concentration of glucose or fructose was not predictive of sucrose concentration ($R^2=0.011$ and $0.004$, respectively) (data not shown). Sucrose demonstrated a more dynamic state as its concentration dipped as low as 0.16% and up to 2.84%, nearly a seventeen-fold difference among all samples.

Figure 2F:
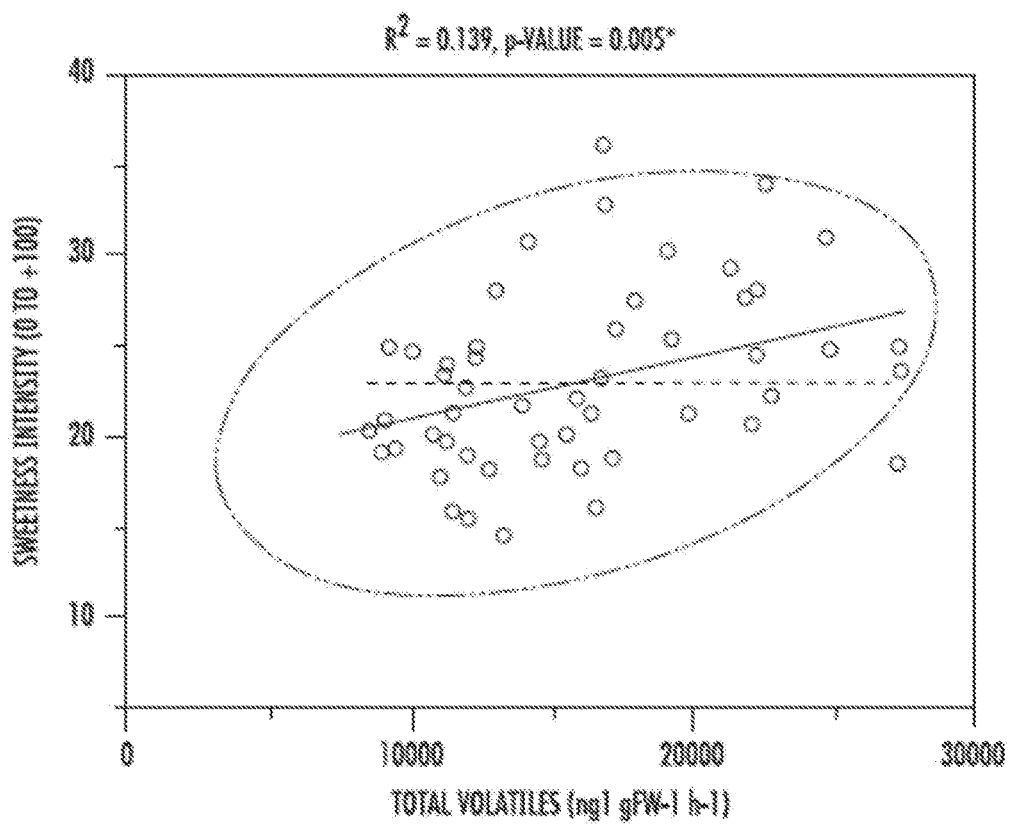
Figure 2G:
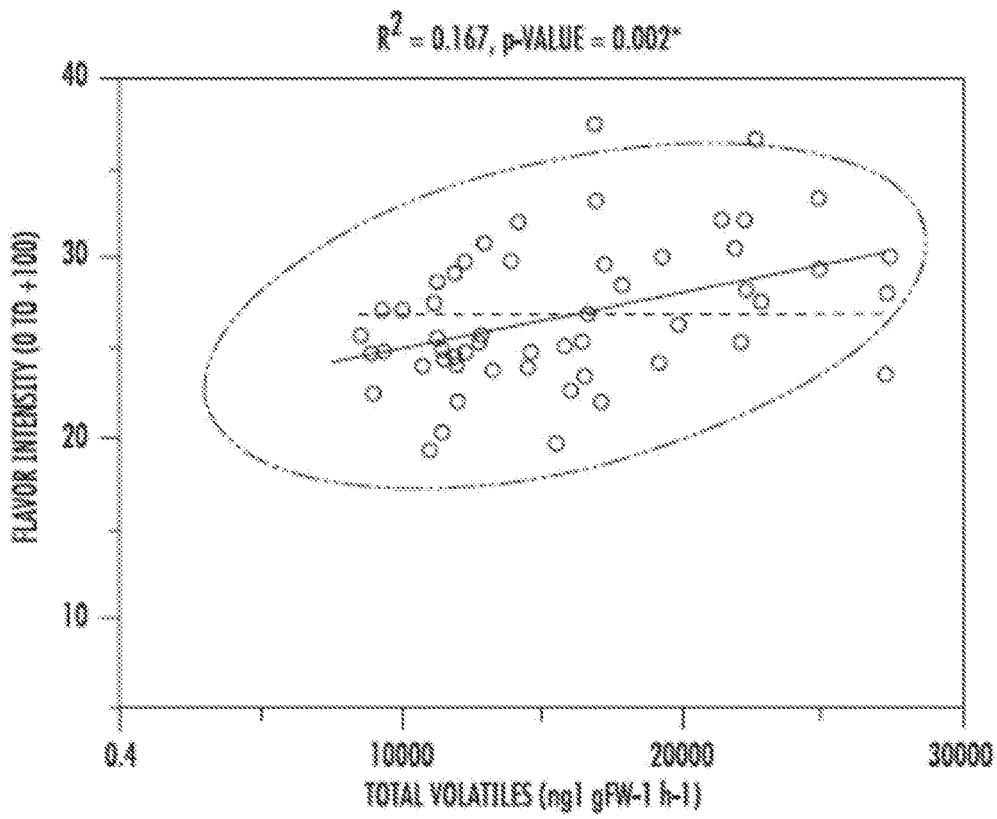

Sucrose is the single metabolite with the most significant contribution to overall liking ($R^2=0.442^{*}$). Individually, sucrose ($R^2=0.445^{*}$), glucose ($R^2=0.337^{*}$), and fructose ($R^2=0.300^{*}$) all significantly influence the variation in sweetness intensity. However, total sugar actually only accounts for slightly more than two-thirds of sweetness intensity variation ($R^2=0.687^{*}$) (FIG. 2E), likely a result of covariation of glucose and fructose. Interestingly, the total volatiles for a sample correlates positively with sweetness intensity, potentially accounting for up to $13.9\%^{}$ of variation in sweetness intensity (FIG. 2F).

Strawberry Flavor Intensity

Strawberry flavor intensity accounts for the retronasal olfaction component of chemical senses complimented by taste; including sourness and sweetness intensity in this study. The overall highest sensory intensity was 37.5 for strawberry flavor of 'Festival' (sn 2, wk 1), which also rated highest for overall liking and sweetness intensity. Opposite this, FL-05-85 (sn 1, wk 6) delivered the least intense strawberry flavor experience with a score of 19.4. Total volatiles in 'Festival' (sn 2, wk 1) was over 50% greater and seven more volatiles compounds were detected than in FL 05-85. Total volatiles within a sample contribute to strawberry flavor intensity ($R^2=0.167^{**}$)(FIG. 4T), but it is not simply the sum of volatile constituents that explain the effect. For instance, the maximum total volatiles detected within a sample, 27.3 $\mu g^1$ $gFW^{-1}$ $hr^{-1}$ collected from 'Camarosa' (sn 1, wk 2), does not result in the greatest flavor intensity (30.5) and the minimum, 8.5 $\mu g^1$ $gFW^{-1}$ $hr^{-1}$ from 'Sweet Anne' (sn 2, wk 9), does not rate as the least flavorful (25.8).

The chemical diversity of the resources analyzed allowed for the identification of eighty-one volatile compounds from fresh strawberry fruit (Table 5). The majority of compounds are lipid related esters, while lipid related aldehydes account for the majority of volatile mass. Terpenes, furans, and ketones are also represented in the headspace of strawberry. Forty three of the eighty-one volatile compounds were not detected (<0.06 $ng^1$ $gFW^{-1}$ $hr^{-1}$) in at least one sample i.e. 38 volatiles were measured in all samples and appear to be constant in the genetic resources analyzed. No cultivar emitted all volatiles. At least one sample of 'Festival', 'Camino Real', PROPRIETARY 6, and FL 06-38 have detectable amounts of all volatiles, except for 134-20-3, which was only identified in 'Mara des Bois' and 'Charlotte' from the final harvest (wk 7) of season 1. 'Chandler' (sn 2, wk 4) is qualitatively the most deficient sample, lacking detectable amounts of 19 of 81 compounds, having the second lowest amount of total volatiles, and a flavor intensity of 24.8.

Volatile Enhanced Sweetness

Step-wise multiple regressions of all volatile compounds against perceived intensity of sweetness is performed independent of either glucose, fructose, or sucrose concentration, separately (Table 5). Twenty four volatile compounds showed significant correlations ($\alpha=0.05$) to perceived sweetness intensity independent of glucose or fructose concentration, twenty-two of which are mutual between the two monosaccharides. Thirty volatiles were found to enhance sweetness intensity independent of at least one of sucrose, glucose, and/or fructose (noted with an asterisk in Table 5). Twenty volatiles are found to enhance sweetness intensity independent of sucrose concentration. Six of these volatiles are shared with those independent of glucose and fructose: 1629-58-9 (1-penten-3-one), 2305-05-7 (5-octyldihydro-2

(3H)-furanone), 540-18-1 (pentyl butyrate), 2639-63-6 (hexyl butyrate), 142-92-7 (hexyl acetate), and 60415-61-4 (2-pentanyl butyrate). Only three compounds were found to be negatively related to sweetness independent of at least one of the sugars: 106-32-1 (ethyl octanoate) exclusively independent of glucose, 108-10-1 (4-Methyl-2-pentanone) mutually independent of glucose and fructose, and 1191-16-8 (3-methyl-2-buten-1-yl acetate) exclusively independent of sucrose.

However, additional multiple regression analysis was later conducted on the dataset and a slightly different set of sweet-enhancing volatiles was identified. As described above, regression analysis was re-done using partial least squares regression modeling and a different, wider range of sweet-enhancing volatiles was identified. The sweet-enhancing volatiles identified from strawberry fruit in this re-analysis is presented in Table 6, below. The following volatile compounds were found to have an individual effect of enhancing perceived sweetness and selected for additional testing (see Example 6, below): ethyl valerate, butyl butanoate, heptanal, 6-methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, and 4-methoxy-2,5-dimethyl-3(2H)-furanone.

Discussion

Exploitation of genetic diversity and environmental variation allowed for a wide range of consumer hedonic and sensory responses. A nearly three-fold difference in overall liking of strawberry was observed within all samples. The cultivars in this study represent a large proportion of commercial strawberry acreage in North America, breeding selections, and European cultivars; a genetic collection to enhance the range of diversity for flavors and chemical constituents.

Increasing texture liking, sweetness intensity, and strawberry flavor intensity significantly increase overall liking, while sourness intensity showed no relationship. Therefore, overall liking is the cumulative measure of the experience from eating a strawberry fruit. Integration and synthesis of response to sensory signals of taste, olfaction, and tactile sensation constitute an eating experience and drive overall liking. The senses of taste and olfaction sample the chemicals present in food such as, sugars, acids, and volatile chemical compounds; these elicitors attenuate the perception and hedonics of food (Lindemann 2001) (Fujimaru and Lim 2013). Ratings of strawberry fruit are correlated to specific chemical or physical attributes, especially sweetness and flavor intensity, the two greatest drivers of overall liking.

Much work has been done to measure sugars and volatile compounds in strawberry fruit in attempt of understanding sweetness and flavor, and these aims are in line with consumer demand. The consumer rating of sweetness intensity is the primary factor of overall liking, and sweetness is the component of taste perception facilitating the detection of sugars. Previous quantification of individual sugars within a strawberry identifies sucrose, glucose, and fructose as the predominant soluble solids. Sucrose concentrations observed across samples is responsible for most variation in SSC, sweetness intensity and overall liking than any other individual compound. Metabolites contributing to perceived sweetness intensity have the greatest influence on the overall hedonics of strawberry. Strawberry flavor intensity is the second greatest determinant of overall liking (FIG. 4B) and accounts for perception of volatile compounds through retronasal olfaction. A significant positive relationship exists among total volatile content and the flavor intensity for a given sample; however, total volatile content is not entirely explanatory of flavor intensity. The maximum rating for strawberry flavor intensity by 'Festival' (sn 2, wk1) is the greatest consumer response evoked within this study (data not shown), highlighting the significance of sensory perception of aroma. However, this sample only had slightly more than 60% of total volatile mass of the greatest sample. The extent of volatile phenotype diversity is great enough across strawberry fruit to not only be discerned but be preferred.

Within the genetic resources of Fragaria x ananassa analyzed in this study 81 compounds were reproducibly detected, but not one cultivar had detectable amounts of all compounds. Over 350 volatile compounds have been identified across Fragaria. The concentrations of individual volatile compounds within fruit can have a significant influence on flavor intensity, but a lack of consensus has existed as to which volatiles are determinant of flavor.

Previous determination of flavor relevance was determined using approaches that determine importance of volatiles based on analytical signal intensity and/or human perception of single isolated volatile compound via orthonasal olfaction (Schieberle and Hofmann 1997) (Ulrich 1997) (Hakala 2002) (Jetti 2007) (Olbricht 2008), negating the complex system of strawberry fruit or actual flavor relevant retronasal olfaction. Of the forty-six volatile compounds cited as relevant to strawberry flavor in the above five studies, only seven were mutual to at least three of the studies, exemplifying the lack of agreement in defining flavor-relevant constituents. This consensus includes 623-42-7, 105-54-4, 106-70-7, 123-66-0, 78-70-6, 116-53-0, and 4077-47-8, all of which are quantified in this report. These compounds exhibit adequate variability in fruit samples to discern dose dependent effect on flavor intensity. However, only 78-70-6, 105-54-4, 623-42-7, and 4077-47-8 show significant positive correlation with flavor intensity. These compounds that were found to influence flavor intensity represent diverse classes, terpenoid alcohol, two esters, and a furan, respectively, while the three compounds not fitting to flavor are all esters. With esters accounting for the majority of chemical compounds detected in strawberry it is possible that too much emphasis was placed on the chemical class for flavor, or that, in a complex mixture, less are perceivable than when smelled individually. These volatiles may have no bearing on strawberry flavor, but have been targets due to quantity, threshold ratios, or simply identity.

Over one third of volatiles in this study are significantly correlated with strawberry flavor intensity, potentially enhancing perception of a complex and highly variable volatile mixture, seventeen of which are not of previous flavor focus. Two of these unrecognized compounds, 111-71-7 and 109-19-3, are present in the most flavorful strawberry sample but undetected in the least flavorful. This pair of compounds as well as 539-82-2 and 7789-58-5, also present/absent in the most/least flavorful, have relatively minor amounts but show evidence of enhancing perceived sweetness intensity independent of individual sugars. Relatively low concentration volatiles are indicated as new impactful components of strawberry flavor.

In the initial analysis, thirty-eight volatile compounds were found to significantly enhance the perceived intensity of sweetness; twenty-two mutually independent of glucose and fructose, fourteen uniquely independent of sucrose, and six compounds mutually independent of all three sugars: 1629-58-9, 2305-05-7, 540-18-1, 2639-63-6, 142-92-7, and 60415-61-4 (Table 5). In tomato, above, similar analysis of a volatile subset identified three compounds enhancing sweetness intensity independent of fructose: geranial, 123-51-3, and 96-17-3 (Tieman 2012). These compounds were not identified in this strawberry work. Botanically, tomato is considered a true fruit and demonstrates climacteric ripening, while strawberry fruit is non-climacteric and considered an aggregate accessory fruit. The developmental origin of the flesh which is consumed is divergent, exhibiting unique biochemistries.

The revised analysis identified compounds with an independent effect on sweet perception as illustrated in Table 6. Additional testing on a subset of these volatiles, combined with other fruit volatiles, in sugar solution is described in Example 6. The volatiles from strawberry in that demonstration included: ethyl valerate, butyl butanoate, heptanal, 6-methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, and 4-methoxy-2,5-dimethyl-3(2H)-furanone.

Orthonasal (smell) and retronasal (flavor) olfaction each project to different brain areas for processing (Small and Jones-Gotman 2001). Taste projects to the same brain area as retronasal olfaction, for integration to produce flavor (Small 2004). This integration has a remarkable consequence: taste and retronasal olfaction can intensify one another. The food industry knows of the intensification of volatile sensations by the addition of small amounts of sweeteners. The ability of volatiles to enhance taste was identified later (Burdach 1984) (Lindemann 2001), and one study shows the ability of whole strawberry aroma to intensify the sweetness of a sugar solution (Frank and Byram 1988). The results of this present example take the complex, variable mixture of compounds in strawberry aroma, and identify individual volatile compounds in the fruit capable of producing the enhanced sweetness effect. These volatiles are not present at the highest amounts in fruits, most are not targets of flavor analysis, and a majority appear to be associated with lipid metabolism, yet their presence or increased concentration has an enhancing effect on perceived sweetness, an effect independent of sugars.

Conclusion

The importance of sucrose to sweetness intensity is evident, and the correlation of total volatiles to sucrose highlights the dependence of secondary metabolism to primary metabolism. Individual volatiles were shown to correlate to strawberry flavor intensity, helping to better define distinct, perceptually impactful compounds from the larger mixture the fruit. Selection for increased concentrations of volatile compounds that act independently of sugars to enhance sweetness is an approach to increase overall liking. The volatiles described herein were sampled mainly from current commercial cultivars and represent feasible targets for varietal improvement. Additional studies may identify other sweet-enhancing volatiles not already present in elite germplasm.

Based on evaluation of the above data, the volatiles indicated in Table 7 were identified as having an enhancing effect on sweet perception independent of at least one sugar. The following set of strawberry volatile compounds were also determined (see Example 6, below) to have an independent effect of enhancing sweetness: ethyl valerate, butyl butanoate, heptanal, 6-methyl-5-heptene-2-one, hexyl acetate, methyl thiobutyrate, 2-pentyl butyrate, 2-ethyl-1-hexanol, ethyl butyrate, propyl butanoate, (E)-2-penten-1-al, ethyl decanoate, octyl acetate, nonanal, butyl isovalerate, octyl butanoate, amyl butyrate, hexyl butyrate, 2-methyl butyric acid, (E)-2-decen-1-al, (E)-2-hexen-1-yl butyrate, myrtenal, isopropyl butyrate, and 4-methoxy-2,5-dimethyl-3(2H)-furanone.

Experimental Procedures

Plant Material

Thirty-five strawberry cultivars were grown during the 2010-2011 and 2011-2012 winter seasons according to current commercial practices for annual strawberry plasticulture in Florida (Whitaker, 2011; Santos, 2012). Fully-ripe fruit by commercial standards (Strand 2008) was harvested from three to five cultivars on Mondays, delivered to respective laboratories, and stored at 4° C. dark overnight for simultaneous analysis of fresh strawberry fruit volatiles, exterior and interior color, firmness, and sensory analysis on Tuesdays; as well as sample, preparation for later sugar and acid measurements. Six harvests in both seasons allowed for the complete analysis of fifty-four samples. Weather data was obtained from the Balm, Fla. station of the Florida Automated Weather Network (fawn.ifas.ufl.edu). Temperature recording height at 60 centimeters and relative humidity, rain, and solar radiation at 2 meters.

Volatile Analysis

At least 100 grams or seven berries of each sample were removed from 4° C. dark overnight storage prior to volatile collection. Samples were homogenized in a blender prior to splitting into three 15 gram replicates for immediate capturing of volatile emission and remainder of sample frozen in $N_2$ (I) and stored at −80° C. for later sugar and acid quantification. A two hour collection in a dynamic headspace volatile collection system (Underwood, 2005) allowed for concentration of emitted volatiles on HaySep 80-100 porous polymer adsorbent (Hayes Seperations Inc., Bandera, Tex., USA). Elution from polymer previously described in Schmelz, 2003.

Quantification of volatiles in an elution was performed on an Agilent 7890A Series gas chromatograph (GC) (carrier gas; He at 3.99 mL min$^{-1}$; splitless injector, temperature 220° C., injection volume 2 μl) equipped with a DB-5 column ((5%-Phenyl)-methylpolysiloxane, 30 m length× 250 μm i.d.×1 μm film thickness; Agilent Technologies, Santa Clara, Calif., USA). Oven temperatures programmed from 40° C. (0.5 min hold) at 5° C. min$^{-1}$ to 250° C. (4 min hold). Signals captured with a flame ionization detector (FID) at 280° C. Peaks from FID signal were integrated manually with Chemstation B.04.01 software (Agilent Technologies, Santa Clara, Calif.). Volatile emission (ng gFW$^{-1}$ h$^{-1}$) calculated based on individual peak area relative to sample elution standard peak area. GC-Mass Spectrometry (MS) analysis of elution on an Agilent 6890N GC in tandem with an Agilent 5975 MS (Agilent Technologies, Santa Clara, Calif., USA) and retention time comparison with authentic standards (Sigma Aldrich, St Louis, Mo., USA) for volatile identification (Schmelz, 2001).

Sugars and Acids Quantification

Titratable acidity (TA), pH, and soluble solids content (SSC) were averaged from four replicates of the supernatant of centrifuged thawed homogenates (Whitaker, 2011). An appropriate dilution of the supernatant from a separate homogenate (centrifugation of 1.5 ml at 16,000×g for 20 minutes) was analyzed using biochemical kits (per manufacturer's instructions) for quantification of citric acid, L-malic acid, D-glucose, D-fructose, and sucrose (CAT#10-

139-076-035, CAT#10-139-068-035, and CAT#10-716-260-035; R-Biopharm, Darmstadt, Germany) with absorbance measured at 365 nm on an Epoch Microplate Spectrophotometer (BioTek, Winooksi, Vt., USA). Metabolite average concentration (mg 100 gFW$^1$) determined from two to six technical replicates per pooled sample. Derived sucrose concentration via D-glucose and D-fructose were mathematically pooled.

Sensory Analysis

All consumer panels were approved by the University of Florida Institutional Review Board. Over the course of two annual seasons 166 strawberry consumers (58 male, 108 female) were recruited to evaluate strawberry cultivars. Ages of panelist ranged from 18 to 71, with a median age of 24. Panelists self-classified themselves as 98 White or Caucasian, 11 Black or African-American, 1 Native American, Alaska Native or Aleutian, 41 Asian/Pacific Islander, and 15 Other. An average of 106 (range of 98-113) panelists evaluated between three and five cultivars per session (Tieman, 2012). Fresh, fully-ripe strawberry fruit was removed from overnight 4° C. dark storage and allowed to warm to room temperature prior to sensory analysis. Each panelist was given one to two whole strawberries for evaluation, depending on cultivar availability. Panelist took a bite of each sample, chewed, and swallowed it. Ratings for overall liking and liking for texture were scaled on hedonic general labeled magnitude scale (gLMS) in the context of all pleasure/displeasure experiences. Perceived intensity of sweetness, sourness, and strawberry flavor were scaled in context of all sensory experiences using sensory gLMS (Bartoshuk, 2003; Bartoshuk, 2005; Tieman, 2012). Scales were employed to mediate valid comparisons across subjects and sessions.

Statistical Analysis

Means and standard errors for consumer, physical, and metabolite measurements were determined from all replicates using JMP (Version 8. SAS Institute Inc., Cary, N.C., 1989-2008). Bivariate analysis among individual measurements of samples allowed for linear fit, which includes summary of fit, analysis of variance, t-test, and correlation analysis for density ellipse. Two-way Ward hierarchical cluster analysis of all metabolite concentrations and strawberry samples accomplished in JMP.

Multiple Regressions were Performed with the "Enter" Method in SPSS for Identification of Sweetness Enhancing Volatiles.

For the first analysis, individual volatile compound concentrations were regressed using the "enter" method in SPSS Statistics (IBM Corp, Armonk, N.Y., USA). This was done individually for each of the three sugars: glucose, fructose or sucrose to identify which compounds had an effect on sweetness (positive or negative) independent of each of the sugars. For p values of about 5.05, the volatile made a contribution to perceived sweetness that was independent of the sugar tested (see Table 5)

For the second analysis, partial least squares regression analysis was used to identify more correlations to sweetness independent of sugars. For sig values of about 5.05, the volatile was considered to make a contribution to perceived sweetness that was independent of the sugar tested (see Table 6).

TABLE 5

Initial multiple regression for identification of sweetness enhancing volatiles. Individual volatile compound concentrations were regressed against perceived sweetness intensity independent of effect from glucose, fructose, or sucrose, separately, using a standard least squares regression model. Thirty compounds (asterisk) were found to enhance intensity of sweetness independent of at least one of the three sugars. Six compounds (bold) were found to significantly enhance intensity of sweetness independent of all three sugars.

| CAS # | FRUCTOSE t RATIO | FRUCTOSE p-VALUE | | SUCROSE t RATIO | SUCROSE p-VALUE | | GLUCOSE t RATIO | GLUCOSE p-VALUE | |
|---|---|---|---|---|---|---|---|---|---|
| 1629-58-9 | 5.097 | 0 | * | 2.41 | 0.02 | * | 4.696 | 0 | * |
| 1576-87-0 | 4.566 | 0 | * | 1.024 | 0.311 | | 4.301 | 0 | * |
| 1576-86-9 | 4.16 | 0 | * | 0.935 | 0.354 | | 3.915 | 0 | * |
| 2305-05-7 | 3.933 | 0 | * | 2.784 | 0.008 | * | 3.549 | 0.001 | * |
| 3913-81-3 | 3.694 | 0.001 | * | 1.411 | 0.164 | | 3.494 | 0.001 | * |
| 124-19-6 | 3.696 | 0.001 | * | 0.226 | 0.822 | | 3.402 | 0.001 | * |
| 6728-26-3 | 3.349 | 0.002 | * | −0.816 | 0.418 | | 3.314 | 0.002 | * |
| 591-78-6 | 2.807 | 0.007 | * | 0.767 | 0.447 | | 2.788 | 0.007 | * |
| 5881-17-4 | 2.894 | 0.006 | * | 0.608 | 0.546 | | 2.662 | 0.01 | * |
| 540-18-1 | 2.71 | 0.009 | * | 2.292 | 0.026 | * | 2.515 | 0.015 | * |
| 2639-63-6 | 2.865 | 0.006 | * | 2.892 | 0.006 | * | 2.512 | 0.015 | * |
| 105-54-4 | 2.533 | 0.014 | * | 0.034 | 0.973 | | 2.493 | 0.016 | * |
| 564-94-3 | 2.588 | 0.013 | * | −1.322 | 0.192 | | 2.455 | 0.018 | * |
| 111-71-7 | 2.599 | 0.012 | * | 1.342 | 0.186 | | 2.283 | 0.027 | * |
| 4077-47-8 | 2.414 | 0.019 | * | 0.299 | 0.766 | | 2.185 | 0.034 | * |
| 110-93-0 | 2.527 | 0.015 | * | 1.43 | 0.159 | | 2.165 | 0.035 | * |
| 638-11-9 | 2.311 | 0.025 | * | 1.256 | 0.215 | | 2.14 | 0.037 | * |
| 142-92-7 | 2.346 | 0.023 | * | 2.943 | 0.005 | * | 2.096 | 0.041 | * |
| 60415-61-4 | 2.309 | 0.025 | * | 2.119 | 0.039 | * | 2.062 | 0.044 | * |
| 116-53-0 | 2.01 | 0.05 | * | −0.286 | 0.776 | | 2.035 | 0.047 | * |
| 123-86-4 | 2.179 | 0.034 | * | 1.147 | 0.257 | | 2.008 | 0.05 | * |
| 7452-79-1 | 1.959 | 0.056 | | −0.785 | 0.436 | | 1.993 | 0.052 | * |
| 109-21-7 | 2.181 | 0.034 | * | 1.65 | 0.105 | | 1.961 | 0.055 | |
| 109-19-3 | 2.005 | 0.05 | * | 1.662 | 0.103 | | 1.954 | 0.056 | |
| 616-25-1 | 1.773 | 0.082 | | 0.795 | 0.43 | | 1.628 | 0.11 | |
| 5454-09-1 | 1.804 | 0.077 | | 2.085 | 0.042 | * | 1.579 | 0.12 | |
| 96-22-0 | 1.82 | 0.075 | | 0.912 | 0.366 | | 1.576 | 0.121 | |
| 5989-33-3 | 1.869 | 0.067 | | 1.953 | 0.056 | | 1.561 | 0.125 | |
| 2548-87-0 | 1.76 | 0.084 | | 0.067 | 0.947 | | 1.509 | 0.138 | |
| 623-42-7 | 1.455 | 0.152 | | 0.419 | 0.677 | | 1.452 | 0.153 | |
| 29674-47-3 | 1.339 | 0.187 | | 0.035 | 0.972 | | 1.362 | 0.179 | |
| 53398-83-7 | 1.482 | 0.144 | | 2.556 | 0.014 | * | 1.283 | 0.205 | |

TABLE 5-continued

Initial multiple regression for identification of sweetness enhancing volatiles. Individual volatile compound concentrations were regressed against perceived sweetness intensity independent of effect from glucose, fructose, or sucrose, separately, using a standard least squares regression model. Thirty compounds (asterisk) were found to enhance intensity of sweetness independent of at least one of the three sugars. Six compounds (bold) were found to significantly enhance intensity of sweetness independent of all three sugars.

| CAS # | FRUCTOSE t RATIO | FRUCTOSE p-VALUE | | SUCROSE t RATIO | SUCROSE p-VALUE | | GLUCOSE t RATIO | GLUCOSE p-VALUE | |
|---|---|---|---|---|---|---|---|---|---|
| 40716-66-3 | 1.521 | 0.134 | | 1 | 0.322 | | 1.202 | 0.235 | |
| 66-25-1 | 1.229 | 0.225 | | 0.21 | 0.835 | | 1.178 | 0.244 | |
| 104-76-7 | 1.189 | 0.24 | | 2.046 | 0.046 | * | 0.982 | 0.331 | |
| 556-24-1 | 0.732 | 0.468 | | 0.972 | 0.336 | | 0.88 | 0.383 | |
| 706-14-9 | 1.247 | 0.218 | | 1.65 | 0.105 | | 0.879 | 0.384 | |
| 110-39-4 | 0.96 | 0.341 | | 2.645 | 0.011 | * | 0.814 | 0.419 | |
| 628-63-7 | 0.882 | 0.382 | | 0.427 | 0.671 | | 0.749 | 0.457 | |
| 78-70-6 | 0.872 | 0.387 | | −0.1 | 0.921 | | 0.7 | 0.487 | |
| 124-13-0 | 0.871 | 0.388 | | 0.169 | 0.866 | | 0.685 | 0.497 | |
| 75-85-4 | 0.736 | 0.465 | | −0.306 | 0.761 | | 0.667 | 0.508 | |
| 110-43-0 | 1.054 | 0.297 | | 1.899 | 0.063 | | 0.657 | 0.514 | |
| 105-66-8 | 0.88 | 0.383 | | 2.421 | 0.019 | * | 0.638 | 0.526 | |
| 623-43-8 | 0.248 | 0.805 | | −1.396 | 0.169 | | 0.54 | 0.592 | |
| 1534-08-3 | 0.488 | 0.628 | | 1.035 | 0.305 | | 0.429 | 0.67 | |
| 71-41-0 | 0.448 | 0.656 | | 1.938 | 0.058 | | 0.296 | 0.769 | |
| 10522-34-6 | 0.536 | 0.594 | | 2.049 | 0.046 | * | 0.288 | 0.775 | |
| 112-14-1 | 0.413 | 0.681 | | 2.292 | 0.026 | * | 0.284 | 0.777 | |
| 4887-30-3 | 0.392 | 0.697 | | 2.71 | 0.009 | * | 0.254 | 0.801 | |
| 7786-58-5 | 0.362 | 0.718 | | 2.027 | 0.048 | * | 0.227 | 0.821 | |
| 103-09-3 | 0.172 | 0.864 | | −1.053 | 0.297 | | 0.21 | 0.835 | |
| 134-20-3 | −0.009 | 0.993 | | 1.386 | 0.172 | | 0.2 | 0.842 | |
| 15111-96-3 | 0.23 | 0.819 | | 0.927 | 0.358 | | 0.192 | 0.849 | |
| 110-38-3 | 0.281 | 0.78 | | 2.621 | 0.012 | * | 0.055 | 0.956 | |
| 96-04-8 | 0.142 | 0.887 | | −0.646 | 0.521 | | 0.002 | 0.998 | |
| 123-66-0 | 0.066 | 0.948 | | 1.064 | 0.292 | | −0.001 | 0.999 | |
| 2311-46-8 | 0.238 | 0.813 | | 2.211 | 0.032 | * | −0.058 | 0.954 | |
| 29811-50-5 | 0.016 | 0.987 | | 0.358 | 0.722 | | −0.098 | 0.922 | |
| 1576-95-0 | −0.186 | 0.853 | | −0.304 | 0.762 | | −0.231 | 0.819 | |
| 2497-18-9 | −0.313 | 0.756 | | −0.056 | 0.955 | | −0.331 | 0.742 | |
| 20664-46-4 | −0.17 | 0.865 | | 1.383 | 0.173 | | −0.395 | 0.694 | |
| 624-24-8 | −0.406 | 0.686 | | 0.662 | 0.511 | | −0.416 | 0.679 | |
| 589-38-8 | −0.217 | 0.829 | | 0.592 | 0.557 | | −0.427 | 0.671 | |
| 109-60-4 | −0.491 | 0.626 | | −0.224 | 0.823 | | −0.454 | 0.652 | |
| 821-55-6 | −0.267 | 0.791 | | 1.192 | 0.239 | | −0.467 | 0.642 | |
| 624-41-9 | −0.433 | 0.667 | | −1.323 | 0.192 | | −0.494 | 0.624 | |
| 140-11-4 | −0.361 | 0.72 | | −1.357 | 0.181 | | −0.513 | 0.61 | |
| 1191-16-8 | −0.581 | 0.564 | | −2.268 | 0.028 | * | −0.529 | 0.599 | |
| 106-70-7 | −0.321 | 0.75 | | 0.802 | 0.426 | | −0.531 | 0.598 | |
| 110-62-3 | −0.572 | 0.57 | | 0.997 | 0.323 | | −0.568 | 0.573 | |
| 105-37-3 | −0.623 | 0.536 | | 1.964 | 0.055 | | −0.674 | 0.503 | |
| 55514-48-2 | −0.644 | 0.523 | | −0.889 | 0.378 | | −0.675 | 0.502 | |
| 123-92-2 | −0.725 | 0.472 | | 0.108 | 0.914 | | −0.771 | 0.444 | |
| 539-82-2 | −0.48 | 0.633 | | 2.273 | 0.027 | * | −0.802 | 0.426 | |
| 2432-51-1 | −0.956 | 0.344 | | 2.033 | 0.047 | * | −1.092 | 0.28 | |
| 128-37-0 | −0.856 | 0.396 | | 0.482 | 0.632 | | −1.17 | 0.247 | |
| 111-27-3 | −1.253 | 0.216 | | −0.542 | 0.59 | | −1.481 | 0.145 | |
| 928-95-0 | −1.842 | 0.071 | | −0.516 | 0.608 | | −1.521 | 0.134 | |
| 108-10-1 | −2.185 | 0.034 | * | 0.898 | 0.374 | | −2.138 | 0.037 | * |
| 106-32-1 | −1.436 | 0.157 | | 0.193 | 0.848 | | −2.36 | 0.022 | * |

TABLE 6

Revised multiple regression for identification of sweetness enhancing volatiles. Individual volatile compound concentrations were regressed against perceived sweetness intensity independent of effect from glucose, fructose, or sucrose, separately, using a partial least squares regression model. Compounds with p-values in bold were found to enhance intensity of sweetness independent of at least one of the three sugars.

| Name | Fructose t Ratio | Fructose p-Value | Glucose t Ratio | Glucose p-Value | Sucrose t Ratio | Sucrose p-Value |
|---|---|---|---|---|---|---|
| (E)-2-Decen-1-al | 3.692 | 0.001 | 3.493 | 0.001 | 1.408 | 0.165 |
| (E)-2-Hexen-1-ol | −1.842 | 0.071 | −2.137 | 0.037 | −0.515 | 0.609 |
| (E)-2-Hexen-1-yl butyrate | 1.482 | 0.144 | 1.284 | 0.205 | 2.556 | 0.014 |
| (E)-2-Hexenal | 3.35 | 0.002 | 3.314 | 0.002 | −0.817 | 0.418 |
| (E)-2-Hexenyl acetate | −0.313 | 0.756 | −0.33 | 0.743 | −0.056 | 0.956 |
| (E)-2-Octenal | 1.761 | 0.084 | 1.509 | 0.137 | 0.065 | 0.949 |
| (E)-2-Penten-1-al | 4.567 | 0 | 4.301 | 0 | 1.023 | 0.311 |

TABLE 6-continued

Revised multiple regression for identification of sweetness enhancing volatiles. Individual volatile compound concentrations were regressed against perceived sweetness intensity independent of effect from glucose, fructose, or sucrose, separately, using a partial least squares regression model. Compounds with p-values in bold were found to enhance intensity of sweetness independent of at least one of the three sugars.

| Name | Fructose t Ratio | Fructose p-Value | Glucose t Ratio | Glucose p-Value | Sucrose t Ratio | Sucrose p-Value |
|---|---|---|---|---|---|---|
| (Z)-2-Penten-1-al | 4.161 | 0 | 3.915 | 0 | 0.934 | 0.355 |
| (Z)-2-Penten-1-ol | −0.184 | 0.854 | −0.229 | 0.82 | −0.304 | 0.762 |
| (Z)-Linalool oxide | 1.868 | 0.067 | 1.561 | 0.125 | 1.954 | 0.056 |
| 1-Pentanol | | 0.655 | −1.48 | 0.145 | −0.542 | 0.590 |
| 1-Penten-3-ol | 1.773 | 0.082 | 0.297 | 0.767 | 1.938 | 0.058 |
| 1-Pentene-3-one | 5.097 | 0 | 1.628 | 0.11 | 0.795 | 0.430 |
| 2,3-Heptanedione | 0.143 | 0.887 | 4.697 | 0 | 2.409 | 0.020 |
| 2-Ethyl-1-hexanol | 1.188 | 0.24 | 0.003 | 0.997 | −0.646 | 0.521 |
| 2-Ethylhexyl acetate | 0.173 | 0.864 | 0.983 | 0.33 | 2.046 | 0.046 |
| 2-Heptanone | 1.054 | 0.297 | 0.21 | 0.835 | −1.049 | 0.299 |
| 2-Hexanone | 2.807 | 0.007 | 0.658 | 0.514 | 1.899 | 0.063 |
| 2-Methyl butyric acid | 2.009 | 0.05 | 2.789 | 0.007 | 0.767 | 0.447 |
| 2-Methyl-2-butanol | 0.736 | 0.465 | 2.035 | 0.047 | −0.287 | 0.775 |
| 2-Methylbutyl acetate | −0.433 | 0.667 | 0.666 | 0.508 | −0.308 | 0.760 |
| 2-Methylpropanoyl | 0.538 | 0.593 | −0.494 | 0.624 | −1.323 | 0.192 |
| 2-Octenal | −0.171 | 0.865 | 0.292 | 0.772 | 2.052 | 0.045 |
| 2-Pentyl butyrate | 2.31 | 0.025 | −0.394 | 0.695 | 1.383 | 0.173 |
| 3-Ethyloctane | 2.898 | 0.006 | 2.064 | 0.044 | 2.121 | 0.039 |
| 3-Hexanone | −0.216 | 0.829 | 2.665 | 0.01 | 0.608 | 0.546 |
| 3-Pentanone | 1.82 | 0.075 | −0.426 | 0.672 | 0.590 | 0.558 |
| 4-Methoxy-2,5-dimethyl-3(2H)-furanone | 2.415 | 0.019 | 1.576 | 0.121 | 0.911 | 0.366 |
| 6-Methyl-5-heptene-2-one | 2.526 | 0.015 | 2.185 | 0.033 | 0.299 | 0.766 |
| Amyl acetate | 0.884 | 0.381 | 2.165 | 0.035 | 1.431 | 0.158 |
| Amyl butyrate | 2.709 | 0.009 | 0.752 | 0.455 | 0.426 | 0.672 |
| Benzyl acetate | −0.361 | 0.719 | 2.516 | 0.015 | 2.292 | 0.026 |
| Butyl acetate | 2.178 | 0.034 | −0.512 | 0.611 | −1.356 | 0.181 |
| Butyl butanoate | 2.18 | 0.034 | 2.009 | 0.05 | 1.147 | 0.257 |
| Butyl isovalerate | 2.006 | 0.05 | 1.962 | 0.055 | 1.650 | 0.105 |
| Butylated hydroxytoluene | −0.856 | 0.396 | 1.957 | 0.056 | 1.663 | 0.103 |
| E-Nerolidol | 1.521 | 0.134 | −1.169 | 0.248 | 0.483 | 0.631 |
| Ethyl 2-methyl-2-butenoate | −0.644 | 0.523 | 1.203 | 0.235 | 1.000 | 0.322 |
| Ethyl 2-methylbutanoate | 1.96 | 0.056 | −0.676 | 0.502 | −0.887 | 0.379 |
| Ethyl butyrate | 2.533 | 0.014 | 1.993 | 0.052 | −0.786 | 0.436 |
| Ethyl caproate | 0.066 | 0.948 | 2.492 | 0.016 | 0.033 | 0.974 |
| Ethyl decanoate | 0.28 | 0.78 | 0 | 1 | 1.064 | 0.292 |
| Ethyl octanoate | −1.435 | 0.157 | 0.056 | 0.956 | 2.622 | 0.011 |
| Ethyl propionate | −0.622 | 0.536 | −1.52 | 0.135 | 0.193 | 0.848 |
| Ethyl valerate | −0.481 | 0.633 | −0.674 | 0.503 | 1.964 | 0.055 |
| Heptanal | 2.598 | 0.012 | −0.801 | 0.427 | 2.273 | 0.027 |
| Hexanal | 1.23 | 0.224 | 2.282 | 0.027 | 1.341 | 0.186 |
| Hexyl acetate | 2.345 | 0.023 | 1.177 | 0.245 | 0.209 | 0.835 |
| hexyl alcohol | −1.253 | 0.216 | 2.097 | 0.041 | 2.943 | 0.005 |
| Hexyl butyrate | 2.864 | 0.006 | 2.514 | 0.015 | 2.893 | 0.006 |
| Isopentyl acetate | −0.725 | 0.472 | −0.77 | 0.445 | 0.109 | 0.914 |
| Isopropyl butyrate | 2.311 | 0.025 | 2.141 | 0.037 | 1.256 | 0.215 |
| Isopropyl hexanoate | 0.237 | 0.813 | −0.056 | 0.955 | 2.210 | 0.032 |
| Linalool | 0.871 | 0.388 | 0.7 | 0.487 | −0.100 | 0.921 |
| Methyl (E)-2-butenoate | 0.247 | 0.806 | 0.537 | 0.594 | −1.397 | 0.168 |
| Methyl 2-hydroxybutanoate | 1.339 | 0.187 | 1.363 | 0.179 | 0.034 | 0.973 |
| Methyl anthranilate | −0.008 | 0.993 | 0.2 | 0.842 | 1.387 | 0.172 |
| Methyl butyrate | 1.455 | 0.152 | 1.453 | 0.152 | 0.418 | 0.678 |
| Methyl heptyl ketone | −0.267 | 0.791 | −0.466 | 0.643 | 1.192 | 0.239 |
| Methyl hexanoate | −0.321 | 0.75 | −0.531 | 0.598 | 0.801 | 0.427 |
| Methyl isobutyl ketone | −2.185 | 0.033 | −2.36 | 0.022 | 0.897 | 0.374 |
| Methyl isovalerate | 0.732 | 0.468 | 0.88 | 0.383 | 0.972 | 0.336 |
| Methyl thiobutyrate | −0.955 | 0.344 | −1.091 | 0.28 | 2.032 | 0.047 |
| Methyl thiolacetate | 0.476 | 0.636 | 0.416 | 0.679 | 1.037 | 0.305 |
| Methyl valerate | −0.405 | 0.687 | −0.414 | 0.68 | 0.662 | 0.511 |
| Myrtenal | 2.588 | 0.013 | 2.455 | 0.018 | −1.323 | 0.192 |
| Nonanal | 3.697 | 0.001 | 3.403 | 0.001 | 0.226 | 0.822 |
| Octanal | 0.87 | 0.388 | 0.684 | 0.497 | 0.169 | 0.866 |
| Octyl 2-methyl butyrate | 0.015 | 0.988 | −0.099 | 0.922 | 0.357 | 0.722 |
| Octyl acetate | 0.412 | 0.682 | 0.285 | 0.777 | 2.292 | 0.026 |
| Octyl butanoate | 0.959 | 0.342 | 0.815 | 0.419 | 2.644 | 0.011 |
| Octyl hexanoate | 0.391 | 0.698 | 0.254 | 0.8 | 2.709 | 0.009 |
| Octyl isovalerate | 0.362 | 0.719 | 0.228 | 0.821 | 2.026 | 0.048 |
| Pentanal | −0.572 | 0.57 | −0.568 | 0.572 | 0.996 | 0.324 |
| Perillyl acetate | 0.231 | 0.818 | 0.193 | 0.848 | 0.927 | 0.358 |
| Prenyl acetate | −0.581 | 0.564 | −0.529 | 0.599 | −2.268 | 0.028 |
| Propyl acetate | −0.49 | 0.627 | −0.453 | 0.653 | −0.222 | 0.826 |

TABLE 6-continued

Revised multiple regression for identification of sweetness enhancing volatiles. Individual volatile compound concentrations were regressed against perceived sweetness intensity independent of effect from glucose, fructose, or sucrose, separately, using a partial least squares regression model. Compounds with p-values in bold were found to enhance intensity of sweetness independent of at least one of the three sugars.

| Name | Fructose t Ratio | Fructose p-Value | Glucose t Ratio | Glucose p-Value | Sucrose t Ratio | Sucrose p-Value |
|---|---|---|---|---|---|---|
| Propyl butanoate | 0.88 | 0.383 | 0.639 | 0.526 | 2.420 | 0.019 |
| γ-Decalactone | 1.246 | 0.219 | 0.88 | 0.383 | 1.650 | 0.105 |

Example 4-Identifying Sweet-Enhancing Volatiles from Blueberry

Over the course of three years, consumer panelists rated overall liking, texture, sweetness, sourness, and flavor intensity of 19 southern highbush blueberry (*Vaccinium corymbosum* hybrids) genotypes in 30 sensory panels. Significant positive correlations to overall liking of blueberry fruit (P<0.001) were found with sweetness (R2=0.70), texture (R2=0.68), and flavor (R2=0.63). Partial least squares analysis was used to identify sugars, acids, and volatile compounds contributing to liking and sensory intensities, and revealed strong effects of fructose, pH, and several volatile compounds upon all sensory parameters measured.

Background

Thousands of volatile compounds contributing to aroma profiles of fruits have been identified in literature, some of which may be classified as spicy, flowery, fruity, resinous, balsamic, burnt, and foul. These compounds may contribute to characteristic blueberry aromas, such as fruity, floral, peachy, or grassy-green, although these compounds may produce different sensations when perceived ortho- or retronasally.

The biochemical components in fruit that contribute to flavor and taste are subject to the effects of blueberry genetics of different cultivars (G), production environment (E), and G×E interactions. Volatile levels have been shown to vary between *Vaccinium* species, cultivars, locations, progression through fruiting season, and storage conditions. It appears that the same volatile compound may exhibit different gradations of environmental variation in different genetic backgrounds, which sets the stage for a broader survey of G×E effects on sugars, acids and volatiles in the blueberry germplasm.

In an effort to better understand the genetic components of fruit quality, southern highbush blueberry fruit subject to numerous, uncontrollable environmental parameters were sampled to identify compounds that are important to the sensory experience. The end goal was to identify sugar, acid, and volatile compounds with a larger genetic versus environmental variation over an array of cultivars, locations, and years. To accomplish this, 19 blueberry cultivars were assayed for biochemical variation and evaluated in 30 sensory panels over the course of three years. Panelists rated fruit quality to create associations between the sensory experience and blueberry biochemistry. Six blueberry genotypes were selected for G×E analysis, allowing for comparison of flavor bio-chemistry of cultivars amongst three locations with different latitudes, weather characteristics, and management practices. In the process of this analysis, volatiles were analyzed for independent contribution to sweetness perception, and these data are presented below, including identification of volatiles with significant independent contributions to sweet perception as well as flavor intensity.

Methods

Plant Material and Environmental Data

Southern highbush blueberry (*V. corymbosum* L.) cultivars and advanced breeding selections evaluated in this study were 'Chickadee™' ('FLO4-235'), 'Emerald,' 'Endura™' ('FLO6-377'), 'Far-thing,' 'Kestrel™' ('FLO2-40'), 'Flicker™' ('FL96-43'), 'Meadowlark™' ('FL01-173'), 'Primadonna,' 'Scintilla,' 'Vireo™' ('FL05-107'), 'Windsor,' 'FL01-25,' 'FL06-435,' 'FL06-510,' 'FL06-571,' 'FL07-290,' 'FL08-22,' 'FL10-107,' and 'FL10-186.' Some recent cultivar releases indicated above have utilized the selection testing number for plant patent protection while a trade-marked name is recognized in commerce. The trade-marked names will be used throughout this manuscript ('Chickadee,' 'Endura,' 'Kestrel,' 'Flicker,' 'Meadowlark,' and 'Vireo'). Three kg of fruit was hand-harvested from either the UF Plant Science Research and Education Unit (UFPSREU lat. 29° 24'37"N, long. 82° 10'12' W) or two grower-cooperator farms located near Waldo, Fla. (lat. 29° 46'8"N, long. 82°7'53' W), and Haines City, Fla. (lat. 28° 3'26"N, long. 81° 33'50"W) the day prior to the consumer sensory panel and stored overnight at 4° C. 200 g of fruit was retained for biochemical analyses.

Genotypes investigated for G×E analysis were 'Emerald,' 'Endura,' 'Farthing,' 'Meadowlark,' 'Primadonna,' and 'Scintilla.' These six genotypes were grown in two locations (UFPSREU and Haines City, Fla.) and five genotypes were grown in a third location (Waldo, Fla.). Blueberry plants at UFPSREU and Haines City were grown under open field conditions while plants at Waldo were grown under protective high tunnels.

Sensory Analysis

Sensory analysis was conducted similar to described above for tomatoes and strawberries in Examples 1 and 3. Over the course of three years, 19 blueberry genotypes were evaluated in 30 sensory panels by 217 panelists, with an average of 92 panelists per panel. Panelists were trained with the scaling methods and were encouraged to return for the remainder of the study. Panelists rated overall liking, texture liking, sweetness, sourness, and flavor intensity using hedonic general Labeled Magnitude Scales (gLMS) (−100 to +100; −100=greatest disliking of any kind, +100=greatest liking of any kind) and intensity gLMS (0 to +100; 0=no sensation, 100=most intense sensation of any kind), which allow for improved comparison between panelists and between years (see Bartoshuk, L. M., et al., 2004 and Bartoshuk, L. M., et al., 2005). Panelists were also asked to rate the intensity of taste and flavor sensations of a hypothetical ideal blueberry on this scale. Each panelist received two to four berries of five to six genotypes in a single panel in a Williams design, which was generated by Compusense 5.6 (Compusense Inc., Guelph, Ontario, Canada). They were asked to eat the blueberries of each genotype at once, and to take a bite of cracker and sip of water in between samples. Ratings were recorded using Compusense software.

Measurement of Biochemical Components

Soluble solids content (SSC), titratable acidity (TA), and volatiles were quantified as described above for tomato and strawberries. The volatiles were collected for two hours via dynamic headspace with HaySep Q 80-100 porous polymer adsorbent (Valco Instruments Company Inc., Houston, Tex.) and eluted with methylene chloride and nonyl acetate as an elution standard. Elutions were run on an Agilent 7890A Gas Chromatograph Flame Ionization Detector (GC-FID) DB-5 column (30 m length×250 mm diameter×1 mm film) for quantification and on an Agilent 7890A Gas Chromatograph coupled to an Agilent 5977A Mass Selective Detector (GC/MSD) for qualification (Agilent, Santa Clara, Calif.). Integrated peak area of each signal was normalized for elution, fitted to relative pure chemical response, corrected for sample mass, and expressed as nanograms per gram fresh weight per hour (ng gFW-1 h-1). Response fitting was calculated using the response factor of pure chemical standards (Sigma-Aldrich, St. Louis, Mo.) run on the same instrument.

Glucose, fructose, and sucrose were extracted via solid phase extraction (SPE) and quantified on an Agilent 1260 Infinity Binary Liquid Chromatograph (LC) system coupled to an Agilent 6430 Triple Quadrupole (QQQ) (Agilent, Santa Clara, Calif.). Tissue was ground in N2(l), 100 mg was dissolved in 1.9 mL buffer (74% HPLC-grade water, 20% methanol, 5% acetic acid, and 1% 0.15 M lactulose internal standard), spun down for 20 min, and the resulting supernatant was filtered using Captiva Premium syringe layered 0.45 μm filters (Agilent, Santa Clara, Calif.), evaporated to 1 mL in a vacuum centrifuge (Heto VR-maxi, Heto-Holten A/S, Allerad, Denmark) at 50° C., and then added to 4 mL acetonitrile. Mega Bon-dElut NH2 columns (Agilent, Santa Clara, Calif.) were activated with 2 mL methanol followed by 5 mL 4:1 acetonitrile-water. The sample was then passed through the NH2 cartridge and sugars were eluted with 3 mL HPLC-grade water in an ultracentrifuge (Avanti J-25 Centrifuge, Beck-man Coulter Inc., Brea, Calif.) at 5000 rpm for 5 min. Samples were diluted 25-fold to be run on the LC. Isocratic mobile phase flow rate of 0.4 mL min-1 consisted of 80% channel A, aqueous 0.1% formic acid, and 20% channel B, 0.1% formic acid in acetonitrile. The Agilent Hi-Plex H column (300×6.5 mm) was held at a constant temperature of 30° C. An injection volume of 10 μL was used for all biological, standard, and quality control samples. Electrospray ionization helium gas temperature was 350° C. with a flow of 7 L min-1. Nebulizer pressure was at 60 psi and capillary potential was 2000 V. The QQQ was run in positive mode with an electron multiplier value of 200 and targets were observed using multiple reaction monitoring. A multiple compound standard series was used to establish individual compound response of sucrose, glucose, and fructose using MassHunter Quantitative Analysis (Agilent, Santa Clara, Calif.) soft-ware. Standards had a fixed lactulose concentration of 40 μM. Integrated area of sugars in biological samples were fitted to relative response, normalized for dilution, corrected for sample mass, and expressed as milligrams per gram fresh weight (mg gFW-1).

Statistical Analyses

Genotype, sensory and biochemical relationships. Genotypic relatedness based on pedigree and biochemical profiles were compared using hierarchical cluster analyses. Two-way ward cluster analysis of genotypic relatedness based on pedigree information was performed in R (R, Vienna, Austria). Two-way ward cluster analysis of genotypic relatedness based on bio-chemical profiles was constructed in JMP1 Pro 10 (SAS Institute Inc., Cary, N.C.) (data not shown here).

Pair-wise correlations and significance between sensory measurements and primary bio-chemical components were calculated, with panelist as a random effect. Least Square Means (LSMeans) of the sensory data for each sample were obtained to account of the random effect of panelist. A partial least squares (PLS) analysis was constructed in JMP1 Pro 10 (SAS Institute Inc., Cary, N.C.) to reveal effectors of sensory ratings (see, e.g., Togari N., et al., 1995; Hough, G., et al., 1996; deKermadec, F., et al., 1997; Toscas, P. J., et al., 1999; and Tenenhaus, M., et al., 2005). The response variables (Y) considered corresponded to LSMeans of overall liking, sweetness, sourness, and blueberry flavor intensity. Glucose, fructose, sucrose, TA, pH, and 52 volatile compounds were considered as explanatory variables (X). The inclusion of texture liking was evaluated independently given that no explanatory physical measure was made for sample texture. Variables were centered and scaled (hence, correlation matrices were used), and a 20-fold cross-validation method was used. The model was created without texture for analysis.

Results and Discussion

Over three seasons, 19 blueberry genotypes were assayed for overall liking, texture liking, perceived sweetness, sourness, and flavor intensities by 217 panelists in 30 sensory panels, and for the biochemical measures of sucrose, glucose, fructose, soluble solids content (SSC), titratable acidity (TA), pH, and 52 volatiles. A PLS model was constructed to determine the most relevant biochemical effectors of liking, intensity of sweetness, sourness, and blueberry flavor.

Blueberry Genotypes Vary Significantly in Scores for Liking and Perceived Sensory Intensities Genotypic relatedness based on pedigree and biochemical profiles were compared using hierarchical cluster analyses (data not shown). Of 153 blueberry samples assayed in sensory panels, every sample scored in the positive region of the hedonic scales (−100,+100) for overall liking and texture liking (data not shown). Panelists scored berry texture on the hedonic gLMS scale to reduce artificially low scores in other scales in the incidence of poor texture. They then rated the individual sensory experiences of sweetness, sourness, and blueberry flavor on an intensity gLMS scale (0,+100) (Data for sweetness only presented in FIG. 3). Additionally, panelists were asked to assign intensities of these sensory experiences with regard to an ideal blueberry. No genotype met panelists' ideal sweetness intensity (FIG. 3). In sensory studies with tomato (*Solanum lycopersicum* L.) and strawberry (*Fragaria* x *ananassa* Duchesne) described in Examples 1-3, above, panelists rated actual samples using the same scales and also indicated ideal sensory intensities for these fruits. This hypothetical blueberry value fell between the ideal sweetness scores (intensity gLMS scale) given for strawberry (42) and tomato (33). This expectation that blueberry be sweeter than tomato is understandable given tomatoes' savory role in culinary preparation. However, the expectation that a strawberry be sweeter than a blueberry is curious given their similar uses as fresh fruit and dessert, and blueberry's typically higher sugar content compared to strawberry.

Intensity of blueberry flavor exhibited the least variation in sample scores compared to perceived sweetness and sourness (1.5-fold variation; data not shown), and like sweetness, also fell short of the panelists' ideal flavor intensity. The lack of variation in flavor intensity among the 19 genotypes assessed may be due to poor panelist understanding of flavor (as opposed to taste), limited genetic diversity in flavor in the germplasm, or a combination of the two. Panel favorite 'Scintilla' had an above average flavor intensity (29), second only to 'Kestrel' (32), which was also highly rated by panelists (24). In comparison, the ideal flavor intensities desired for strawberry and tomato were higher (45). Given the quantities of volatiles reported in the literature for these three fruits via comparable collection methods and expressed in in ng gFW-1 h-1, blueberry emits fifteen times the volatiles compared to tomato, and about a third the volatiles emitted by strawberry. While this might explain why the panelists would expect an ideal strawberry to be more flavorful, it draws into question why the flavor intensity of an ideal tomato be higher than an ideal blueberry. The perceivable sensory differences among blueberry genotypes indicate that the diversity in biochemical makeup is sufficiently variable to extract meaningful information relating to the sensory experience.

Figure 4A:
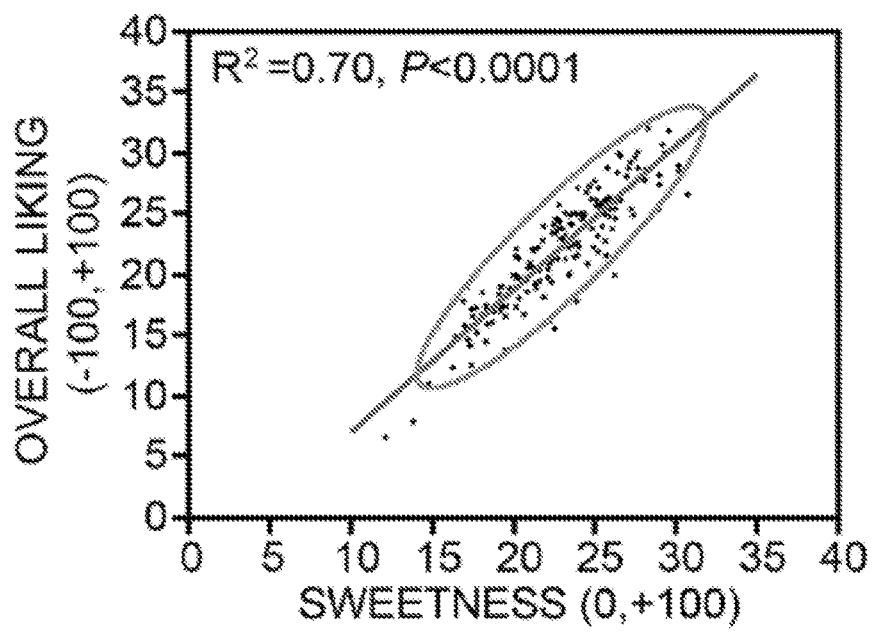
FIGS. 4 A, B, and C are a group of graphs illustrating significant pair-wise correlations between sensory measurements and primary biochemical components. Overall liking was fitted to sweetness in FIG. 4A. The LSMeans of sensory responses per sample were fit to sample biochemical measures for 4B and C. Overall liking was also fitted to biochemical measures of total sugars in FIG. 4B. Sweetness was also fit to biochemical measures of TA for FIG. 4C. Coefficient of determination (R2) and P-value of fit is listed with individual scatterplots. Line represents linear fit, and ellipse indicates 95% confidence range of data.
Figure 4B:
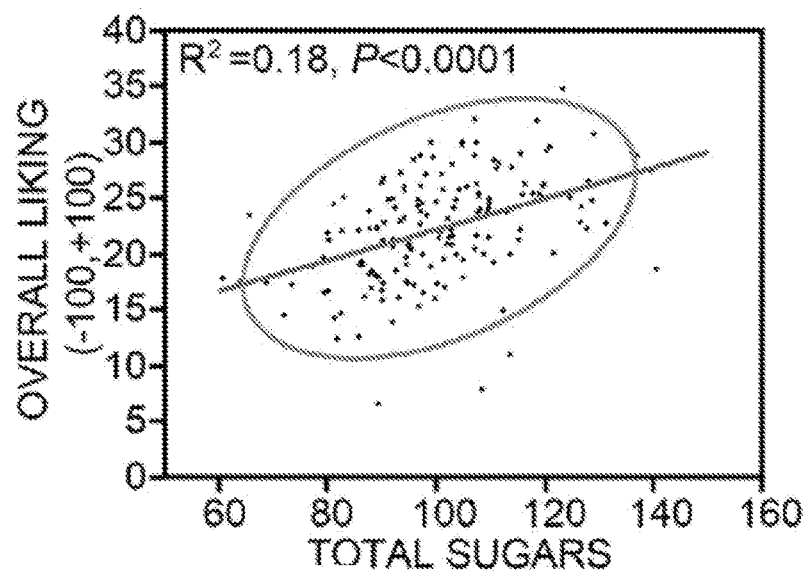

Overall Liking of Blueberries is Strongly Related to Favorable Texture, Intensities of Sweetness, Flavor and Sourness To determine which sensory predictors measured in this study influenced the overall blueberry eating experience, pair-wise correlations between each panelists' scores of overall liking, favorability of texture, and the sensory intensity measures of sweetness, sourness, and flavor were individually fitted (FIGS. 4A, B, and C illustrate significant relationships with respect to sweetness; data for other measures not shown). These four measures were all individually significant contributors to the response overall liking of blueberry fruit (P<0.001) with the best fit indicated by sweetness intensity ($R2=0.70$), followed by liking of berry texture ($R2=0.68$), and flavor intensity ($R2=0.63$). Sourness intensity had a significantly negative relationship with overall liking ($R2=0.55$). Overall liking increased as the texture was perceived as better, and as the fruit was more intensely sweet and flavorful.

When the panel means (as opposed to individual panelist scores) of sensory measures were fit against each other, fits for texture, sourness, and flavor against overall liking went down ($R2=0.14$, $R2=0.35$, $R2=0.22$, respectively, P<0.0001) while the fit for sweetness went up ($R2=0.81$, P<0.0001). Changes in fit may be due to the elimination of personal bias for these sensory parameters when averages were used rather than individuals' associations between ratings. This may also be due to the large range of the gLMS scales, and the variation in range use of the scales among panelists, which is accounted for when each panelist can be treated as a random effect.

Figure 4C:
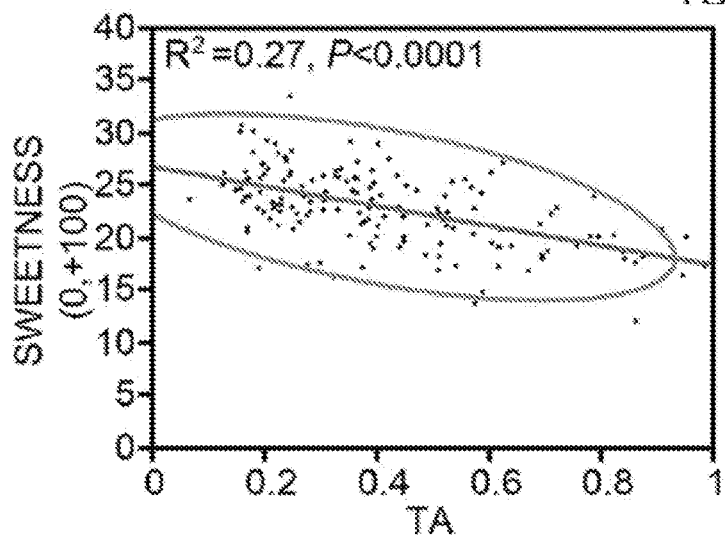

In considering primary biochemical drivers of the sensory experiences, sugars and acids are principal contributors to taste. A commonly used indicator of fruit quality has been the ratio of soluble solids to titratable acidity (TA) of fruit. While SSC/TA was significantly correlated to overall liking, sweetness, and sourness in linear pairwise regressions, the individual measures SSC and TA explained more of the variance in sensory ratings than did the ratio. Overall liking was significantly positively correlated to concentrations of all sugars (best fit was Total Sugars, $R2=0.20$, P<0.001, FIG. 4B) and negatively with increasing TA ($R2=0.14$, P<0.001). Perceived sweetness is best explained by measures of sugars, including Fructose ($R2=0.27$, P<0.0001), Total Sugars ($R2=0.26$, P<0.0001), SSC ($R2=0.25$, P<0.0001), and Glucose ($R2=0.20$, P<0.0001). Although still significant, measures of Sucrose are much less suitable as a predictor of sweetness ($R2=0.08$, P=0.0004). Sucrose was present in very low amounts in the blueberry fruit surveyed, accounting for 1.6% of total sugars on average. Sweetness was negatively correlated with TA ($R2=0.27$, P<0.0001, FIG. 4C), while TA explained over half of perceived sourness ($R2=0.56$, P<0.0001). An even better explanatory variable of perceived sourness was pH ($R2=0.59$, P<0.0001).

However, more sugar does not always equate to more sweetness. Of the top five sweetest samples, none of these was in the top five for total sugar concentration. In fact, 'Primadonna' (2014 H1—first harvest from Haines City in 2014) was the fourth sweetest berry among all thirty panels, and had a below average concentration total sugars. Conversely, 'Emerald,' (2013, H2), which had the highest total sugar concentration of all samples assayed (140.4 mg gFW-1 vs. average=100.5 mg gFW-1), scored below average for sweetness intensity (21 vs. average 23) and liking (20 vs. average 22), underscoring the sensory importance of many other compounds in the fruit matrix. This 'Emerald' sample was very acidic (pH=3.0, average=3.5; TA=0.91, average=0.41), while the 'Primadonna' sample was sub-acid (pH=3.6; TA=0.18). As shown above, for both strawberry and tomato fruits, aromatic volatile compounds were discovered to contribute to sweetness beyond the effects of sugars. The data from the present example was used to identify additional volatile compounds from blueberry that contribute to the perception of sweetness independent of the sugar content, Relating the Human Experience to Biochemical Makeup Since overall enjoyment of blueberries has been highly correlated with sweetness, flavor acceptability and blueberry-like flavor intensity, and the sensory experience is influenced by numerous compounds released upon blueberry mastication, an appropriate model to detect complex connections between these disciplines was sought. In this study a PLS model was used to explain the hedonic and sensory components associated with eating blueberries using bio-chemical measurements. Texture liking, for which no physical measure was made, was included in the explanatory variables, along with glucose, fructose, sucrose, TA, pH, and 52 volatile compounds, to explain the sensory components of overall liking, sweetness, sourness, and flavor.

The variation of each sensory aspect explained by the six highest and lowest biochemical effectors is shown in Table 7. The sensory parameter with the most variation explained by bio-chemical measures was sourness, with 78% accounted for. The monosaccharide fructose was the most impactful effector of overall liking, sweetness and flavor, and detractor from sourness (Table 7). Its structural isomer glucose was also important in overall liking, sweetness, and flavor, but did not act to decrease sourness in this model. Fructose has been shown to be perceivably sweeter than glucose at equivalent concentrations (see Mahawanich, T., et al., 2004) It is known that the human sweetness receptor on the tongue undergoes varying conformational changes depending on the structure of the ligand that binds (e.g. fructose vs. glucose vs. artificial sweeteners), resulting in different degrees of perceived sweetness (see Vigues S., et al., 2009). In the present study, sucrose did not contribute significantly to sweetness as it only accounts for approximately 1-2% of total blueberry sugars. Acidity as determined by pH also appeared to be important in all four sensory components assayed. TA was not associated with flavor but is a strong factor in the other three sensory components.

Flavor had a strong relationship with fructose and pH, in addition to several volatiles also implicated in contributing to sweetness and sourness in this dataset (Table 7). The influence of pH and fructose on the olfactory-mediated response of flavor may be due to difficultly for untrained consumer panelists to isolate flavor from taste. However, this could also be due to the integration of aromatics with taste in the fruit matrix and the brain; for example, pH can affect volatile emission in fruit tissue (See Yu T H, et al., 1989), and relative concentrations of compounds in solution can dramatically change their associated olfactory responses (See Niimura Y., 2012). Interactions between taste and retronasal olfaction can occur as described above. For example, sweetness and other aromas have been shown to be enhanced depending on the combination of taste molecules and volatile molecules present in an ingested sample.

Some of the volatiles included in the PLS model contribute to the explanation of more than one sensory descriptor as rated by the panelists. Volatile compounds β-caryophyllene oxide (CAS#1139-30-6) and 2-heptanone (CAS#110-43-0) are linked to an increase in overall liking, sweetness, and flavor in blueberries. β-Caryophyllene oxide has been identified in black currant (Ribes nigrum L.), black ground pepper (Piper nigrum L.), and hops (Humulus lupulus L.) and has been described orthonasally as "spicy" (See Golebiowski, M. et al. 2008). 'Meadowlark' constitutes samples with the highest concentrations of 2-heptanone, distributed across all years (2012-2014) and all locations (UFPSREU, Haines City, Waldo). 2-Heptanone has also been reported in strawberry, apple (Malus domestica Borkh.), and passion fruit (Passiflora edulis Sims) (see Dimick P S, et al., 1983).

Another pervasive compound, neral (CAS#106-26-3), is positively associated with liking and sweetness, but negatively associated with sourness. Neral is a geometric isomer of geranial, which together are recognized as 'citral,' and characteristic of lemon (Citrus x limon L.). Although geranial is also found in these blueberry samples, it was not identified as contributing to the sensory experience, highlighting the point that enantiomers may have significantly different sensory qualities.

The favorability of the fruit was negatively associated with several volatile compounds in this study, including two compounds that have often been associated with typical blueberry flavor in literature, linalool (CAS#78-70-6) and 1,8-cineole (CAS#470-82-6). In this PLS model, linalool and 1,8-cineole detracted from overall liking, sweetness and flavor. 1,8-Cineole also contributed to sourness. 1,8-Cineole was highest in samples which were harvested in the earliest part of the season (late March). Interestingly, linalool was highest in samples which were all harvested from the Waldo location (high tunnel production). E-2-Hexenal (CAS#6728-26-3), which has been described orthonasally as fresh, leafy green, floral, sweet, and pungent also reduced liking and sweetness in the model, and was a positive effector of sourness. This compound constituted the largest proportion of total volatile emission, and was especially high in early season selections during 2014. Two volatiles that were unique to explaining increases in blueberry flavor intensity were 2-undecanone (CAS#112-12-9) and 3-methyl-1-butanol (CAS#123-51-3). 2-Undecanone was characteristic of the variety 'Scintilla.' It has been previously reported in red raspberries (Rubus idaeus L.) and blackberries (Rubus spp. hyb), and has been described orthonasally as floral and citrusy (see Klesk, K., et al., 2004 and Quain, M. C., et al., 2005). 3-Methyl-1-butanol—a sweet, fruity, brandy-like compound found in tequila (Agave tequilana Weber), and grape (Vitis vinifera L.) and apple wines—was produced in the largest quantities by 'Farthing' and 'Scintilla'. Increasing these two volatile compounds in the breeding germplasm could result in increased flavor intensity, as desired by blueberry consumers.

Conclusions

Genotypic variation exists for sensory components, and there is a large perceivable range of derived pleasure and intensity of sensory components when eating blueberries. The blueberry flavor formula presented here may not be applicable to all humans due to genetic variation in human sensory perception: there are approximately 400 genes that encode olfactory receptors in humans, among which nearly 6000 polymorphic events have been identified, resulting in high allelic diversity between individuals (see Niimura, Y., et al., 2012 and Olander, T., et al., 2012). However, by collecting sensory and biochemical data from multiple year, location, and genotype trials, a broad enough sample was generated to determine specific biochemical compounds affecting blueberry flavor and independently contributing to perception of sweetness intensity.

Based on the identification of blueberry volatiles and the described multivariate regression analysis, the following blueberry volatiles were identified as independently enhancing perception of sweetness: β-caryophyllene oxide (CAS#1139-30-6), neral (CAS#106-26-3), and 2-heptanone (CAS#110-43-0). Two additional volatiles that were significant to flavor intensity included: 2-undecanone and 3-methyl-1-butanol.

These volatiles can be combined together, or with other sweet-enhancing volatiles from other foods (e.g., other fruits, such as those described in the other Examples herein) to make a sweetness enhancing composition of the present disclosure for additional enhancement of sweetness.

TABLE 7

Blueberry biochemical measures explaining hedonic and sensory intensity ratings

| Response | Percent Explained$^F$ | Factor | PLS Coefficient |
|---|---|---|---|
| Overall Liking | 68% | Fructose | 0.2159 |
| | | β-Caryophyllene oxide (CAS#1139-30-6) | 0.1455 |
| | | Glucose | 0.1433 |
| | | Neral (CAS#106-26-3) | 0.1170 |
| | | pH | 0.0907 |
| | | 2-Heptanone (CAS#110-43-0) | 0.0871 |
| | | Phenylacetaldehyde (CAS#122-78-1) | −0.0816 |
| | | Linalool (CAS#78-70-6) | −0.0836 |
| | | Hexanoic acid (CAS#142-62-1) | −0.0999 |
| | | E-2-Hexenal (CAS#6728-26-3) | −0.1211 |
| | | 1,8-Cineole (CAS#470-82-6) | −0.1912 |
| | | TA | −0.2015 |

TABLE 7-continued

Blueberry biochemical measures explaining hedonic and sensory intensity ratings

| Response | Percent Explained[z] | Factor | PLS Coefficient |
|---|---|---|---|
| Sweetness | 71% | Fructose | 0.2237 |
| | | Glucose | 0.1504 |
| | | β-Caryophyllene oxide (CAS#1139-30- | 0.1418 |
| | | pH | 0.1319 |
| | | Neral (CAS#106-26-3) | 0.1197 |
| | | 2-Heptanone (CAS#110-43-0) | 0.0922 |
| | | Phenylacetaldehyde (CAS#122-78-1) | −0.0777 |
| | | Linalool (CAS#78-70-6) | −0.0787 |
| | | Hexanoic acid (CAS#142-62-1) | −0.1003 |
| | | E-2-Hexenal (CAS#6728-26-3) | −0.1253 |
| | | 1,8-Cineole (CAS#470-82-6) | −0.1925 |
| | | TA | −0.2402 |
| Sourness | 78% | TA | 0.3105 |
| | | 1,8-Cineole (CAS#470-82-6) | 0.1444 |
| | | E-2-Hexenal (CAS#6728-26-3) | 0.1378 |
| | | 2-Nonanone (CAS#821-55-6) | 0.1145 |
| | | Hexanoic acid (CAS#142-62-1) | 0.0953 |
| | | Z-2-penten-1-ol (CAS#1576-95-0) | 0.0726 |
| | | 6-Methyl-5-hepten-2-one (CAS#110- | −0.0666 |
| | | 1-Hexanol (CAS#111-27-3) | −0.0783 |
| | | Fructose | −0.0863 |
| | | Methyl isovalerate (CAS#556-24-1) | −0.0925 |
| | | Neral (CAS#106-26-3) | −0.0929 |
| | | pH | −0.2573 |
| Flavor | 60% | Fructose | 0.1856 |
| | | β-Caryophyllene oxide (CAS#1139-30- | 0.1527 |
| | | 2-Undecanone (CAS#112-12-9) | 0.1404 |
| | | Glucose | 0.1392 |
| | | 2-Heptanone (CAS#110-43-0) | 0.1304 |
| | | 3-Methyl-1-butanol (CAS#123-51-3) | 0.0960 |
| | | Phenylacetaldehyde (CAS#122-78-1) | −0.0625 |
| | | Methyl isovalerate (CAS#556-24-1) | −0.0625 |
| | | Linalool (CAS#78-70-6) | −0.0823 |
| | | Methyl hexanoate (CAS#106-70-7) | −0.0861 |
| | | 1,8-Cineole (CAS#470-82-6) | −0.0876 |
| | | pH | −0.1264 |

Top six and bottom six biochemical measures explaining sensory responses as determined by partial least squares (PLS) analysis. Model explains 64% of the variation in sensory components of overall liking, sweetness, sourness, and flavor with biochemical measures of glucose, fructose, sucrose, TA, pH, and 52 volatile compounds.

[z]Percent variation of each individual sensory parameter explained by the biochemical measures in the overall model is presented.

TABLE 8

Multiple regression analysis for volatiles identified in blueberries. For p < about.05, the volatile makes a contribution to sweetness that is independent of the measures of at least one sugar (fructose, glucose, and/or sucrose). For compounds that make a contribution to sweetness independent of one of the sugars, the compounds is in bold.

| Name | Fructose t Ratio | Fructose p-Value | Glucose t Ratio | Glucose p-Value | Sucrose t Ratio | Sucrose p-Value |
|---|---|---|---|---|---|---|
| (—)-Caryophyllene oxide | 1.845 | .068 | 1.608 | .111 | .982 | .328 |
| (E)-2-Hexen-1-ol | −.573 | .568 | −0.733 | .465 | −0.872 | .385 |
| (E)-2-hexen-1-yl butyrate | −.882 | .380 | −1.391 | .167 | −2.825 | .006 |
| (E)-2-Hexenal | −1.023 | .309 | −1.124 | .264 | −0.899 | .371 |
| (E)-2-Pentenal | −2.696 | .008 | −2.110 | .037 | −.676 | .501 |
| (Z)-2-Penten-1-ol | −2.041 | .044 | −1.775 | .079 | −1.102 | .273 |
| (Z)-6-Octen-2-one | .358 | .721 | 0.472 | .638 | −0.480 | .632 |
| (Z)-linalool oxide (furanoid) | 1.154 | .251 | 1.356 | .178 | 1.079 | .283 |
| ? | −1.824 | .071 | −1.569 | .120 | −1.345 | .182 |
| 1-(1,4-dimethyl-1-cyclohex-3-enyl)ethanone | 1.546 | .125 | .978 | .330 | 0.997 | .321 |
| 1-Hexanol | 1.345 | .182 | 0.086 | .932 | .170 | .866 |
| 1-Pentanol | 1.365 | .175 | 1.574 | .119 | 1.936 | .056 |
| 1-penten-3-ol | −1.677 | .097 | −1.519 | .132 | −0.612 | .542 |
| 2,2,4-Trimethyl-1,3-pentanediol diisobutyrate | .208 | .835 | .952 | .343 | .930 | .355 |
| 2,4,4-Trimethyl-1,3-pentanediol 1-isobutyrate | .748 | .456 | 1.474 | .144 | 1.606 | .111 |
| 2,7-Dimethylnaphthalene | .285 | .776 | .627 | .532 | −0.164 | .870 |
| 2-ethyl-1-hexanol | −.781 | .437 | −2.090 | .039 | −1.438 | .154 |

TABLE 8-continued

Multiple regression analysis for volatiles identified in blueberries. For p < about .05, the volatile makes a contribution to sweetness that is independent of the measures of at least one sugar (fructose, glucose, and/or sucrose). For compounds that make a contribution to sweetness independent of one of the sugars, the compounds is in bold.

| Name | Fructose t Ratio | Fructose p-Value | Glucose t Ratio | Glucose p-Value | Sucrose t Ratio | Sucrose p-Value |
|---|---|---|---|---|---|---|
| 2-heptanone | 3.914 | .000 | 2.683 | .009 | 2.370 | .020 |
| 2-hexenyl acetate | −1.423 | .158 | −.724 | .471 | −1.372 | .173 |
| 2-Nonanone | −.899 | .371 | −.649 | .518 | −.488 | .627 |
| 2-Octanone | 2.049 | .043 | 1.592 | .114 | 1.062 | .291 |
| 2-pentanone | −.067 | .947 | −0.824 | .412 | −.596 | .553 |
| 2-Undecanone | .854 | .395 | 1.079 | .283 | 1.407 | .163 |
| 3-Methyl-1-butanol | .250 | .803 | 1.213 | .228 | 1.840 | .069 |
| 3-methylbut-2-enyl acetate | −.658 | .512 | −0.333 | .740 | −1.735 | .086 |
| 3-Methylbutanal | .535 | .594 | 1.031 | .305 | 0.754 | .453 |
| 6-Methyl-5-heptene-2-one | 2.709 | .008 | 0.983 | .328 | .061 | .951 |
| 6-methylheptan-2-one | −.686 | .495 | 0.108 | .914 | −1.003 | .318 |
| carvone | −.855 | .395 | .489 | .626 | 1.472 | .144 |
| cis-3-Hexenyl acetate | −.288 | .774 | −.899 | .371 | −1.713 | .090 |
| citral | −1.804 | .074 | −.790 | .431 | 1.360 | .177 |
| dioctyl ether | .828 | .410 | 1.914 | .058 | 1.459 | .148 |
| D-Limonene | 1.176 | .242 | .954 | .342 | .609 | .544 |
| Dodecane | 1.736 | .086 | 1.812 | .073 | 1.931 | .056 |
| Ethyl hexanoate | 1.734 | .086 | .648 | .519 | −0.008 | .994 |
| Ethyl isobutyrate | −.420 | .675 | −0.292 | .771 | −0.111 | .912 |
| Ethyl propionate | −.251 | .802 | −1.070 | .287 | −1.224 | .224 |
| Ethylcyclohexane | .751 | .455 | −1.028 | .306 | −0.849 | .398 |
| Eucalyptol | −2.747 | .007 | −2.230 | .028 | −2.407 | .018 |
| geraniol | −1.093 | .277 | −.029 | .977 | 1.354 | .179 |
| Geranyl acetone | 1.688 | .095 | .402 | .689 | −.706 | .482 |
| heptanal | .162 | .871 | 0.481 | .631 | 1.270 | .207 |
| hexanal | 2.832 | .006 | 2.259 | .026 | 2.159 | .033 |
| Hexanoic acid | −.922 | .359 | −2.896 | .005 | −3.108 | .002 |
| hexyl acetate | .302 | .763 | −.214 | .831 | −.140 | .889 |
| hexyl butyrate | −.337 | .737 | .070 | .944 | −.784 | .435 |
| isopentyl acetate | .240 | .811 | −0.136 | .892 | −1.180 | .241 |
| Linalool | −2.631 | .010 | −3.589 | .001 | −1.961 | .053 |
| methyl butyrate | .059 | .953 | −0.545 | .587 | −0.801 | .425 |
| Methyl hexanoate | .596 | .552 | −0.621 | .536 | −1.260 | .211 |
| Methyl isovalerate | 2.158 | .033 | 2.150 | .034 | 2.238 | .027 |
| Methyl salicylate | −2.202 | .030 | −1.772 | .079 | .103 | .918 |
| neryl acetone | 2.330 | .022 | .849 | .398 | −.242 | .809 |
| Nonanal | −1.789 | .077 | 2.692 | .008 | −1.620 | .108 |
| Pentanal | .623 | .535 | 0.443 | .659 | 1.265 | .209 |
| Phenylacetaldehyde | .569 | .571 | −.915 | .362 | −2.960 | .004 |
| propan-2-yl 3-methylbutanoate | 2.460 | .016 | −2.710 | .008 | 3.084 | .003 |
| toluene | .028 | .978 | 0.046 | .964 | 0.973 | .333 |
| trans-2-Hexenoic acid | .352 | .725 | .134 | .893 | .612 | .542 |
| Tridecane | .861 | .391 | 1.189 | .237 | 1.038 | .302 |

Example 5—Orange Volatile Analysis

Volatile content of orange juice was assessed and analyzed similar to as described above for tomato, strawberry, and blueberry, described above. The process for obtaining volatile samples from orange juice was slightly different than for tomatoes, strawberries and blueberries. The volatile collection and identification was performed generally as described in Bai, Jinhe, et al. ("Changes in volatile and Non-volatile Flavor Chemicals of "Valencia" Orange Juice over the Harvest Seasons," Foods 2016, 5, 4), which is hereby incorporated by reference herein regarding the process of sample preparation, and chemical identification and analysis. Briefly, instead of collecting volatiles at room temperature from a fruit mash in headspace of a closed area, the volatiles were elicited by heating the juice to collect volatiles.

Regression analysis with respect to volatiles independently associated with sweetness was performed using partial least squares regression modeling as described in Examples 2 and 3, above, and results are presented in Table 9. The volatile compounds in bold were identified as having an independent enhancing effect on sweetness.

The following isolated orange volatile compounds were further used for additional testing (see Example 6, below): octyl acetate, heptanal, methyl octanoate, hexanal, vanillin, nonanal, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol,(Z)-, and b-sinensal.

These volatiles can be combined together, or with other sweet-enhancing volatiles from other foods (e.g., other fruits, such as those described in the other Examples herein) to make a sweetness enhancing composition of the present disclosure for additional enhancement of sweetness.

TABLE 9

Multiple regression analysis for volatiles identified in orange juice.
For p < about .05 (bold), the volatile makes a contribution to sweetness
that is independent of the measures of sugar. Full data set for all
identified orange volatiles not presented here; this table includes the
data for volatiles having a p value indicating a significant contribution
to sweetness (bold), as well as some of the other volatile compounds.

| Name | Total Sugar t Ratio | Total Sugar p-Value |
|---|---|---|
| pentadecane | 5.029 | 0 |
| octyl acetate | 4.577 | 0 |
| heptanal | 4.348 | 0 |
| γ-Selinene | 4.272 | 0 |
| methyl octanoate | 3.484 | 0.001 |
| E,E-alloocimene | 3.337 | 0.002 |
| Silane, trimethyl[5-methyl-2-(1-methylethyl)phenoxy]- | 3.223 | 0.003 |
| Malonic acid, bis(2-trimethylsilylethyl ester | 3.148 | 0.003 |
| hexanal | 3.145 | 0.003 |
| vanillin | 2.945 | 0.005 |
| α-panasinsen | 2.909 | 0.006 |
| RI1643 | 2.824 | 0.007 |
| 4-thujene | 2.817 | 0.008 |
| nonanal | 2.815 | 0.008 |
| 2-Penten-1-ol, (Z)- | 2.795 | 0.008 |
| 4-(1-methylethenyl)-1-cyclohexene-1-methanol acetate | 2.77 | 0.009 |
| β-cadinene | 2.69 | 0.01 |
| carveol, trans | 2.542 | 0.015 |
| 1-octen-3-one | 2.517 | 0.016 |
| RI1784 | 2.487 | 0.017 |
| γ-vetivenene | 2.469 | 0.018 |
| pentanal | 2.468 | 0.018 |
| α-selinene | 2.428 | 0.02 |
| α-terpineol | 2.407 | 0.021 |
| dodecanal | 2.368 | 0.023 |
| RI1630 | 2.323 | 0.026 |
| carvone | 2.299 | 0.027 |
| neryl propanoate/Geranyl isobutanoate | 2.298 | 0.027 |
| hexyl butanoate | 2.29 | 0.028 |
| valencene | 2.206 | 0.033 |
| E-2-hexenal | 2.165 | 0.037 |
| RI1692 | 2.146 | 0.038 |
| copaene | 2.06 | 0.046 |
| α-ionone. | 2.042 | 0.048 |
| unkown terpene (RI 1818) | 2.009 | 0.051 |
| ethyl 3-hydroxyhexanoate | 1.997 | 0.053 |
| E-cyclododecene | 1.966 | 0.056 |
| octanal | 1.921 | 0.062 |
| unkown terpene (RI 1695) | 1.83 | 0.075 |
| citronellyl acetate | 1.827 | 0.075 |
| Silanediol, dimethyl- | 1.781 | 0.083 |
| camphor | 1.781 | 0.083 |
| Eremophilene | 1.738 | 0.09 |
| 2-methyl-furan | 1.698 | 0.097 |
| ethyl hexanoate | 1.682 | 0.101 |
| octanoic acid | 1.622 | 0.113 |
| RI1825 | 1.61 | 0.116 |
| RI2123 | 1.572 | 0.124 |
| Nerolidol | 1.569 | 0.125 |
| b-caryophyllene/aromadendrene | 1.565 | 0.126 |
| RI1802 | 1.541 | 0.131 |
| RI0449 | 1.422 | 0.163 |
| geranyl acetate | 1.41 | 0.167 |
| Neryl acetate | 1.396 | 0.171 |
| E-2-octenal | 1.387 | 0.173 |
| β-ionone | 1.28 | 0.208 |
| E-p-mentha-2,8-dien-1-ol | 1.258 | 0.216 |
| RI1907 | 1.227 | 0.227 |
| RI1879 | 1.209 | 0.234 |

Example 6-Direct Testing of Volatile-Enhanced Sweetness

Volatile organic compounds can enhance sweetness, as demonstrated in the examples above. However, in over 25 years, few such volatiles have been identified. It was recently discovered as described in Example 1 that volatile-enhanced-sweetness is far more common than previously suspected and makes a substantial contribution to the sweetness of fruit (e.g., fruit sweetness can double with appropriate volatiles). The purpose in the present example was to quantify this effect in the laboratory using a selected set of the sweet-enhancing volatiles identified in revised regression analysis of tomato and strawberry volatiles (Examples 2-3).

Procedures and Results

In brief, all fruit crops were grown and harvested to commercial standards in Florida within their respective seasons over multiple harvest years, as described in the examples above. Numerous cultivars of tomato, strawberry, and blueberry fruits were assayed as described above for taste and flavor qualities like (and among others) simple sugars, simple acids, and volatile molecules using conventional qualitative and quantitative methods (biochemical assays, spectrophotometric, titration, GC-MS, LC-MS). These biochemical data were then statistically related to psychophysical data gained from human taste panels conducted (as described in the Examples above) in parallel to the biochemical inventorying using sophisticated hedonic and sensory scales (hedonic) general labeled magnitude scale (h-gLMS) to identify biochemicals with direct association to desirable taste and flavor aspects of each fruit (Tieman et al. 2012; Schwieterman et al. 2014; Gilbert et al., 2015). Detailed analysis of the individual fruit systems resulted in identification of specific volatiles that positively influence perceived sweetness without the contribution of sugar.

Figure 5:
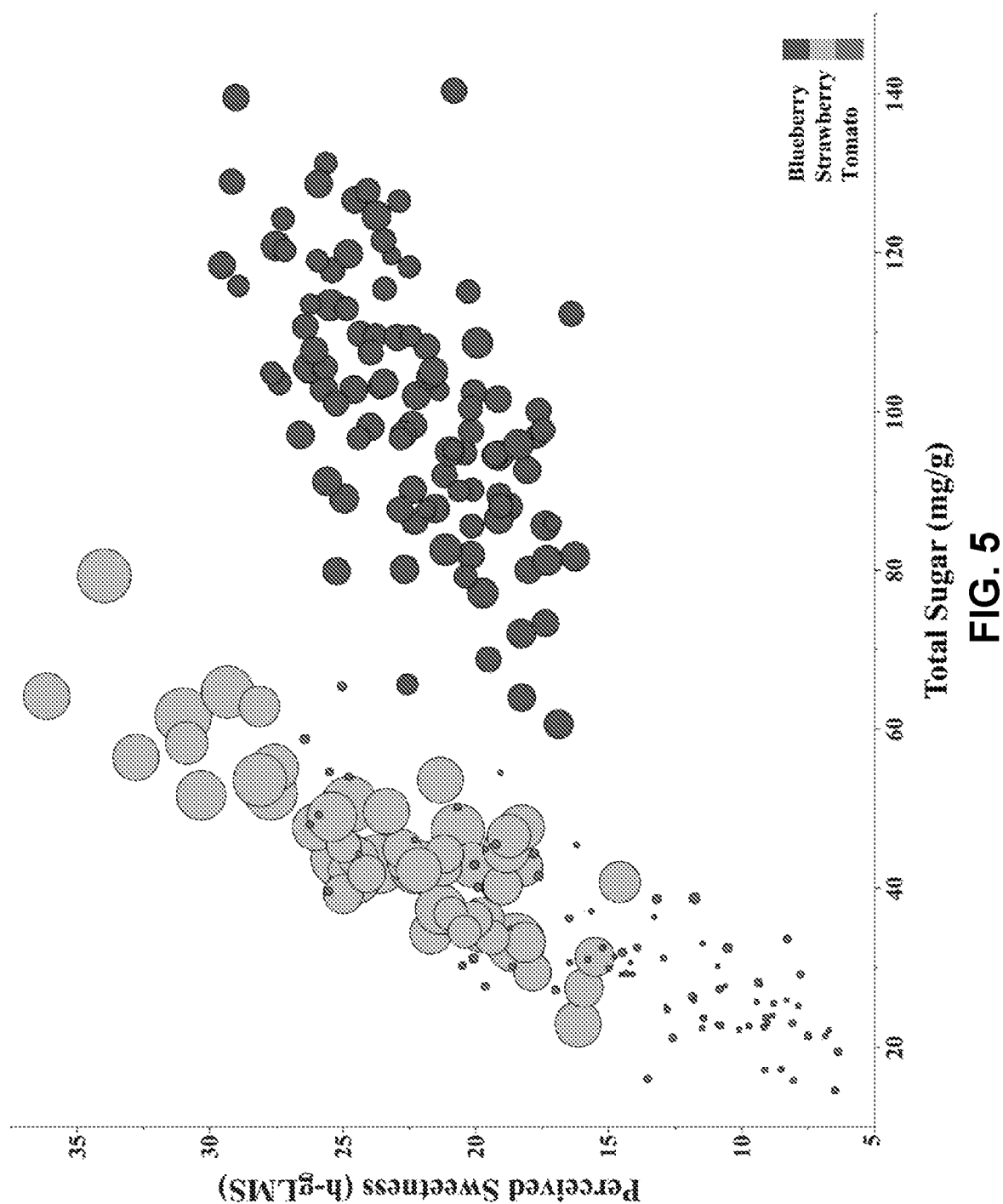
FIG. 5 is a graph illustrating a bubble plot of perceived sweetness by total sugar, with circles sized by total volatile of individual fruit cultivars.

Perceived sweetness was assessed with taste panels using h-gLMS method, total sugars (sucrose, fructose, and glucose) were identified and quantitated with LC-MS, and total volatiles were identified and quantitated by GC-MS. (ChemStation and MassHunter software packages). FIG. 5 illustrates a bubble plot of perceived sweetness by total sugar. The total amount of volatiles of individual fruit cultivars is illustrated by circle size. Note that blueberries have a much higher sugar content than strawberries and tomatoes, and that tomatoes have the smallest volatile content (tiny circles), where strawberries have the greatest volatile content (larger circles), with blueberries in the middle.

Sweet-enhancing volatiles identified from revised analysis of volatile compounds from tomato and strawberries (examples 2 and 3, respectively) were combined with sucrose solutions. The tomato volatiles and strawberry volatiles included those solutions are listed in Table 10 below:

TABLE 10

| 11 tomato volatiles | trans-2-pentenal, 6-methyl-5-hepten-2-ol, 2,5-dimethyl-4-hydroxy-3(2H)-furanone, cis-3-hexen-1-ol, isopentyl acetate, 6-methyl-5-hepten-2-one, b-cyclocitral, geranial, neral, geranylacetone, b-ionone |
|---|---|
| 24 strawberry volatiles | ethyl valerate, butyl butanoate, heptanal, 6-methyl-5-heptene-2-one, hexyl acetate, methyl thiobutyrate, 2-Pentyl butyrate, 2-Ethyl-1-hexanol, ethyl butyrate, propyl butanoate, (E)-2-Penten-1-al, ethyl decanoate, octyl acetate, nonanal, butyl isovalerate, octyl butanoate, amyl butyrate, hexyl butyrate, 2-methyl butyric acid, (E)-2-Decen-1-al, (E)-2-Hexen-1-yl butyrate, myrtenal, isopropyl butyrate, 4-Methoxy-2,5-dimethyl-3(2H)-furanone |

The above volatile compounds and 2% sucrose solution were combined to make 4 solutions: sucrose, sucrose with 11 volatiles from tomatoes, sucrose with 24 volatiles from strawberries and sucrose with all 35 volatiles. Subjects used a global intensity scale (variant of the gLMS with intermediate descriptors deleted). Subjects held their noses closed, swished the solution, swallowed, opened their noses and rated the sweetness perceived before and after opening their noses. Additionally, flavor and quality were rated. This technique was devised to emphasize the taste/flavor distinction (Snyder et al, AChemS, 2014). Repeated measures ANOVA (all 38 subjects) showed a significant before-after effect ($F(1, 108)=11.987$, $p=0.001$). T-tests showed no sweet intensification for sucrose alone (control), but significant sweet intensification for all 3 mixtures containing volatiles.

Figure 6:
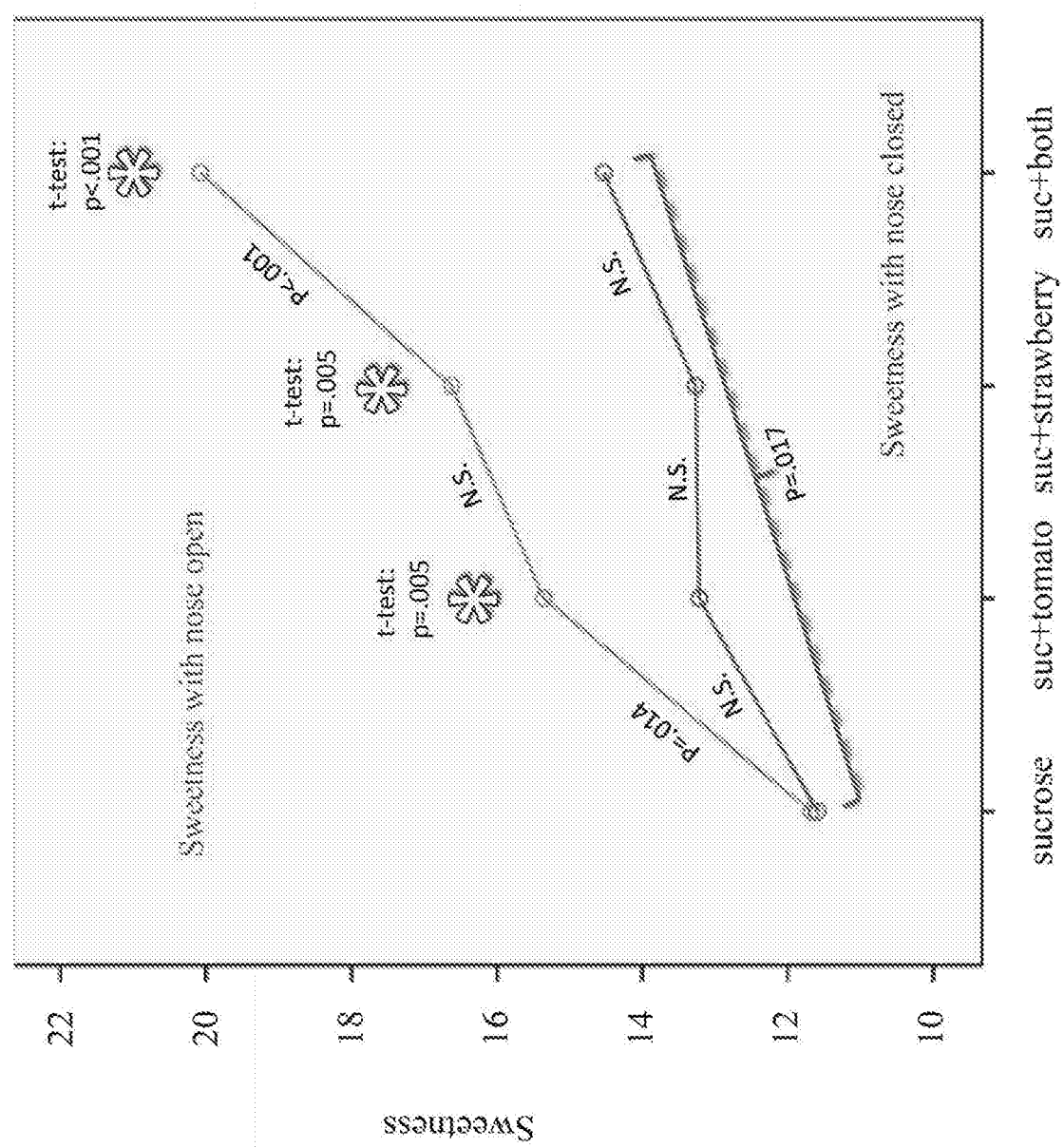
FIG. 6 is a graph of the results of the taste test with different volatile sucrose solutions described in Example 6, with perceived sweetness on the y-axis, and the different sucrose/volatile compositions on the x-axis.

The results are illustrated in the graph in FIG. 6 (y=perceived sweetness (h-gLMS), x=solutions: sucrose (control), suc+tomato (2% sucrose with 11 tomato volatiles), suc+strawberry (2% sucrose with 24 strawberry volatiles), and suc+both (2% sucrose with all volatiles)). The intensification for the mixture with all volatiles was significantly greater than for either tomato or strawberry volatiles alone; volatiles intensified sweet by a factor of 1.7. Not all subjects reported sweetness intensification. For those that did (N=23), the factor was 2.3. Thus, this example provides evidence that volatiles previously identified as sweet enhancers in fruit enhanced 2% sucrose solution, and that combinations of more volatiles increased the sweet enhancing effect.

The same strawberry and tomato volatiles (in the same concentrations) were combined as above, with the addition of the following orange volatiles: octyl acetate, heptanal, methyl octanoate, hexanal, vanillin, nonanal, pentanal, α-terpineol, dodecanal, D-carvone, hexyl butanoate, E-2-hexenal, α-ionone, ethyl 3-hydroxyhexanoate, octanal, citronellyl acetate, ethyl hexanoate, nonanol, carvacrol, 2-penten-1-ol,(Z)-, b-sinensal. In an informal tasting panel, a sweet enhancement of up to 4× was obtained (with individuals reporting between a 3× and 4× sweet enhancement factor). This indicates that combinations of volatiles from different fruits has greater than additive effect and can enhance the perception of sweetness in a comestible by a factor much greater than possible in nature with volatiles from only one fruit or than by combining volatiles from just one or two different fruit sources.

Conclusions:

Although both strawberry and tomato enhancement was significantly greater than control, tomato and strawberry enhancement were not significantly different from each other (with the strawberry enhancement being somewhat greater than tomato). However, the combination of both sets of volatiles was significantly greater than either set alone. The addition of orange volatiles even further increased the sweet enhancement, and the effect was greater than a merely additive effect provided by adding more volatiles from a single or only 2 different fruits. This study confirms the effect of volatile-enhanced-sweet with mixtures of volatile solutions in a laboratory setting, verifying the sweet volatile phenomenon in fruit described in the results from Examples 1-5, above. It is interesting that strawberry fruit, which has a greater amount of volatile compounds is perceived by testers as sweeter than blueberry even though blueberry has a significantly greater amount of sugar.

Example 7

The volatiles from tomato, strawberry, and orange in Examples 5 and 6, above, are listed in Table 11, below, along with the associated CAS number. Regression models as discussed above can also be used in predictive analyses to determine the optimal concentrations to achieve the most intense taste and flavor, which is performed using reiterative rounds of prediction profiling (SAS JMP Pro 12.0.1). The prediction profiler displays profile traces for each independent variable. A profile trace is the predicted response as one variable is changed while the others are held constant at the current values. The profiler computes the profiles and predicted responses as the value of a specific independent variable varies. Concentrations of volatiles for the examples above from tomato, strawberry, and orange were computed in this manner with over 100,000 reiterations of the predictions to result in an optimized concentration.

Mathematical analysis, reiterative perturbations analysis on the multivariate model, was done to determine the appropriate mean volatile concentration (ppm) that was biologically relevant for the fruit eating experience (e.g., in whole fruit) ($4^{th}$ column in Table 11). This concentration was thus indicated as the concentration around which the volatile compound will have a desirable effect on perceived sweetness of a comestible. This concentration was replicated in the experimental volatile solutions made in Example 6 by making the stock solutions (strawberry, tomato, and orange volatiles, only), as shown. The stock solution concentration (ppm) ($5^{th}$ column) and the volume of volatile compound (in microliters) to be dissolved in 100 ml of solvent to make the stock volatile solution ($6^{th}$ column) was then calculated based on the mean volatile concentration. These amounts are provided in Table 11 below.

TABLE 11

|  | CAS#/RI# | Volatile | Mean Concentration (ppm) | Stock solution concentration (ppm) i.e. 50 microliters of stock will be added to 1 lt of liquid (e.g., water, juice, etc.) | V of cmpd (microliters) to be dissolved in 100 ml solvent for stock solution |
|---|---|---|---|---|---|
| Strawberry | 539-82-2 | Ethyl valerate | 0.03329 | 665.8 | 66.58 |
|  | 109-21-7 | Butyl butanoate | 0.7207 | 14,414.00 | 1,441.40 |
|  | 111-71-7 | Heptanal | 0.03234 | 646.8 | 64.68 |
|  | 110-93-0 | 6-Methyl-5-heptene-2-one | 0.02738 | 547.6 | 54.76 |
|  | 142-92-7 | Hexyl acetate | 0.53461 | 10,692.20 | 1,069.22 |
|  | 2432-51-1 | Methyl thiobutyrate | 0.04396 | 879.2 | 87.92 |

TABLE 11-continued

| | CAS#/RI# | Volatile | Mean Concentration (ppm) | Stock solution concentration (ppm) i.e. 50 microliters of stock will be added to 1 lt of liquid (e.g., water, juice, etc.) | V of cmpd (microliters) to be dissolved in 100 ml solvent for stock solution |
|---|---|---|---|---|---|
| | 60415-61-4 | 2-Pentyl butyrate | 0.00709 | 141.8 | 14.18 |
| | 104-76-7 | 2-Ethyl-1-hexanol | 0.06001 | 1,200.20 | 120.02 |
| | 105-54-4 | Ethyl butyrate | 0.41993 | 8,398.60 | 839.86 |
| | 105-66-8 | Propyl butanoate | 0.05002 | 1,000.40 | 100.04 |
| | 1576-87-0 | (E)-2-Penten-1-al | 0.37515 | 7,503.00 | 750.3 |
| | 110-38-3 | Ethyl decanoate | 0.02021 | 404.2 | 40.42 |
| | 112-14-1 | Octyl acetate | 0.18295 | 3,659.00 | 365.9 |
| | 124-19-6 | Nonanal | 0.08461 | 1,692.20 | 169.22 |
| | 109-19-3 | Butyl isovalerate | 0.02656 | 531.2 | 53.12 |
| | 110-39-4 | Octyl butanoate | 0.4076 | 8,152.00 | 815.2 |
| | 540-18-1 | Amyl butyrate | 0.03513 | 702.6 | 70.26 |
| | 2639-63-6 | hexyl butyrate | 0.10767 | 2,153.40 | 215.34 |
| | 116-53-0 | 2-Methyl butyric acid | 0.19681 | 3,936.20 | 393.62 |
| | 3913-81-3 | (E)-2-Decen-1-al | 0.01939 | 387.8 | 38.78 |
| | 53398-83-7 | (E)-2-Hexen-1-yl butyrate | 0.0497 | 994 | 99.4 |
| | 564-94-3 | Myrtenal | 0.0654 | 1,308.00 | 130.8 |
| | 638-11-9 | Isopropyl butyrate | 0.72723 | 14,544.60 | 1,454.46 |
| | 4077-47-8 | 4-Methoxy-2,5-dimethyl-3(2H)-furanone | 0.11692 | 2,338.40 | 233.84 |
| Tomato | 1576-87-0 | trans-2-pentenal | 0.00111 | 22.3 | 2.23 |
| | 1569-60-4 | 6-methyl-5-hepten-2-ol | 0.00294 | 58.8 | 5.88 |
| | 3658-77-3 | 2,5-dimethyl-4-hydroxy-3(2H)-furanone | 0.00979 | 195.8 | 19.58 |
| | 928-96-1 | cis-3-hexen-1-ol | 0.20498 | 4,099.60 | 409.96 |
| | 123-92-2 | isopentyl acetate | 0.00069 | 13.9 | 1.39 |
| | 110-93-0 | 6-methyl-5-hepten-2-one | 0.00752 | 150.4 | 15.04 |
| | 432-25-7 | b-cyclocitral | 0.00121 | 24.3 | 2.43 |
| | 5392-40-5 | geranial | 0.00229 | 45.8 | 4.58 |
| | 5392-40-5 | neral | 0.00221 | 44.2 | 4.42 |
| | 689-67-8 | geranylacetone | 0.05113 | 1,022.50 | 102.25 |
| | 79-77-6 | b-ionone | 0.00029 | 5.9 | 0.59 |
| Orange Juice | RI1199 | octyl acetate | 0.007276 | 146 | 14.6 |
| | RI0910 | heptanal | 0.018488 | 370 | 37 |
| | RI1114 | methyl octanoate | 0.002806 | 56 | 5.6 |
| | RI0802 | hexanal | 0.375098 | 7502 | 750.2 |
| | RI1414 | vanillin | 0.121236 | 2425 | 242.5 |
| | RI1106 | nonanal | 0.047298 | 946 | 94.6 |
| | RI0686 | pentanal | 0.024033 | 481 | 48.1 |
| | RI1204 | α-terpineol | 0.039851 | 797 | 79.7 |
| | RI1408 | dodecanal | 0.207534 | 4151 | 415.1 |
| | RI1253 | D-carvone | 0.108828 | 2177 | 217.7 |
| | RI1181 | hexyl butanoate | 0.00048 | 10 | 1 |
| | RI0861 | E-2-hexenal | 0.006174 | 123 | 12.3 |
| | RI1428 | α-ionone. | 0.006529 | 131 | 13.1 |
| | RI1126 | ethyl 3-hydroxyhexanoate | 0.161691 | 3234 | 323.4 |
| | RI1011 | octanal | 0.297266 | 5945 | 594.5 |
| | RI1338 | citronellyl acetate | 0.065465 | 1309 | 130.9 |
| | RI1001 | ethyl hexanoate | 0.030935 | 619 | 61.9 |
| | RI1168 | nonanol | 0.009265 | 185 | 18.5 |
| | RI1296 | carvacrol | 0.001172 | 23 | 2.3 |
| | RI0765 | 2-Penten-1-ol, (Z)- | 0.008893 | 178 | 17.8 |
| | | (Z)-, β-sinensal | 0.051494 | | |
| Blueberry | | β-caryophyllene oxide | N/A | | |
| | | 2-hptanone | N/A | | |

REFERENCES

Buttery, R. G., Teranishi, R., Flath, R. A., Ling, L. C. (1987). Fresh tomato volatiles: composition and sensory studies. In: Teranishi R., Buttery R., Shahidi R., eds. Flavor chemistry: Trends and developments. (Amer. Chem. Soc. Symposium Series, Washington, D.C.). pp. 213-222

Bartoshuk, L. M., Duffy, V. B., Fast, K., Green, B. G., Prutkin, J., Snyder, D. J. (2003). Labeled scales (e.g., category, Likert, VAS) and invalid across-group comparisons. What we have learned from genetic variation in taste. Food Qual. Pref. 14, 125-138

Bartoshuk, L. M., Fast, K., Snyder, D. J. (2005). Differences in our sensory worlds: Invalid comparisons with labeled scales. Current Directions in Psychological Science 14, 122-125

Stone, E. A., Ayroles, J. M. (2009). Modulated Modularity Clustering as an Exploratory Tool for Functional Genomic Inference. PLoS Genet 5(5): e1000479. doi: 10.1371/journal.pgen.1000479

Salles, C. (2006) Odour-taste interactions in flavor perception. In: Voilley, A., Etiévant, P. eds. Flavourin Food. (Woodhead Publishing Ltd., Cambridge, UK), pp 345-368

Vogel, J., Tieman, D. M., Sims, C., Odabasi, A., Clark, D. G., Klee, H. J. (2010). Carotenoid content impacts flavor acceptability in tomato (*Solanum lycopersicum*). J. Sci. Food Agric. 90, 2233-2240

Baldwin, E. A., Goodner, K., Plotto, A. (2008). Interaction of volatiles, sugars, and acids on perception of tomato aroma and flavor descriptors. J. Food Sci. 73, S294-S307

Murphy, C., and Cain, W. S. (1980). TASTE AND OLFACTION—INDEPENDENCE VS INTERACTION. Physiology & Behavior 24

Burdach, K. J., Kroeze, J. H. A., and Koster, E. P. (1984). NASAL, RETRONASAL, AND GUSTATORY PERCEPTION—AN EXPERIMENTAL COMPARISON. Perception & Psychophysics 36

Frank, R. A., Ducheny, K., and Mize, S. J. S. (1989). STRAWBERRY ODOR, BUT NOT RED COLOR, ENHANCES THE SWEETNESS OF SUCROSE SOLUTIONS. Chemical Senses 14

Stevenson, R. J., Prescott, J., and Boakes, R. A. (1999). Confusing tastes and smells: How odours can influence the perception of sweet and sour tastes. Chemical Senses 24

Cliff, M., and Noble, A. C. (1990). TIME-INTENSITY EVALUATION OF SWEETNESS AND FRUITINESS AND THEIR INTERACTION IN A MODEL SOLUTION. Journal of Food Science 55

Stevenson, R. J., Prescott, J., and Boakes, R. A. (1999). Confusing tastes and smells: How odours can influence the perception of sweet and sour tastes. Chemical Senses 24 (Lavin and Lawless 1998; Labbe et al. 2006), Prescott, J. (1999). Flavour as a psychological construct: implications for perceiving and measuring the sensory qualities of foods. Food Quality and Preference 10 (Bingham et al. 1990;

Kato, Y. (2003). Chemical and sensory changes in flavor of roux prepared from wheat flour and butter by heating to various temperatures. Food Science and Technology Research 9

Colquhoun, T. A., Levin, L. A., Moskowitz, H. R., Whitaker, V. M., Clark, D. G., and Folta, K. M. (2012). Framing the perfect strawberry: an exercise in consumer-assisted selection of fruit crops. Journal of Berry Research 2, 45-61

Schieberle, P., and Hofmann, T. (1997). Evaluation of the character impact odorants in fresh strawberry juice by quantitative measurements and sensory studies on model mixtures. Journal of Agricultural and Food Chemistry 45

Ulrich, D., Hoberg, E., Rapp, A., and Kecke, S. (1997). Analysis of strawberry flavour—discrimination of aroma types by quantification of volatile compounds. Zeitschrift Fur Lebensmittel-Untersuchung Und-Forschung a-Food Research and Technology 205, Hakala, M. A., Lapvetelainen, A. T., and Kallio, H. P. (2002). Volatile compounds of selected strawberry varieties analyzed by purge-and-trap headspace GC-MS. Journal of Agricultural and Food Chemistry 50

Jetti, R. R., Yang, E., Kurnianta, A., Finn, C., and Qian, M. C. (2007). Quantification of selected aroma-active compounds in strawberries by headspace solid-phase microextraction gas chromatography and correlation with sensory descriptive analysis. Journal of Food Science 72, Olbricht, K., Grafe, C., Weiss, K., and Ulrich, D. (2008). Inheritance of aroma compounds in a model population of *Fragaria* x *ananassa* Duch. Plant Breeding 127

Lindemann 2001

Fujimaru and Lim 2013

Small, D. M., Voss, J., Mak, Y. E., Simmons, K. B., Parrish, T., and Gitelman, D. (2004). Experience-dependent neural integration of taste and smell in the human brain. Journal of Neurophysiology 92 Frank and Byram 1988

Tieman D, Bliss P, McIntyre L M, Blandon-Ubeda A, Bies D, Odabasi A Z. et al The chemical interactions underlying tomato flavor preferences. Curr Biol. 2012; 22(11): 1035-1039. doi: 10.1016/j.cub.2012.04. 016 PMID: 22633806

Schwieterman M L, Colquhoun T A, Jaworski E A, Bartoshuk L M, Gilbert J L, Tieman D M, et al. Strawberry flavor: Diverse chemical compositions, a seasonal influence, and effects on sensory perception. PLOS ONE. 2014; 9(2):12.

Togari N, Kobayashi A, Aishima T. Relating sensory properties of tea aroma to gas chromatographic data by chemometric calibration methods. Food Res Int. 1995; 28(5):485-493.

Hough G, Califano A N, Bertola N C, Bevilacqua A E, Martinez E, Vega M J, Zaritzky N E. Partial least squares correlations between sensory and instrumental measurements of flavor and texture for Reggianito grating cheese. Food Qual Prefer. 1996; 7(1):47-53.

de Kermadec F, Durand J F, Sabatier R. Comparison between linear and nonlinear PLS methods to explain overall liking from sensory characteristics. Food Qual Prefer. 1997; 8(5-6):395-402.

Toscas P J, Shaw F D, Beilken S L. Partial least squares (PLS) regression for the analysis of instrument measurements and sensory meat quality data. Meat Sci. 1999; 52:173-178. PMID: 22062369

Tenenhaus M, Pages J, Ambroisine L, Guinot C. PLS methodology to study relationships between hedonic judgements and product characteristics. Food Qual Prefer. 2005; 16(4):315-325.

Mahawanich T, Schmidt S J. Molecular mobility and the perceived sweetness of sucrose, fructose, and glucose solutions. Food Chem. 2004; 84(2):169-179.

Vigues S, Dotson C D, Munger S D. The receptor basis of sweet taste in mammals. Results Probl Cell Differ. 2009; 47:187-202. doi: 10.1007/400_2008_2 PMID: 19083128

Yu T H, Wu C M, Chen S Y. Effects of pH adjustment and heat-treatment on the stability and the formation of volatile compounds of garlic. J Agr Food Chem. 1989; 37(3): 730-734.

Niimura Y. Olfactory receptor multigene family in vertebrates: From the viewpoint of evolutionary genomics. Curr Genomics. 2012; 13(2):103-114. PMID: 23024602

Golebiowski M, Ostrowski B, Paszkiewicz M, Czerwicka M, Kumirska J, Halinski L, et al. Chemical composition of commercially available essential oils from blackcurrant, ginger, and peppermint. Chem Nat Compd. 2008; 44(6):794-796.

49. Dimick P S, Hoskin J C. Review of apple flavor-State of the art. CRC Cr Rev Food Sci. 1983; 18(4):387-409.

Klesk K, Qian M, Martin R R. Aroma extract dilution analysis of cv. Meeker (*Rubus idaeus* L.) red raspberries from Oregon and Washington. J Agr Food Chem. 2004; 52(16):5155-5161.

'Marion' (*Rubus* spp. hyb) and 'Thornless Evergreen' (*R. laciniatus* L.) blackberries. J Food Sci. 2005; 70(1): C13-C20.

Olander T, Waszak S M, Viavant M, Khen M, Ben-Asher E, Reyes A, et al. Personal receptor repertoires: olfaction as a model. BMC Genomics. 2012; 13:16.

Bartoshuk L M, Duffy V, Green B G, Hoffman H J, Ko C W, Lucchina L A, et al. Valid across-group comparisons with labeled scales: the gLMS versus magnitude matching. Physiol Behav. 2004; 82(1):109-114. PMID: 15234598

Bartoshuk L M, Fast K, Snyder D J. Differences in our sensory—Invalid comparisons with labeled scales. Curr Dir Psychol Sci. 2005; 14(3):122-125

The invention claimed is:

1. A sweetener composition for a comestible, the sweetener composition comprising:
    a natural sweetener, an artificial sweetener, or both; and
    a sweetness enhancing composition comprising about 25 or more isolated sweet-enhancing volatile compounds chosen from the group of sweet-enhancing volatile compounds consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone;
    wherein about 2-15 of the isolated volatile compounds are chosen from the group of orange sweet-enhancing volatile compounds consisting of: methyl octanoate, vanillin, pentanal, α-terpineol, dodecanal, D-carvone, hexyl butanoate, α-ionone, ethyl 3-hydroxyhexanoate, octanal, citronellyl acetate, ethyl hexanoate, nonanol, carvacrol, and (Z)-, β-sinensal.

2. The sweetener composition of claim 1 comprising: about 25 or more of the following isolated sweet-enhancing volatile compounds in the following amounts: about 0.00111 ppm of trans-2-pentenal; about 0.00294 ppm of 6-methyl-5-hepten-2-ol; about 0.00979 ppm of 2,5-dimethyl-4-hydroxy-3(2H)-furanone; about 0.20498 ppm of cis-3-hexen-1-ol; about 0.00069 ppm of isopentyl acetate; about 0.00752 ppm to 0.02738 ppm of 6-methyl-5-hepten-2-one; about 0.00121 ppm of β-cyclocitral; about 0.00229 ppm of geranial; about 0.00221 ppm of neral; about 0.05113 ppm of geranylacetone; about 0.00029 ppm of β-ionone; about 0.03329 ppm of ethyl valerate; about 0.7207 ppm of butyl butanoate; about 0.018488 ppm to 0.03234 of heptanal; about 0.53461 ppm of hexyl acetate; about 0.04396 ppm of methyl thiobutyrate; about 0.00709 ppm of 2-pentyl butyrate; about 0.06001 ppm of 2-ethyl-1-hexanol; about 0.41993 ppm of ethyl butyrate; about 0.05002 ppm of propyl butanoate; about 0.37515 ppm of (E)-2-penten-1-al; about 0.02021 ppm of ethyl decanoate; about 0.007276 ppm to 0.18295 ppm of octyl acetate; about 0.047298 ppm to 0.08461 ppm of nonanal; about 0.02656 ppm of butyl isovalerate; about 0.4076 ppm of octyl butanoate; about 0.03513 ppm of amyl butyrate; about 0.10767 ppm of hexyl butyrate; about 0.19681 ppm of 2-methyl butyric acid; about 0.01939 ppm of (E)-2-decen-1-al; about 0.0497 ppm of (E)-2-hexen-1-yl butyrate; about 0.0654 ppm of myrtenal; about 0.72723 ppm of isopropyl butyrate; about 0.11692 ppm of 4-methoxy-2,5-dimethyl-3(2H)-furanone; about 0.002806 ppm of methyl octanoate; about 0.375098 ppm of hexanal; about 0.121236 ppm of vanillin; about 0.024033 ppm of pentanal; about 0.039851 ppm of α-terpineol; about 0.207534 ppm of dodecanal; about 0.108828 ppm of D-carvone; about 0.00048 ppm of hexyl butanoate; about 0.006174 ppm of E-2-hexenal; about 0.006529 ppm of α-ionone; about 0.161691 ppm of ethyl 3-hydroxyhexanoate; about 0.297266 ppm of octanal; about 0.065465 ppm of citronellyl acetate; about 0.030935 ppm of ethyl hexanoate; about 0.009265 ppm of nonanol; about 0.001172 ppm of carvacrol; about 0.008893 ppm of 2-penten-1-ol; and about 0.051494 ppm of (Z)-,β-sinensal.

3. The composition of claim 1, wherein about 3 or more of the isolated volatile compounds in the composition each come from a different fruit selected from: strawberry, tomato, orange, and blueberry.

4. The composition of claim 1, wherein about 1-2 of the isolated volatile compounds are selected from β-caryophyllene oxide and 2-heptanone.

5. The composition of claim 1, wherein about 5-13 of the isolated volatile compounds are selected from: trans-2-pentenal, cis-3-hexen-1-ol, β-cyclocitral, geranylacetone, butyl butanoate, 2-pentyl butyrate, propyl butanoate, butyl isovalerate, octyl butanoate, amyl butyrate, 2-methyl butyric acid, (E)-2-decen-1-al, and myrtenal.

6. The composition of claim 1, wherein about 1-2 of the isolated volatile compounds are selected from β-caryophyllene oxide and 2-heptanone;
    about 1-4 of the isolated volatile compounds are selected from: trans-2-pentenal, cis-3-hexen-1-ol, β-cyclocitral, and geranylacetone; and
    about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal.

7. The composition of claim 1, wherien the sweetener composition consists of:

the natural sweetener, artificial sweetener, or both; and from 25 to all 54 of the volatile compounds.

8. The composition of claim 1, wherein the sweetness enhancing composition comprises about 35 or more of the isolated volatile compounds.

9. A sweetness enhancing composition for a comestible, the composition comprising: a combination of about 25 or more isolated sweet-enhancing volatile compounds chosen from the group of sweet-enhancing volatile compounds consisting of: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone,
  wherein about 2-15 of the isolated volatile compounds are chosen from the group of orange sweet-enhancing volatile compounds consisting of: methyl octanoate, vanillin, pentanal, α-terpineol, dodecanal, D-carvone, hexyl butanoate, α-ionone, ethyl 3-hydroxyhexanoate, octanal, citronellyl acetate, ethyl hexanoate, nonanol, carvacrol, and (Z)-, β-sinensal; and
  wherein the sweetness enhancing composition does not contain a sugar or artificial sweetener.

10. The composition of claim 9, wherein about 3 or more of the isolated volatile compounds in the composition each come from a different fruit selected from: strawberry, tomato, orange, and blueberry.

11. The composition of claim 9, wherein about 1-2 of the isolated volatile compounds are selected from β-caryophyllene oxide and 2-heptanone;
  about 1-4 of the isolated volatile compounds are selected from: trans-2-pentenal, cis-3-hexen-1-ol, β-cyclocitral, and geranylacetone; and
  about 2-9 of the isolated volatile compounds are selected from: butyl butanoate, 2-pentyl butyrate, propyl butanoate, butyl isovalerate, octyl butanoate, amyl butyrate, 2-methyl butyric acid, (E)-2-decen-1-al, and myrtenal.

12. The composition of claim 9, wherien the sweetener composition consists of:
  a carrier; and
  from 25 to all 54 of the volatile compounds.

13. A sweetener composition for a comestible, the sweetener composition comprising:
  a sweetness enhancing composition comprising each of the following isolated sweet-enhancing volatile compounds: trans-2-pentenal; 6-methyl-5-hepten-2-ol; 2,5-dimethyl-4-hydroxy-3(2H)-furanone; cis-3-hexen-1-ol; isopentyl acetate; 6-methyl-5-hepten-2-one; β-cyclocitral; geranial; neral; geranylacetone; β-ionone; ethyl valerate; butyl butanoate; heptanal; hexyl acetate; methyl thiobutyrate; 2-pentyl butyrate; 2-ethyl-1-hexanol; ethyl butyrate; propyl butanoate; (E)-2-penten-1-al; ethyl decanoate; octyl acetate; nonanal; butyl isovalerate; octyl butanoate; amyl butyrate; hexyl butyrate; 2-methyl butyric acid; (E)-2-decen-1-al; (E)-2-hexen-1-yl butyrate; myrtenal; isopropyl butyrate; 4-methoxy-2,5-dimethyl-3(2H)-furanone; methyl octanoate; hexanal; vanillin; pentanal; α-terpineol; dodecanal; D-carvone; hexyl butanoate; E-2-hexenal; α-ionone; ethyl 3-hydroxyhexanoate; octanal; citronellyl acetate; ethyl hexanoate; nonanol; carvacrol; 2-penten-1-ol; (Z)-,β-sinensal; β-caryophyllene oxide; and 2-heptanone.

* * * * *